United States Patent [19]
Murakami

[11] Patent Number: 5,845,082
[45] Date of Patent: *Dec. 1, 1998

[54] DISTRIBUTED SYSTEM HAVING AN IMPROVED METHOD AND APPARATUS FOR CHECKPOINT TAKING

[75] Inventor: Takeo Murakami, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 518,395

[22] Filed: Aug. 15, 1995

[30] Foreign Application Priority Data

Aug. 19, 1994 [JP] Japan .................................. 6-195335
Mar. 8, 1995 [JP] Japan .................................. 7-048902

[51] Int. Cl.⁶ .................................................. G06F 11/00
[52] U.S. Cl. ............................... 395/200.56; 395/200.31; 395/182.02
[58] Field of Search ..................... 395/200.03, 200.33, 395/200.07, 200.08, 200.11, 200.12, 181, 182.02, 182.03, 182.04, 182.05, 182.18, 184.01, 200.31, 200.43, 200.44, 200.46, 200.47, 200.48, 200.49, 200.53, 200.54, 200.56, 182.11

[56] References Cited

U.S. PATENT DOCUMENTS

| | | | |
|---|---|---|---|
| 4,751,702 | 6/1988 | Beier et al. | 395/182.11 |
| 4,823,261 | 4/1989 | Bank et al. | 395/200.01 |
| 5,129,080 | 7/1992 | Smith | 395/182.02 |
| 5,454,099 | 9/1995 | Myers et al. | 395/182.04 |
| 5,499,367 | 3/1996 | Bamford et al. | 395/600 |
| 5,590,277 | 12/1996 | Fuchs et al. | 395/183.14 |
| 5,606,693 | 2/1997 | Nilsen et al. | 395/610 |
| 5,608,865 | 3/1997 | Midgely et al. | 395/180 |

FOREIGN PATENT DOCUMENTS

0467546A2  6/1991  European Pat. Off. .

*Primary Examiner*—Larry D. Donaghue
*Assistant Examiner*—Paul R. Myers
*Attorney, Agent, or Firm*—Staas & Halsey

[57] ABSTRACT

The invention provides a node apparatus and a storage apparatus for use with a distributed system and a recovery method for a resource managing server for a distributed system, which are improved in that the load to a server upon recovery of the server is reduced and the memory area of the server can be utilized effectively. The node apparatus is used with a distributed system which includes a plurality of node apparatus each including one or both of a client and a resource managing server and a storage apparatus for storing checkpoints and wherein the plurality of node apparatus and the server are interconnected by way of a network. The node apparatus at least includes a client, and includes a checkpoint taking unit for allowing, in ordinary operation of the distributed system, the client provided in the node apparatus to take a checkpoint regarding a resource managed by the server, and a unit for storing the checkpoint taken by the checkpoint taking unit in the ordinary operation of the distributed system into the storage apparatus.

57 Claims, 37 Drawing Sheets

FIG. 19

| id | token |
|----|-------|
| d1 | -     |
| d2 | -     |
| d3 | -     |
| ⋮  | ⋮     |
|    | h     |

F I G. 22
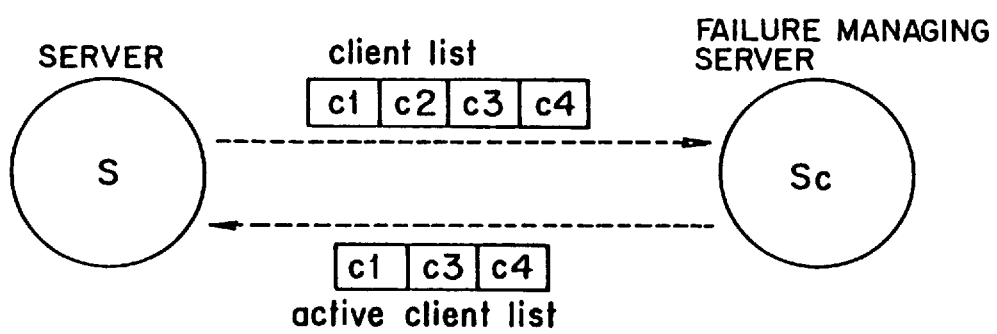

FIG. 32(a)

| FMb | | |
|---|---|---|
| FILE id | FILE SIZE | TIME STAMP |
| d1 | s1 | 94.7.10 |
| d2 | s2 | 94.8.17 |
| d3 | s3 | 94.3.1 |
| d4 | s4 | 94.8.5 |
| d5 | s5 | 94.7.30 |

FIG. 32(b)

| PM 3 | | | |
|---|---|---|---|
| FILE id | TOKEN | FILE SIZE | TIME STAMP |
| d1 | h | s1' | 94.8.18 |
| d2 | - | s2' | 94.8.16 |

FIG. 32(c)

| PM 4 | | | |
|---|---|---|---|
| FILE id | TOKEN | FILE SIZE | TIME STAMP |
| d3 | h | s3' | 94.8.18 |
| d5 | - | s5' | 94.8.17 |

FIG. 33

| FMb | | | |
|---|---|---|---|
| FILE id | | FILE SIZE | TIME STAMP |
| d1 | - | s1 | 94.7.10 |
| d2 | h | s2 | 94.8.17 |
| d3 | - | s3 | 94.3.1 |
| d4 | h | s4 | 94.8.5 |
| d5 | h | s5' | 94.8.17 |

DISTRIBUTED SYSTEM HAVING AN IMPROVED METHOD AND APPARATUS FOR CHECKPOINT TAKING

BACKGROUND OF THE INVENTION

1. Field of the Invention

This invention relates to a distributed system and a recovery method for a resource managing server in a distributed system.

2. Description of the Related Art

In recent years, computer systems which have high performances and are high in reliability have been and are being demanded in the field of business, and propagation of computer systems of the parallel, distributed type including a plurality of processors has been and is proceeding.

In a parallel, distributed system, even if one of processors fails, processing can be continued with the remaining processor or processors. However, the software must be constructed so as to conceal the failure from a user of the system.

In general parallel, distributed systems, a technique (switch and takeover method) is employed widely wherein a pair of processes which provide the same service are prepared on two different nodes and one of the processes serves as a currently used process while the other process serves as a backup process.

In such parallel, distributed system as described above, when the processor (hereinafter referred to as primary server) on which the currently used process operates fails, the other processor (hereinafter referred to as backup server) which executes the backup process takes over the service. This conceals the failure of a node from a user of the service. Consequently, the reliability of the system is assured.

Meanwhile, in a software system wherein processes on a plurality of nodes operate in accordance with a server-client model on a distributed system, when a node on which a primary server is operating fails, a backup server re-constructs resource management information and takes over the server so that a resource having been delivered to a client by the primary server can be used also after takeover of the process.

To this end, in the distributed system, when it operates in ordinary operation, each time the primary server issues a resource to a client, the contents (hereinafter referred to as checkpoint) of the resource are stored into a stable storage apparatus (non-volatile storage apparatus), and upon later takeover of the process arising from a crash (failure) of the primary server, the backup server reads out such checkpoints recorded in the stable storage apparatus and re-constructs the resource management information to perform recovery of the server.

Further, in general distributed systems, in order to utilize a resource commonly among a plurality of nodes, a mechanism called token (or lock) is employed widely. Here, the token denotes the right of using or the like for restricting a client who can use a resource in order to prevent a plurality of clients from using the resource of the server at a time.

In particular, when a client wants to use a resource managed by the server, the client first requests acquisition of a token of the resource, and after the client succeeds in acquisition of the token, it performs its job using the resource such as a file managed by the server. Thereafter, when the use of the resource is completed, the client returns the token to the server. Consequently, the same resource managed by the server is prevented from being used at a time by a plurality of clients.

With the general parallel, distributed system described above, however, since, each time the server issues a resource to a client, the checkpoint of the resource is recorded into the stable storage apparatus, there is a subject to be solved in that a higher cost is required to write data into the stable storage apparatus than to write data into a main storage apparatus and the performance in ordinary operation of the system is low.

Further, if a client is put into a disabled condition together with the primary server as a result of a crash of a node, the backup server re-constructs also a resource used only by the crashing client. Consequently, there is another subject to be solved in that, after takeover of the server as a result of failure, the backup server secures an excessive memory area, which wastes the memory.

Furthermore, when a client who has acquired and possesses a token crashes simultaneously with the server, or when part (a node) of the system crashes while delivery of a token is proceeding between the server and a client, the token is lost, and as a result, even if the system recovers from the crash, the resource managed by the server corresponding to the token cannot be used any more, which is a further subject to be solved.

Also there is a different subject to be solved in that a result of processing of a client which has used a resource managed by the server as a result of possession of a token of it till the time immediately before a node crashes is not reflected on the server, and consequently, the information of resources managed by the server may be inconsistent before and after the node crashes.

SUMMARY OF THE INVENTION

It is an object of the present invention to provide a node apparatus and a storage apparatus for use with, and a recovery method for a resource managing server in, a distributed system of the type which operates in accordance with a server-client model wherein the load to the server is reduced by reducing checkpoints acquired by the server and, upon takeover from a primary server to a backup server as a result of a failure, only necessary resource information is re-constructed by the backup server to effectively make use of the memory area of the server.

It is another object of the present invention to provide a node apparatus and a storage apparatus for use is with, and a recovery method for a resource managing server in, a distributed system wherein information regarding tokens is collected, upon takeover between servers, from clients to detect loss of a token arising from a crash of a node and, also after recovery by takeover between the servers, the consistency of resource information corresponding to tokens managed by the server can be maintained.

In order to attain the objects described above, according to an aspect of the present invention, there is provided a node apparatus for use with a distributed system which includes a plurality of node apparatus each including one or both of a client and a resource managing server and a storage apparatus for storing checkpoints having resource management information and wherein the plurality of node apparatus and the storage apparatus are interconnected by way of a network and the client and the server operate in accordance with a server-client model, the first-mentioned node apparatus at least including the client, the first node apparatus comprising checkpoint taking means for allowing, in ordinary operation of the distributed system, the client provided in the first node apparatus to take a checkpoint regarding a resource managed by the server, and means for storing the checkpoint taken by the checkpoint taking means in the ordinary operation of the distributed system into the storage apparatus.

The node apparatus for use with a distributed system according to the present invention is advantageous in that the load to the server which is required to process requests from a large number of clients can be reduced remarkably, and consequently, the recovery processing of the server can be performed at a high speed. The node apparatus is further advantageous in that a fault-tolerant distributed system can be constructed using the node apparatus without increasing the load to the server.

According to another aspect of the present invention, there is provided a node apparatus for use with a distributed system which includes a plurality of node apparatus each including one or both of a client and a resource managing server and a storage apparatus for storing checkpoints having resource management information and wherein the plurality of node apparatus and the storage apparatus are interconnected by way of a network and the client and the server operate in accordance with a server-client model, the first-mentioned node apparatus at least including the client, the first node apparatus comprising checkpoint taking means for allowing, in ordinary operation of the distributed system, the client provided in the first node apparatus to take a checkpoint regarding a resource managed by the server, storage means for storing the checkpoint taken by the checkpoint taking means in the ordinary operation of the distributed system, means for storing the checkpoint taken by the checkpoint taking means in the ordinary operation of the distributed system into the storage apparatus, and means for sending out information regarding a resource from the client to the server based on the checkpoint stored in the storage means in the ordinary operation of the distributed system so as to allow, when any other one of the plurality of node apparatus crashes, the server to collect information regarding resources to perform recovery of the server.

According to a further aspect of the present invention, there is provided a node apparatus for use with a distributed system which includes a plurality of node apparatus each including one or both of a client and a resource managing server such that a primary resource managing server and a backup resource managing server are distributed in different ones of the plurality of node apparatus, and a storage apparatus for storing checkpoints having resource management information and wherein the plurality of node apparatus and the storage apparatus are interconnected by way of a network and the client and the servers operate in accordance with a server-client model, the first-mentioned node apparatus at least including the client, the first node apparatus comprising checkpoint taking means for allowing, in ordinary operation of the distributed system, the client provided in the first node apparatus to take a checkpoint regarding a resource managed by the primary resource managing server, and means for storing the checkpoint taken by the checkpoint taking means in the ordinary operation of the distributed system into the storage apparatus.

According to a still further aspect of the present invention, there is provided a node apparatus for use with a distributed system which includes a plurality of node apparatus each including one or both of a client and a resource managing server such that a primary resource managing server and a backup resource managing server are distributed in different ones of the plurality of node apparatus, and a storage apparatus for storing checkpoints having resource management information and wherein the plurality of node apparatus and the storage apparatus are interconnected by way of a network and the client and the server operate in accordance with a server-client model, the first-mentioned node apparatus at least including the client, the first node apparatus comprising checkpoint taking means for allowing, in ordinary operation of the distributed system, the client provided in the first node apparatus to take a checkpoint regarding a resource managed by the primary resource managing server, storage means for storing the checkpoint taken by the checkpoint taking means in the ordinary operation of the distributed system, means for storing the checkpoint taken by the checkpoint taking means in the ordinary operation of the distributed system into the storage apparatus, and means for sending out information regarding resources managed by the server from the client to the backup resource managing server based on the checkpoint stored in the storage means in the ordinary operation of the distributed system so as to allow, when one of the plurality of node apparatus in which the primary resource managing server is present crashes and the first node apparatus receives an inquiry from the backup resource managing server for information regarding the resources managed by the server, the backup resource managing server to re-construct an internal condition of the backup resource managing server to perform recovery of the server.

The node apparatus for use with a distributed system according to the present invention described above are advantageous in that the load to the server which is required to process requests from a large number of clients can be reduced remarkably, and consequently, the recovery processing of the server can be performed at a high speed and the performance of the distributed system is improved remarkably. The node apparatus are further advantageous in that, since the cost required otherwise for the server to read out checkpoints from the storage apparatus is not required upon takeover of the process from the primary server to the backup server, the recovery processing of the server can be performed at a high speed. The node apparatus are also advantageous in that, since a resource which has been held only by a failing client need not be re-constructed newly, the memory area to be used in the storage apparatus can be reduced remarkably and the memory area of the server can be utilized effectively.

According to a yet further aspect of the present invention, there is provided a node apparatus for use with a distributed system which includes a plurality of node apparatus each including one or both of a client and a resource managing server such that a primary resource managing server and a backup resource managing server are distributed and a primary client and a backup client are individually distributed in different ones of the plurality of node apparatus, and a storage apparatus for storing checkpoints having resource management information and wherein the plurality of node apparatus and the storage apparatus are interconnected by way of a network and the client and the servers operate in accordance with a server-client model, the first-mentioned node apparatus at least including the client, the first node apparatus comprising checkpoint taking means for allowing, in ordinary operation of the distributed system, the client provided in the first node apparatus to take a checkpoint regarding a resource managed by the server, storage means for storing the checkpoint taken by the checkpoint taking means in the ordinary operation of the distributed system, means for storing the checkpoint taken by the checkpoint taking means in the ordinary operation of the distributed system into the storage apparatus, means for reading in, when a different one of the plurality of node apparatus in which a client different from the backup client provided in another one of the plurality of node apparatus and the primary resource managing server are present crashes, a checkpoint regarding the client present in the crashing node apparatus from the storage apparatus for the backup client to recover a condition regarding the resources of the server, notification means for notifying the backup resource managing server of the recovery, and means for sending out information regarding a resource to the backup resource managing server based on the checkpoint stored in the storage means in the ordinary operation of the distributed system so as to allow, when the first node apparatus receives an inquiry from the backup resource managing server for information regarding the resources managed by the server after the notification of the recovery is notified by the notification means, the backup resource managing server to collect information and re-construct an internal condition of the backup resource managing server based on the thus collected information to perform recovery of the server.

With the node apparatus for use with a distributed system according to the present invention, each of processes upon recovery can be definitely divided into a phase in which checkpoints are read in from the storage apparatus and another phase in which the clients cooperate with each other to re-construct resource management information. Consequently, the node apparatus is advantageous in that the delay time of an inquiry message for each process to re-construct resource management information can be reduced remarkably and the recovery processing can be performed efficiently by the entire distributed system.

According to a yet further aspect of the present invention, there is provided a node apparatus for use with a distributed system which includes a plurality of node apparatus each including one or both of a client and a resource managing server and a storage apparatus for storing checkpoints having resource management information and wherein the plurality of node apparatus and the storage apparatus are interconnected by way of a network and the client and the server operate in accordance with a server-client model, the first-mentioned node apparatus at least including the client, the first node apparatus comprising checkpoint taking means for allowing, in ordinary operation of the distributed system, the client provided in the first node apparatus to take a checkpoint regarding a token for permitting the client to use resources managed by the server, and means for storing the checkpoint regarding the token taken by the checkpoint taking means in the ordinary operation of the distributed system into the storage apparatus.

According to a yet further aspect of the present invention, there is provided a node apparatus for use with a distributed system which includes a plurality of node apparatus each including one or both of a client and a resource managing server and a storage apparatus for storing checkpoints having resource management information and wherein the plurality of node apparatus and the storage apparatus are interconnected by way of a network and the client and the server operate in accordance with a server-client model, the first-mentioned node apparatus at least including the client, the first node apparatus comprising checkpoint taking means for allowing, in ordinary operation of the distributed system, the client provided in the first node apparatus to take a checkpoint regarding a token for permitting the client to use resources managed by the server, storage means for storing information regarding the token taken by the checkpoint taking means in the ordinary operation of the distributed system, means for storing the checkpoint regarding the token taken by the checkpoint taking means in the ordinary operation of the distributed system into the storage apparatus, and means for sending out information regarding the token from the client to the server based on the checkpoint regarding the token stored in the storage means in the ordinary operation of the distributed system so as to allow, when any other one of the plurality of node apparatus crashes, the server to collect information regarding the token by way of the client to perform recovery of the server.

The node apparatus for use with a distributed system according to the present invention is advantageous in that, even if a token is lost by a crash of the server or by some other cause, information can be collected from the client to re-generate the token. Consequently, even after a crash of the server occurs, a resource corresponding to the token can be continuously used.

According to a yet further aspect of the present invention, there is provided a node apparatus for use with a distributed system which includes a plurality of node apparatus each including one or both of a client and a resource managing server such that a primary resource managing server and a backup resource managing server are distributed in different ones of the plurality of node apparatus, and a storage apparatus for storing checkpoints having resource management information and wherein the plurality of node apparatus and the storage apparatus are interconnected by way of a network and the client and the servers operate in accordance with a server-client model, the first-mentioned node apparatus at least including the client, the first node apparatus comprising checkpoint taking means for allowing, in ordinary operation of the distributed system, the client provided in the first node apparatus to take a checkpoint regarding a token for permitting the client to use resources managed by the primary resource managing server, storage means for storing information regarding the token taken by the checkpoint taking means in the ordinary operation of the distributed system, means for storing the checkpoint regarding the token taken by the checkpoint taking means in the ordinary operation of the distributed system into the storage apparatus, and means for sending out information regarding the token from the client to the backup resource managing server based on the checkpoint regarding the token stored in the storage means in the ordinary operation of the distributed system so as to allow, when another one of the plurality of node apparatus in which the primary resource managing server is present crashes, the backup resource managing server to collect information regarding the token by way of the client to perform recovery of the server.

Also the node apparatus for use with a distributed system according to the present invention just described is advantageous in that, even if a token is lost by a crash of the server or by some other cause, information can be collected from the client to regenerate the token. Consequently, even after a crash of the server occurs, a resource corresponding to the token can be continuously used.

According to a yet further aspect of the present invention, there is provided a storage apparatus for use with a distributed system which includes a plurality of node apparatus each including one or both of a client and a resource managing server and a storage apparatus for storing checkpoints having resource management information and wherein the plurality of node apparatus and the storage apparatus are interconnected by way of a network and the client and the storage apparatus operate in accordance with a server-client model, the storage apparatus comprising means for receiving and storing, in ordinary operation of the distributed system, checkpoints regarding resources taken by the client, and means for sending out the checkpoints to the server so as to allow, when one of the plurality of node apparatus crashes, the server to collect information regarding the resources by way of the client to perform recovery of the server.

The storage apparatus for use with a distributed system according to the present invention is advantageous in that the load to the server which is required to process requests from a large number of clients can be reduced remarkably, and consequently, the recovery processing of the server can be performed at a high speed. The storage apparatus is further advantageous in that a fault-tolerant distributed system can be constructed using the storage apparatus without increasing the load to the server.

According to a yet further aspect of the present invention, there is provided a storage apparatus for use with a distributed system which includes a plurality of node apparatus each including one or both of a client and a resource managing server such that a primary resource managing server and a backup resource managing server are distributed in different ones of the plurality of node apparatus, and a storage apparatus for storing checkpoints having resource management information and wherein the plurality of node apparatus and the storage apparatus are interconnected by way of a network and the client and the server operate in accordance with a server-client model, the storage apparatus comprising means for receiving and storing, in ordinary operation of the distributed system, information regarding tokens taken by the clients, and means for sending out the checkpoints regarding the tokens to the server so as to allow, when one of the plurality of node apparatus crashes, the server to collect information regarding the tokens by way of the clients to perform recovery of the server.

The storage apparatus for use with a distributed system according to the present invention just described is advantageous in that, even if a token is lost by a crash of the server or by some other cause, information can be collected from the client to re-generate the token. Consequently, even after a crash of the server occurs, a resource corresponding to the token can be continuously used.

According to a yet further aspect of the present invention, there is provided a recovery method for a resource managing server in a distributed system which includes a plurality of node apparatus each including one or both of a client and a resource managing server and a storage apparatus for storing checkpoints having resource management information and wherein the plurality of node apparatus and the storage apparatus are interconnected by way of a network and the client and the server operate in accordance with a server-client model, comprising the steps of the client taking, in ordinary operation of the distributed system, checkpoints regarding resources managed by the server while the server does not take the checkpoints regarding the resources and storing the thus taken checkpoints into internal storage means provided therein and the storage apparatus, and the server collecting, when one of the plurality of node apparatus crashes later, information regarding the resources by way of the clients based on the checkpoints stored in the storage means or the storage apparatus in the ordinary operation of the distributed system to perform recovery of the server.

According to a yet further aspect of the present invention, there is provided a recovery method for a resource managing server in a distributed system which includes a plurality of node apparatus each including one or both of a client and a resource managing server such that a primary resource managing server and a backup resource managing server are distributed in different ones of the plurality of node apparatus, and a storage apparatus for storing checkpoints having resource management information and wherein the plurality of node apparatus and the storage apparatus are interconnected by way of a network and the client and the server operate in accordance with a server-client model, comprising the steps of the client taking, in ordinary operation of the distributed system, checkpoints regarding resources managed by the primary resource managing server while the primary resource managing server does not take the checkpoints regarding the resources and storing the thus taken checkpoints into internal storage means provided therein and the storage apparatus, and when one of the plurality of node apparatus in which the primary resource managing server crashes later, the backup resource managing server present in another one of the plurality of node apparatus inquiring the clients for information regarding the resources managed by the server based on the checkpoints stored in the storage means or the storage apparatus in the ordinary operation of the distributed system to collect information and re-constructing an internal condition of the backup resource managing server based on the thus collected information to perform recovery of the server.

The recovery methods for a resource managing server in a distributed system according to the present invention are advantageous in that the load to the server which is required to process requests from a large number of clients can be reduced remarkably, and consequently, the recovery processing of the server can be performed at a high speed. The recovery methods are further advantageous in that a fault-tolerant distributed system can be constructed making use of any of the recovery methods without increasing the load to the server.

According to a yet further aspect of the present invention, there is provided a recovery method for a resource managing server in a distributed system which includes a plurality of node apparatus each including one or both of a client and a resource managing server such that a primary resource managing server and a backup resource managing server are distributed and a primary client and a backup client are individually distributed in different ones of the plurality of node apparatus, and a storage apparatus for storing checkpoints having resource management information and wherein the plurality of node apparatus and the storage apparatus are interconnected by way of a network and the client and the server operate in accordance with a server-client model, comprising the steps of the client taking, in ordinary operation of the distributed system, checkpoints regarding resources managed by the primary resource managing server while the primary resource managing server does not take such checkpoints and storing the thus taken checkpoints into storage means provided in the client and the storage apparatus, the backup client reading in, when one of the plurality of node apparatus in which one of the clients which is present in a node apparatus different from that one of the plurality of node apparatus in which the backup client is present and the primary resource managing server are present crashes, a checkpoint regarding a client present in the crashing node apparatus from the storage apparatus and then notifying, at a point of time when the condition regarding resources of the server recovers, the backup resource managing server of such recovery, and the backup resource managing server inquiring, upon reception of the notification of the recovery from the recovering client, the client for information regarding the resources managed by the server to collect information from the storage means in the client and re-constructing an internal condition of the backup resource managing server based on the thus collected information to perform recovery of the server.

With the recovery method for a resource managing server in a distributed system according to the present invention, each of processes upon recovery can be definitely divided into a phase in which checkpoints are read in from the storage apparatus and another phase in which the clients cooperate with each other to re-construct resource management information. Consequently, the recovery method is advantageous in that the delay time of an inquiry message for each process to re-construct resource management information can be reduced remarkably and the recovery processing can be performed efficiently by the entire distributed system.

According to a yet further aspect of the present invention, there is provided a recovery method for a resource managing server in a distributed system which includes a plurality of node apparatus each including one or both of a client and a resource managing server and a storage apparatus for storing checkpoints having resource management information and wherein the plurality of node apparatus and the storage apparatus are interconnected by way of a network and the client and the server operate in accordance with a server-client model, comprising the steps of the client taking, in ordinary operation of the distributed system, checkpoints regarding tokens for permitting the client to use resources managed by the server while the server does not take the checkpoints regarding the tokens, and storing the checkpoints into storage means provided in the client and the storage apparatus, and the server collecting, when one of the plurality of node apparatus crashes later, information regarding the tokens by way of the clients based on the checkpoints regarding the tokens stored in the storage means or the storage apparatus in the ordinary operation of the distributed system to perform recovery of the server.

According to a yet further aspect of the present invention, there is provided a recovery method for a resource managing server in a distributed system which includes a plurality of node apparatus each including one or both of a client and a resource managing server such that a primary resource managing server and a backup resource managing server are distributed in different ones of the plurality of node apparatus, and a storage apparatus for storing checkpoints having resource management information and wherein the plurality of node apparatus and the storage apparatus are interconnected by way of a network and the client and the server operate in accordance with a server-client model, comprising the steps of the client taking, in ordinary operation of the distributed system, checkpoints regarding tokens for permitting the client to use resources managed by the primary resource managing server while the primary resource managing server does not take the checkpoints regarding the tokens and storing the checkpoints regarding the tokens into storage means provided in the clients and the storage apparatus, and when one of the plurality of node apparatus in which the primary resource managing server is present crashes later, the backup resource managing server which is present in a different one of the plurality of node apparatus from the node apparatus in which the primary resource managing server is present inquiring, based on the information regarding the tokens stored in the storage means or the storage apparatus in the ordinary operation of the distributed system, the client for information regarding the tokens to collect information regarding the tokens and re-constructing an internal condition of the backup resource managing server based on the thus collected information to perform recovery of the server.

The recovery method for a resource managing server in a distributed system according to the present invention just described is advantageous in that, even if a token is lost by a crash of the server or by some other cause, information can be collected from the client to re-generate the token. Consequently, even after a crash of the server occurs, a resource corresponding to the token can be continuously used.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 19 is a diagrammatic view showing an example of token information collected by the procedure illustrated in FIG. 18;

FIG. 22 is a diagrammatic view illustrating a further concept of operation of the basic construction of the distributed system according to the second preferred embodiment of the present invention;

FIGS. 32(a) to 32(c) are tables illustrating an example of file information used in the recovery procedure of the server in the distributed system shown in FIG. 29; and FIG. 33 is a table illustrating an example of file information re-constructed by the recovery procedure of the server in the distributed system shown in FIG. 29.

DESCRIPTION OF THE PREFERRED EMBODIMENTS a. Aspects of the Invention

Figure 1A:
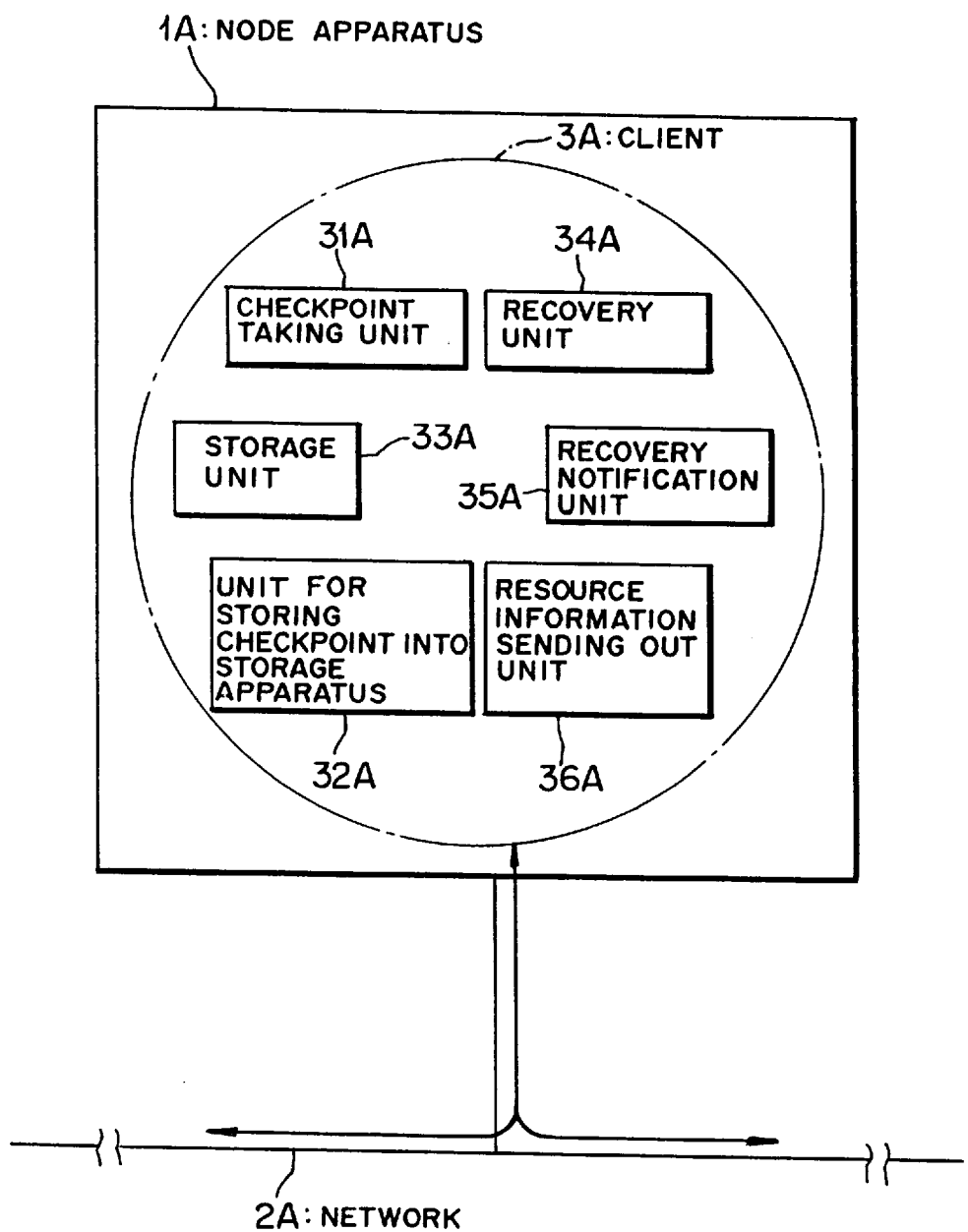
FIGS. 1(a) to 1(d) are block diagrams illustrating different aspects of the the present invention.

Referring first to FIG. 1(a), there is shown a node apparatus for use with a distributed system according to an aspect of the present invention. The node apparatus is generally denoted at 1A and includes one or both of a client 3A and a resource managing server. The distributed system includes a plurality of such node apparatus 1A and a storage apparatus (not shown) for storing checkpoints having resource management information. The node apparatus 1A and the storage apparatus are interconnected by way of a network 2A to construct the distributed system. The clients 3A and the server operate in accordance with a server-client model.

Each of the node apparatus 1A employed in the distributed system includes a checkpoint taking unit 31A for allowing, in ordinary operation of the distributed system, the client provided in the node apparatus to take a checkpoint regarding a resource managed by the server, and a unit 32A for storing the checkpoint taken by the checkpoint taking unit 31A in the ordinary operation of the distributed system into the storage apparatus. Each of the node apparatus 1A may further include a storage unit 33A for storing a checkpoint taken by the checkpoint taking unit 31A in the ordinary operation of the distributed system, and a unit (resource information sending out unit) 36A for sending out information regarding a resource from the client to the server based on the checkpoint stored in the storage unit 33A in the ordinary operation of the distributed system so as to allow, when any other one of the plurality of node apparatus crashes, the server to collect information regarding resources to perform recovery of the server.

Figure 1B:
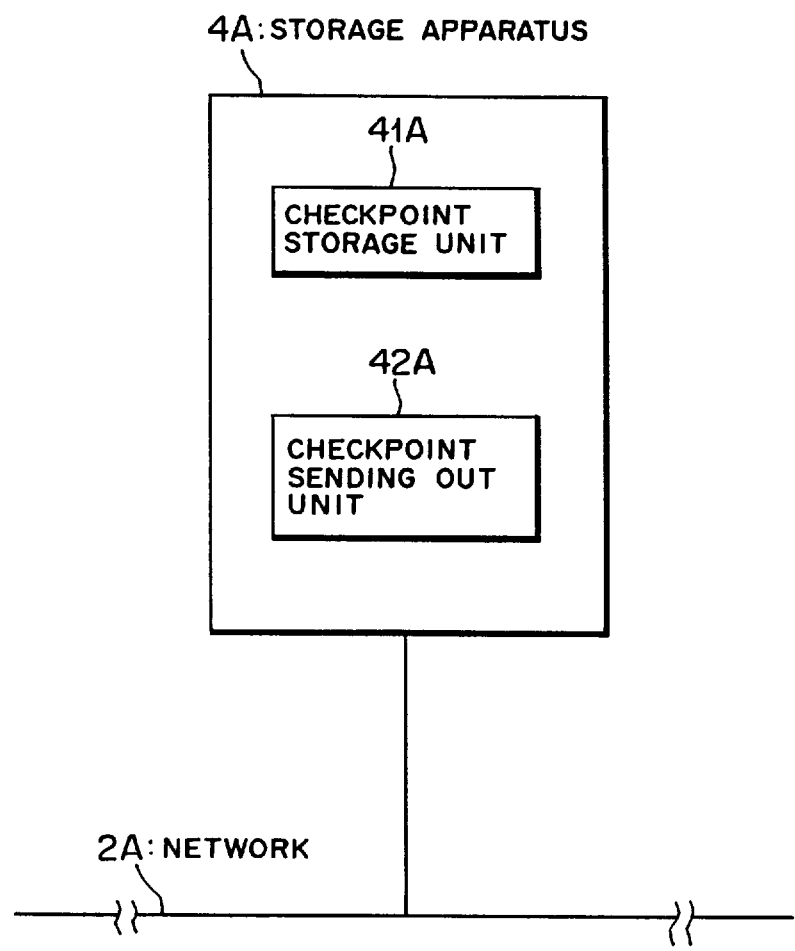

Referring to FIG. 1(b), the storage apparatus for use with the distributed system described above is generally denoted at 4A and includes a unit (checkpoint storage unit) 41A for receiving and storing, in ordinary operation of the distributed system, checkpoints regarding resources taken by the clients, and a unit (checkpoint sending out (unit) 42A for sending out the checkpoints regarding the resources to the server so as to allow, when one of the plurality of node apparatus crashes, the server to collect information regarding the resources by way of the clients to perform recovery of the server.

Referring to FIGS. 1(a) and 1(b), in the distributed system described above, in ordinary operation thereof, the server does not take checkpoints regarding resources managed by the server itself, but instead, the client in any of the node apparatus 3A takes a checkpoint regarding a resource and stores the checkpoint into the storage unit 33A in the client 3A and the storage apparatus 4A outside the node apparatus 1A. Then, when another node apparatus crashes later, the server can collect information regarding the resources by way of the clients based on checkpoints thus stored in the storage unit 33A in the client 3A or the storage apparatus 4A outside the node apparatus 1A to perform recovery.

Accordingly, the node apparatus described above is advantageous in that the load to the server which is required to process requests from a large number of clients can be reduced remarkably, and consequently, the recovery processing of the server can be performed at a high speed. The node apparatus is further advantageous in that a fault-tolerant distributed system can be constructed using the node apparatus without increasing the load to the server.

Further, according to the present invention, also where a primary resource managing server and a backup resource managing server each as the resource managing server described above are distributed in different node apparatus, each of the node apparatus 1A includes a checkpoint taking unit 31A for allowing, in ordinary operation of the distributed system, the client 3A provided in the node apparatus 1A to take a checkpoint regarding a resource managed by the server, and a unit 32A for storing the checkpoint taken by the checkpoint taking unit 31A in the ordinary operation of the distributed system into the storage apparatus 4A. Each of the node apparatus 1A may further include a storage unit 33A for storing a checkpoint taken by the checkpoint taking unit 31A in the ordinary operation of the distributed system.

Each of the node apparatus 1A further includes a unit 36A for sending out information regarding a resource from the client 3A to the backup resource managing server based on a checkpoint stored in the storage unit 33A in the ordinary operation of the distributed system so as to allow, when one of the node apparatus in which the primary resource managing server is present crashes and the client 3A (node apparatus 1A) receives an inquiry from the backup resource managing server for information regarding the resources managed by the server, the backup resource managing server to re-construct the internal condition of the backup resource managing server to perform recovery of the server.

Where the primary resource managing server and the backup resource managing server are distributed in the different node apparatus in the distributed system as described above, in ordinary operation of the distributed system, the primary resource managing server does not take checkpoints regarding resources managed by the primary server itself, but instead, the client 3A takes a checkpoint regarding a resource and stores the checkpoint into the storage unit 33A in the client 3A and the storage apparatus 4A outside the node apparatus 1A. Consequently, when one of the node apparatus in which the primary resource managing server is present crashes later, the backup resource managing server which is present in a different one of the node apparatus can inquire the client 3A for information regarding the resources managed by the server based on the checkpoint stored in the storage unit 33A in the client 3A or the storage apparatus 4A outside the node apparatus 1A to collect information and re-construct the internal condition of the backup resource managing server based on the thus collected information to perform recovery of the server.

Accordingly, the node apparatus described above is advantageous in that the load to the server which is required to process requests from a large number of clients can be reduced remarkably, and consequently, the recovery processing of the server can be performed at a high speed and the performance of the distributed system is improved remarkably. The node apparatus is further advantageous in that, since the cost required otherwise for the server to read out checkpoints from the storage apparatus 4A is not required upon takeover of the process from the primary resource managing server to the backup resource managing server, the recovery processing of the server can be performed at a high speed. The node apparatus is advantageous also in that, since a resource which has been held only by a failing client need not be re-constructed newly, the memory area to be used in the storage apparatus 4A can be reduced remarkably and the memory area of the server can be utilized effectively.

Where a primary resource managing server and a backup resource managing server are distributed and a primary client and a backup client are individually distributed in different ones of the node apparatus, each of the node apparatus 1A employed in the distributed system includes a checkpoint taking unit 31A for allowing, in ordinary operation of the distributed system, the client provided in the node apparatus to take a checkpoint regarding a resource managed by the server, a storage unit 33A for storing the checkpoint taken by the checkpoint taking unit 31A in the ordinary operation of the distributed system, a unit 32A for storing the checkpoint taken by the checkpoint taking unit 31A in the ordinary operation of the distributed system into the storage apparatus 4A, a unit (recovery unit) 34A for reading in, when a different one of the node apparatus in which a client 3A different from the backup client provided in another one of the node apparatus and the primary resource managing server are present crashes, a checkpoint regarding the client present in the crashing node apparatus from the storage apparatus 4A for the backup client to recover a condition regarding the resources of the server, a unit (restoration notification unit) 35A for notifying the backup resource managing server of the recovery, and a unit 36A for sending out information regarding a resource to the backup resource managing server based on the checkpoint stored in the storage unit 33A in the ordinary operation of the distributed system so as to allow, when the client 3A (node apparatus 1A) receives an inquiry from the backup resource managing server for information regarding the resources managed by the server after the notification of the recovery is notified by the recovery notification unit 35A, the backup resource managing server to collect information and re-construct the internal condition of the backup resource managing server based on the thus collected information to perform recovery of the server.

In the distributed system in which the node apparatus is employed, in ordinary operation of the distributed system, the primary resource managing server does not take checkpoints regarding resources managed by the primary server itself, but instead, the client 3A in the node apparatus takes a checkpoint regarding a resource and stores the checkpoint into the storage unit 33A in the client 3A and the storage apparatus 4A outside the node apparatus 1A. Consequently, when one of the node apparatus in which a client 3A different from the backup client provided in another one of the node apparatus and the primary resource managing server are present crashes, the backup client first reads in a checkpoint regarding a client present in the crashing node from the storage apparatus 4A. Then, at a point of time when the condition regarding the resources of the server recovers, such recovery is notified to the backup resource managing server. Upon reception of the notification of recovery from the client 3A during recovery, the backup resource managing server can inquire the clients for information regarding resources managed by the server to collect information based on is the checkpoint stored in the storage unit 4A in the client 3A and re-construct the internal condition of the backup server based on the thus collected information to perform recovery of the server.

Accordingly, with the node apparatus described above, each of processes upon recovery can be definitely divided into a phase in which checkpoints are read in from the storage apparatus and another phase in which the clients cooperate with each other to re-construct resource management information. Consequently, the node apparatus is advantageous in that the delay time of an inquiry message for each process to re-construct resource management information can be reduced remarkably and the recovery processing can be performed efficiently by the entire distributed system.

Any of the node apparatus described above may further comprise a unit for inhibiting, during recovery by the server, passing of information regarding resources managed by the server between the clients or/and a unit for simultaneously transmitting, upon passing of information between the clients, an incarnation number which is updated each time a crash of the server occurs.

Where the inhibition unit is provided, passing of information regarding resources managed by the server between the clients can be inhibited, during such recovery by the server as described above, so that the contents of the resources may not be varied during recovery of the server. Consequently, the node apparatus is advantageous in that the server can re-construct, based on collected information, resource management information which is consistent with the entire system to recover the system rapidly.

Where the simultaneous transmission unit is provided, an incarnation number which is updated each time a crash of the server occurs is transmitted simultaneously upon passing of information between the clients. Consequently, information regarding a resource which was going to be passed between the clients before a crash of the server and for which the incarnation number has not been updated can be detected, and the contents of the resource can be prevented from being varied during recovery of the server. In particular, at a point of time when the server inquires the clients for resource information, a message which has been transmitted to but not received by a client can be detected. Consequently, the node apparatus is advantageous in that, if the message thus detected is invalidated, then the server can construct consistent resource management information only based on the information collected from the clients upon inquiry for resource information to recover the system rapidly.

Figure 1C:
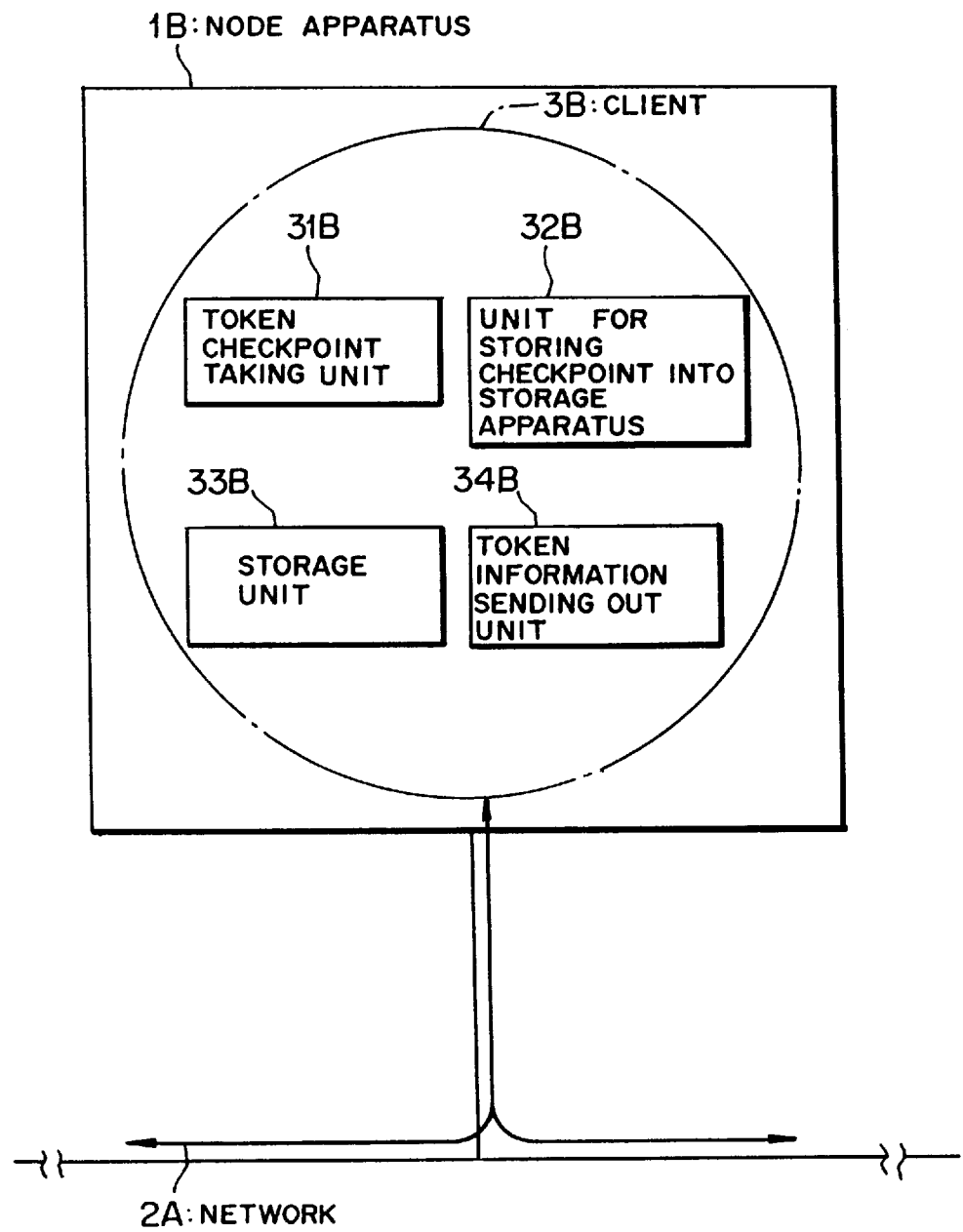
Figure 1D:
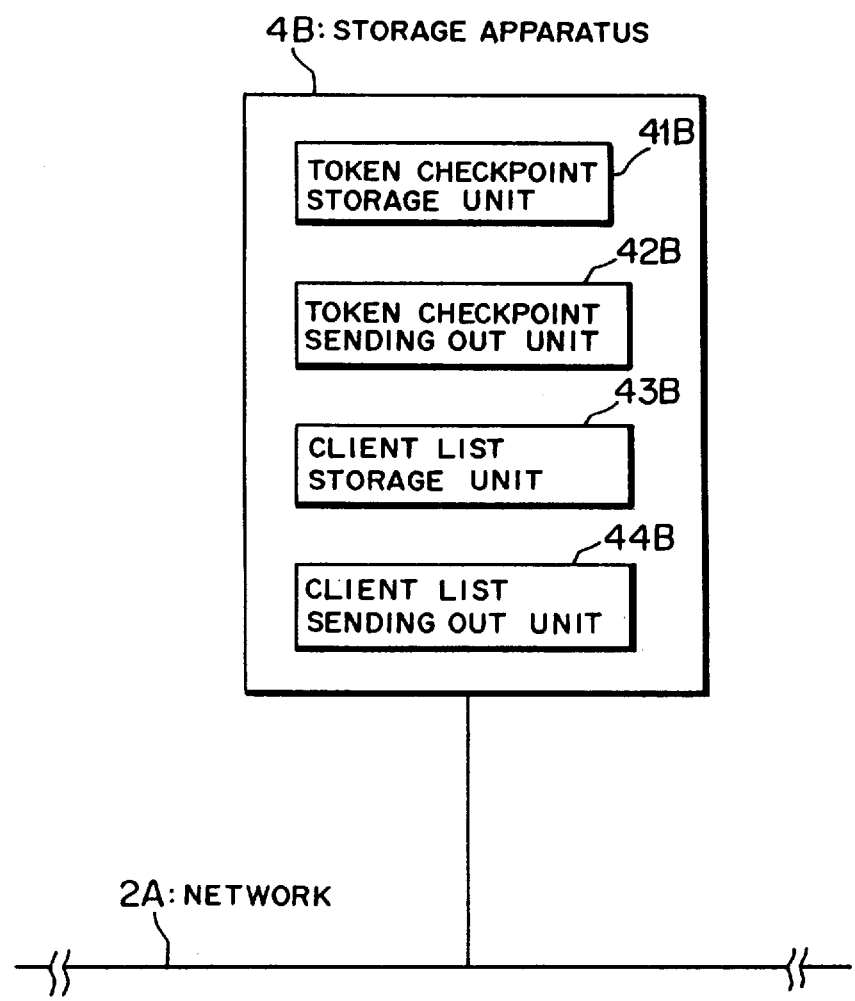

Referring now to FIG. 1(c), there is shown a node apparatus for use with a distributed system according to a different aspect of the present invention. The node apparatus is generally denoted at 1B and includes one or both of a client 3B and a resource managing server. The distributed system includes a plurality of such node apparatus 1B and such a storage apparatus 4B as shown in FIG. 1(d) for storing checkpoints having resource management information. The node apparatus 1B and the storage apparatus 4B are interconnected by way of a network 2A to construct the distributed system. The clients 3B and the server operate in accordance with a server-client model.

Each of the node apparatus 1B includes a checkpoint taking unit (token checkpoint taking unit) 31B for allowing, in ordinary operation of the distributed system, the client provided in the node apparatus 1B to take a checkpoint regarding a token for permitting the client to use resources managed by the server, and a unit 32B for storing the checkpoint regarding the token taken by the checkpoint taking unit 31B in the ordinary operation of the distributed system into the storage apparatus 4B. Each of the node apparatus 1B may further include a storage unit 33B for storing the checkpoint regarding the token taken by the checkpoint taking unit 31B in the ordinary operation of the distributed system.

Each of the node apparatus 1B further includes a unit (token information sending out unit) 34B for sending out information regarding a token from the client 3B to the server based on a checkpoint regarding the token stored in the storage unit 33B so as to allow, when any other one of the node apparatus crashes, the server to collect information by way of the client 3B to perform recovery of the server.

Referring to FIG. 1(d) the storage apparatus 4B mentioned above includes a unit (token checkpoint storage unit) 41B for receiving and storing, in ordinary operation of the distributed system checkpoints regarding the tokens taken by the clients 3B, and a unit (token checkpoint sending out unit) 42B for sending out the checkpoints regarding the tokens to the server so as to allow, when one of the plurality of node apparatus crashes, the server to collect information regarding the tokens by way of the clients 3B to perform recovery of the server.

The storage apparatus 4B may further include a unit (client list storage unit) 43B for receiving and storing a list of those of the clients which possess tokens for permitting the clients to use resources managed by the server, and a unit (client list sending out unit) 44B for sending out the list of clients so as to allow, when one of the node apparatus in which the primary resource managing server is present crashes, the backup resource managing server to inquire, based on the list of clients, only those of the clients which possess tokens for information regarding the tokens to collect information and then re-construct the internal condition of the backup resource managing server based on the thus collected information regarding the tokens to perform recovery of the server.

In the distributed apparatus in which the node apparatus described above is employed, in ordinary operation of the distributed system, the server does not take checkpoints regarding tokens for permitting the clients present in the distributed system to use resources managed by the server itself, but the client 3B in the node apparatus takes a checkpoint regarding a token. Consequently, when one of the node apparatus crashes later, the server can collect information regarding the token from the client 3B and re-construct information of the tokens managed by the server itself based on the thus collected information to perform recovery of the server.

Accordingly, the node apparatus described above is advantageous in that, even if a token is lost by a crash of the server or by some other cause, information can be collected from the client 3B to re-generate the token. Consequently, even after a crash of the server occurs, a resource corresponding to the token can be continuously used.

Also where a primary resource managing server and a backup resource managing server are distributed in different ones of the plurality of node apparatus, each of the node apparatus 1B includes a checkpoint taking unit 31B for allowing, in ordinary operation of the distributed system, the client 3B provided in the node apparatus to take a checkpoint regarding a token for permitting the client to use resources managed by the primary resource managing server, a storage unit 33B for storing information regarding the token taken by the checkpoint taking unit 31B in the ordinary operation of the distributed system, a unit 32B for storing the checkpoint regarding the token taken by the checkpoint taking unit 31B in the ordinary operation of the distributed system into the storage apparatus 4B, and a unit 34B for sending out information regarding the token from the client 3B to the backup resource managing server based on the checkpoint regarding the token stored in the storage unit 4B in the ordinary operation of the distributed system so as to allow, when another one of the node apparatus in which the primary resource managing server is present crashes, the backup resource managing server to collect information regarding the token by way of the client 3B to perform recovery of the server.

In the distributed apparatus in which the node apparatus just described is employed, in ordinary operation of the distributed system, the primary resource managing server does not take checkpoints regarding tokens for permitting the clients present to use resources managed by the the primary resource managing server, but the client 3B in the node apparatus takes a checkpoint regarding a token, and the checkpoint regarding the token is stored into the storage unit 33B in the client 3B and the storage apparatus 4B outside the node apparatus 1B. Consequently, when one of the node apparatus in which the primary resource managing server is present crashes later, the backup resource managing server which is present in a node apparatus different from the crushing node apparatus can inquire the clients for information regarding tokens based on the information regarding the token stored in the storage unit 33B or the storage unit 4B in the ordinary operation of the distributed system to collect information regarding the tokens and re-construct the internal condition of the backup resource managing server based on the thus collected information to perform recovery of the server.

Accordingly, the node apparatus described above is advantageous in that, even if a token is lost by a crash of the server or by some other cause, information can be collected from the clients to re-generate the tokens. Consequently, even after a crash of the server occurs, the resources corresponding to the tokens can be continuously used.

Each of the node apparatus 1B may further include a unit for storing, when the client 3B possesses a token in an ordinary operation of the distributed system, the client 3B as one of clients which form a list of clients possessing tokens into the storage apparatus 4B by way of the server so as to allow, upon recovery by the server, the server to collect information regarding tokens only from those clients possessing tokens to perform recovery of the server.

Consequently, in the distributed system in which the node apparatus is employed, when one of the node apparatus in which the primary resource managing server is present crashes, the backup resource managing server which is present in a different one of the node apparatus can inquire, based on the list of those clients possessing tokens which is stored in the storage apparatus 4B, only those clients which possess tokens for information regarding the tokens to collect information and re-construct the information of the tokens managed by the backup resource managing server itself based on the thus collected information to perform recovery of the server.

Accordingly, the node apparatus described above is advantageous in that, since a minimum number of necessary clients which are concerned with tokens can be specified upon recovery of the server by the server and the server need not any more issue an inquiry to all of the clients present in the distributed system to collect token information, the cost required for collection of such token information can be minimized and consequently the processing performance upon recovery by the server can be improved remarkably.

The node apparatus described above may further comprise a failure managing server for discriminating, based on the list of clients stored in the storage apparatus, whether or not the clients possessing tokens are in crash so as to allow, upon recovery by the server, the server to inquire only those of the clients which have tokens and are not in crash for information regarding the tokens.

Where the failure managing server is provided, when one of the node apparatus in which the resource managing server is present crashes, the failure managing server reads in the list of clients possessing tokens which is stored in the storage apparatus, and discriminates whether or not those clients which possess tokens are in crash. Thus, the backup resource managing server can inquire, based on the discrimination of the failure managing server, only those clients which possess tokens and are not in crash for information regarding the tokens.

Accordingly, the node apparatus is advantageous in that the cost required for collection of information regarding tokens can be suppressed with a higher degree of certainty and the processing performance upon is recovery by the server can be improved remarkably.

The node apparatus may further comprise a unit for performing processing for exclusive use for replying to an inquiry for information regarding a token from the server separately from processing which is performed in ordinary operation of the distributed system.

Where the unit for performing processing is provided, a client receiving an inquiry for information regarding a token from the server upon recovery by the server can perform the processing for exclusive use for replying to the inquiry separately from processing which is performed in ordinary operation of the distributed system. Consequently, the client can immediately reply to the inquiry. Accordingly, even if the server issues an inquiry for information regarding tokens to a large number of clients, the situation that the server stops its operation waiting replies from the clients does not occur. Consequently, such a deadlocking condition that no processing proceeds during recovery by the server can be prevented.

The node apparatus may further comprise a timer unit for setting a predetermined time in order to allow, when the server does not receive, after the server inquires the clients present in the distributed system for information regarding a token upon recovery by the server, a reply to the inquiry from one of the clients and cannot collect information regarding tokens after the predetermined time elapses after the inquiry, information regarding tokens to be collected only from those of the clients from which a reply has been received.

Where the timer unit is provided, when the server does not receive, after the server inquires a client for information regarding a token upon recovery by the server, a reply to the inquiry from the client and cannot collect information regarding a token after the predetermined time elapses after the inquiry, information regarding tokens can be collected only from those of the clients from which a reply has been received.

Consequently, even if a client present in the distributed system fails, during recovery by the server, due to a crash of a node, information of the server regarding tokens can be re-constructed based on information regarding tokens from those clients which are not in crash to perform recovery processing of the server regularly.

The node apparatus may further comprise a unit for comparing information regarding the resources managed by the server and information regarding a resource managed by the client having used the resource as a result of possession of a token in the past with each other to discriminate which information is newer with respect to time so as to allow the server, upon recovery by the sever, to update the resource information corresponding to the tokens managed by the server to latest resource information.

Where the comparison unit is provided, after information is collected by inquiring those clients which possess tokens for information regarding the tokens upon recovery by the server, information regarding resources corresponding to the tokens on the server side and information regarding a resource managed by the server and having been used by the client as a result of possession of a token in the past are compared with each other to discriminate which information is newer with respect to time. Consequently, the server can update the information regarding the resources corresponding to the tokens managed by the server to latest information based on a result of the comparison.

Accordingly, even if a token is lost upon recovery of the server, latest information can be reflected on the server by collecting information regarding resources corresponding to tokens remaining in the clients present in the distributed system.

b. First Embodiment

A first preferred embodiment of the present invention will be described below with reference to the accompanying drawings.

b-1. Basic Constructions of the First Embodiment

Figure 1E:
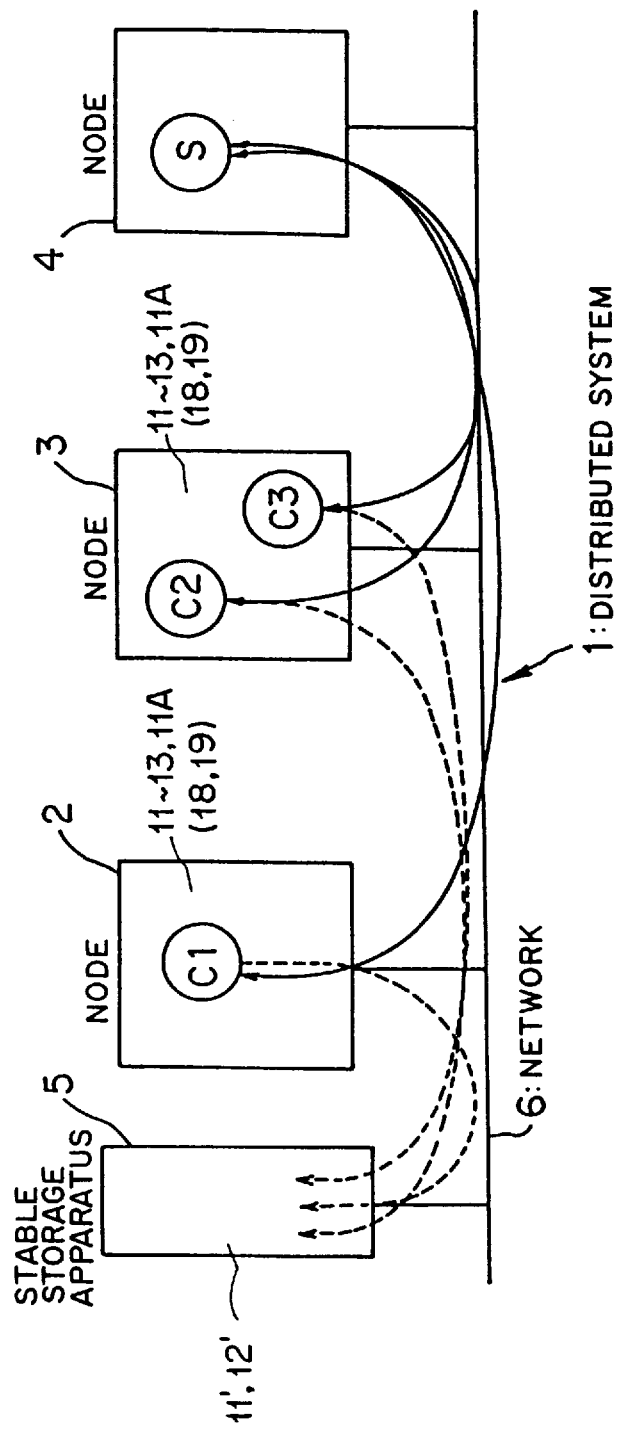
FIG. 1(e) is a block diagram showing a basic construction of a distributed system according to a first preferred embodiment of the present invention.

FIG. 1(e) is a block diagram showing a basic construction of a distributed system according to the first preferred embodiment of the present invention. Referring to FIG. 1(e), the distributed system shown is generally denoted at 1 and includes a plurality of (three in the system shown) nodes (node apparatus) 2, 3 and 4, a stable storage apparatus (non-volatile storage apparatus) 5, and a network 6. A client C1 is provided in the inside of the node 2 while clients C2 and C3 are provided in the inside of the node 3. Further, a server serving as a resource managing server is provided in the inside of the node 4.

The stable storage apparatus 5 stores contents (checkpoints) of information regarding resources such as files. The nodes 2, 3 and 4 and the stable storage apparatus 5 are connected to each other by way of the network 6, and the clients C1, C2 and C3 and the server individually operate in accordance with a server-client model.

In the present distributed system 1, in ordinary operation, the server S does not take a checkpoint regarding a resource managed by the server S itself, but any of the clients C1, C2 and C3 takes the checkpoint regarding the resource and can store the checkpoint into the stable storage apparatus 5.

The processing just described will be described in more detail with reference to the sequence diagram (steps A1 to A5) shown in FIG. 2. It is to be noted that a process of the client C1 is operating on the node 2; processes of the clients C2 and C3 are operating on the node 3; and a process of the server S is operating on the node 4.

First, any of the clients C1, C2 and C3 sends a request for processing for a resource managed by the server S to the server S by way of the network 6 along a respective route indicated by an arrow mark of a solid line in FIG. 1(e) (step A1). Upon reception of the request for processing, the server S performs operation of the resource managed by the server S (such as production, unlocking of the resource or the like) (step A2), and sends back a result of the processing to the client C1, C2 or C3 from which the request for processing has been originated (step A3).

Upon reception of the result of processing from the server S, the client C1, C2 or C3 records the result of processing (step A4) and sends a checkpoint to the stable storage apparatus 5 by way of another route indicated by a broken line in FIG. 1(e), and the stable storage apparatus 5 thus stores the checkpoint (step A5).

In short, in the distributed system 1 described above, in ordinary operation, the server S does not take a checkpoint regarding a resource managed by the server S itself, but any of the client C1, C2 or C3 takes the checkpoint regarding the resource and stores the checkpoint into the stable storage apparatus S.

Then, if it is assumed that a server (not shown) is present, for example, on the node 2 and the node 2 fails (crashes) after the checkpoint has been stored into the stable storage apparatus 5 as described above then in this instance, the server S on the node 4 does not read in checkpoints stored in the stable storage apparatus 5 to collect information regarding the resources, but collects information regarding the resources by way of any other client than the client C1 of the crashing node 2, that is, by way of the client C2 or the client C3 on the node 3 to recover the server on the node 2.

In this instance, the node 3 has a checkpoint taking unit 11 for allowing, in ordinary operation of the distributed system, each of the clients C2 and C3 provided in the node 3 to take a checkpoint regarding a resource managed by the server S, a storage unit (such as a memory) 11A for storing the checkpoint taken by the checkpoint taking unit 11, and a unit 12 for storing the checkpoint taken by the checkpoint taking unit 11 into the stable storage apparatus 5. The node 3 further includes a unit 13 for sending out information regarding a resource from the client C2 or C3 to the server S based on the checkpoint stored in the storage unit 11A so as to allow, when the node 2 different from the node 3 crashes, the server S to collect information regarding resources to perform recovery of the server S.

Also the node 2 has the units 11 to 13 and 11A described above, and when the node 3 crashes, the node 2 sends out information regarding a resource from the client C1 to the server S by the unit 13 described above.

Each of the nodes 2 and 3 shown in FIG. 1(e) has further units 18 and 19, which will be hereinafter described with reference to FIGS. 7 to 10.

Further, in this instance, the stable storage apparatus 5 includes a unit 11' for receiving and storing, in ordinary operation of the distributed system, checkpoints regarding resources taken by the clients, and another unit 12' for sending out the checkpoints to the server S so as to allow, when one of the plurality of nodes 2 to 4 (in the foregoing description, the node 2 or 3) crashes, the server S to collect information regarding the resources by way of the clients C1 to C3 to perform recovery of the server S.

As described above, since a checkpoint regarding a resource manged by the resource managing server S itself is not taken in the process of the server S but is taken in the process of the client C1, C2 or C3 which uses the resource, the load to the server which is required to process requests from a large number of clients can be reduced remarkably, and consequently, even if the server crashes, recovery of the server can be performed at a high speed.

Further, a fault-tolerant system (system which can continue its operation without stopping the operation even if a failure occurs) can be constructed without increasing the load to a server.

Figure 3:
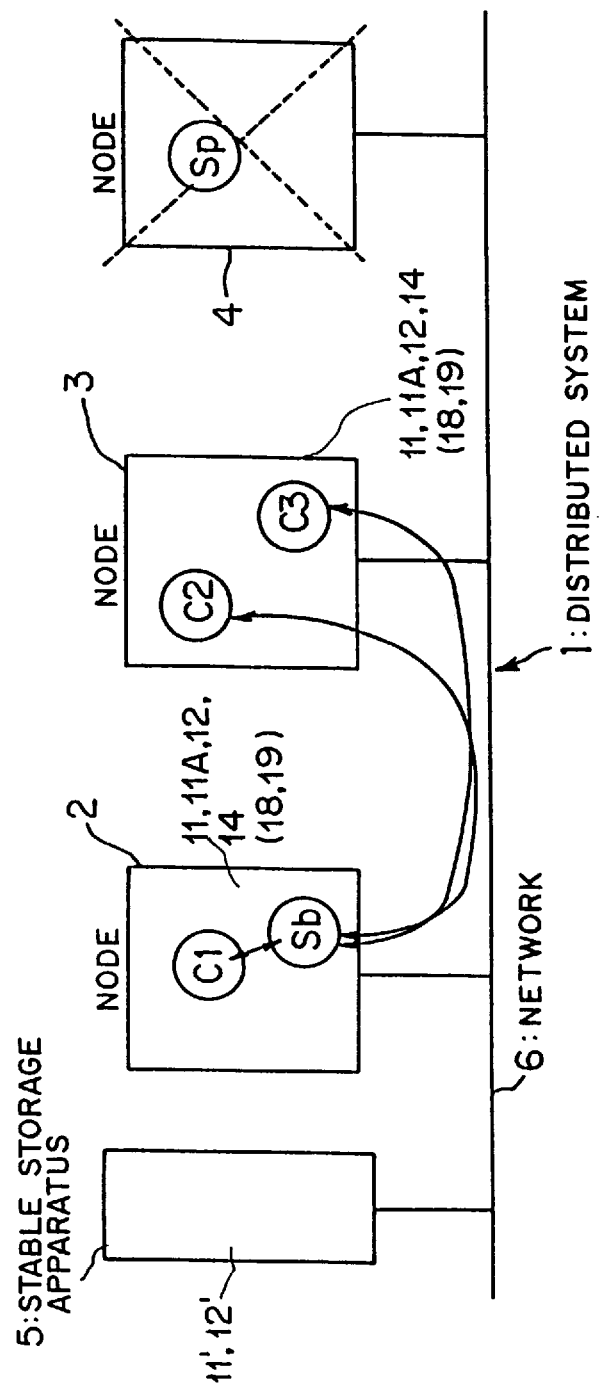
FIG. 3 is a block diagram showing another basic construction of the distributed system according to the first preferred embodiment of the present invention.

Referring now to FIG. 3, there is shown in block diagram another basic construction of the distributed system according to the first preferred embodiment of the present invention. The distributed system shown is generally denoted at 1 and includes, similarly to the distributed system shown in FIG. 1(e), a node 2 having a client C1, another node 3 having clients C2 and C3, a further node 4 having a resource managing primary server Sp for managing resources such as files, and a stable storage apparatus (storage apparatus) 5 for storing checkpoints of resource management information. A backup server Sb serving as a backup server for the primary server Sp is provided in the node 2 which is different from the node 4 which has the primary server Sp.

Also in the distributed system 1 shown in FIG. 3, the nodes 2, 3 and 4 and the stable storage apparatus 5 are connected to each other by way of a network 6, and each of the clients C1, C2 and C3 and the servers Sp and Sb operates in accordance with a server-client model.

Figure 2:
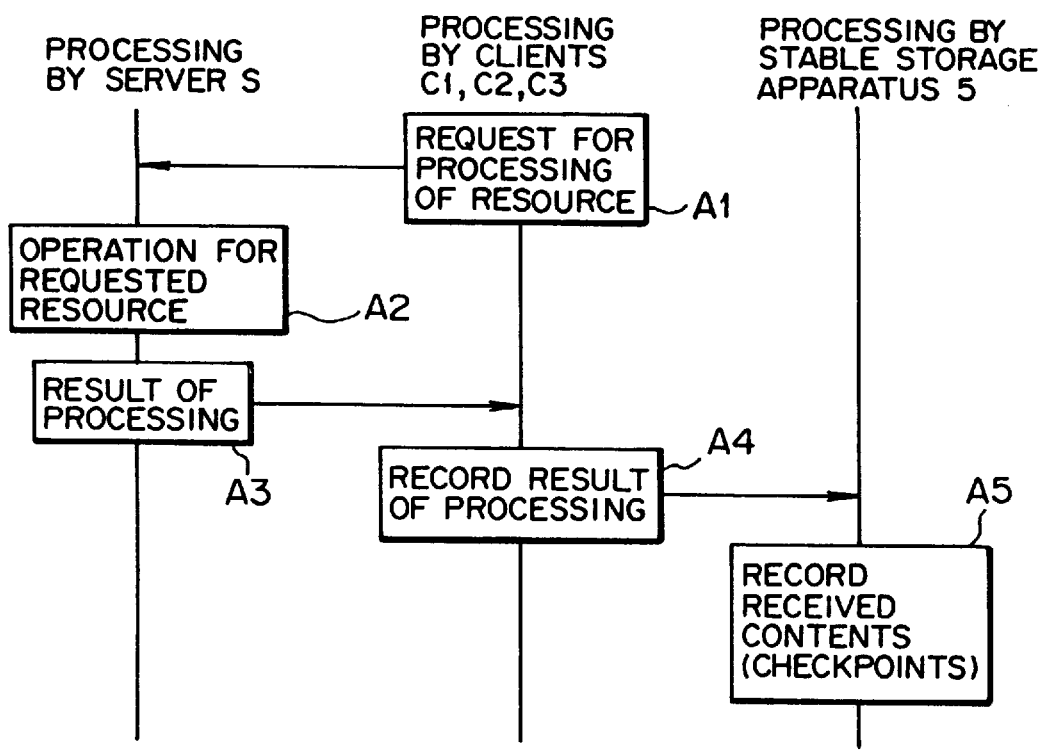
FIG. 2 is a sequence diagram illustrating a recovery method for a resource managing server of the distributed system shown in FIG. 1(e)

Further, also in the distributed system 1, in ordinary operation, processing similar to the processing (steps A1 to A5) described hereinabove with reference to FIG. 2 is performed.

In particular, the server Sp does not take checkpoints regarding resources managed by the server Sp itself, but instead, any of the clients C1, C2 and C3 takes a checkpoint regarding a resource and stores the checkpoint into the stable storage apparatus 5.

Figure 4:
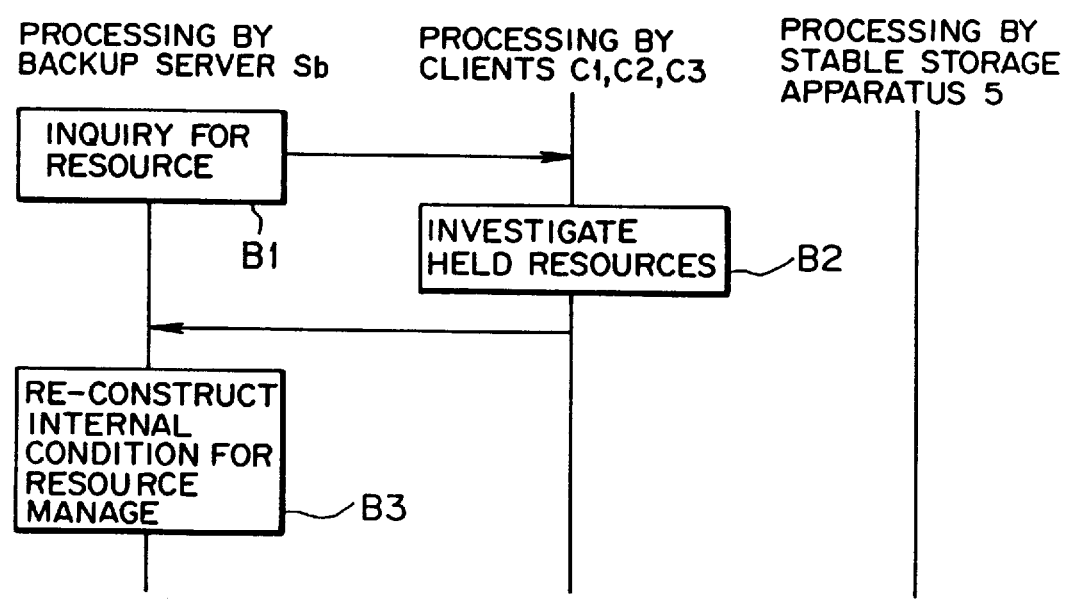
FIG. 4 is a sequence diagram illustrating a recovery method for the resource managing server of the distributed system shown in FIG. 3.

Here, a recovery method for a server when the node 4 in which the primary server Sp is present crashes after a checkpoint regarding a resource has been stored into the stable storage apparatus 5 as described above will be described in detail with reference to the sequence diagram (steps B1 to B3) shown in FIG. 4.

Now, if it is assumed that the node 4 in which the primary server Sp which is performing processing is provided crashes in the distributed system 1, then the backup server Sb issues an inquiry for a resource to all processes (processes which operate on the clients C1, C2 and C3), which relate to the backup server Sb itself, along routes indicated by solid lines in FIG. 3 (step B1). Each of the clients C1, C2 and C3 having received the inquiry investigates information of resources possessed by it (step B2).

Then, the clients C1, C2 and C3 individually send the information of the resources possessed by them to the backup server Sb along routes indicated by the arrow marks of solid lines in FIG. 3. The backup server Sb thus collects the resource information and re-constructs the internal condition for resource management (step B3) to take over the process of the primary server Sp to perform recovery of the server.

In particular, when the node 4 in which the primary server Sp is present crashes, the backup server Sb which is present in the different node 2 inquires the clients C1, C2 and C3 for information regarding resources to collect information and re-constructs the internal condition of the backup server Sb based on the thus collected information to recover the server (primary server Sp).

Accordingly, also in this instance, the node 2 or 3 has the checkpoint taking unit 11 for allowing, in ordinary operation of the distributed system, each of the clients C1 to C3 to take a checkpoint regarding a resource managed by the primary server Sp, the storage unit (such as a memory) 11A for storing the checkpoint taken by the checkpoint taking unit 11, and the unit 12 for storing the checkpoint taken by the checkpoint taking unit 11 into the stable storage apparatus 5. The node 2 or 3 further includes a unit 14 for sending out information regarding a resource from each of the clients C1 to C3 to the backup server Sb based on the checkpoint stored in the storage unit 11A so as to allow, when the other node 4 in which the primary server Sp is present crashes and the node 2 or 3 receives an inquiry from the backup server Sb for information regarding the resources, the backup server Sb to re-construct the internal condition of the backup server Sb to perform recovery of the primary server Sp. Also in this instance, the stable storage apparatus 5 has the units 11' and 12' described hereinabove.

As described above, when the primary server Sp is put into a non-functioning or disabled condition as a result of a crash of the node 4, the backup server Sb inquires those of the clients C1, C2 and C3 which are not in failure, and re-constructs the internal condition of the backup server Sb based on a result of the inquiry so that the entire system may operate without inconsistency. Consequently, information regarding resources possessed only on the crashing node 4 is not re-constructed newly, and consequently, the memory area for resource management of the server can be reduced remarkably.

Further, in ordinary operation of the distributed system 1, the primary server Sp need not take checkpoints regarding resources as described above. Consequently, the primary server Sp can be made fault-tolerant while reducing the load to the current operating server Sp. Further, since, upon takeover of processing from the primary server Sp to the backup server Sb, the cost is not required for the backup server Sb to read out checkpoints from the stable storage apparatus 5, the system can be restored quickly from a trouble such as a crash of a node.

Figure 5:
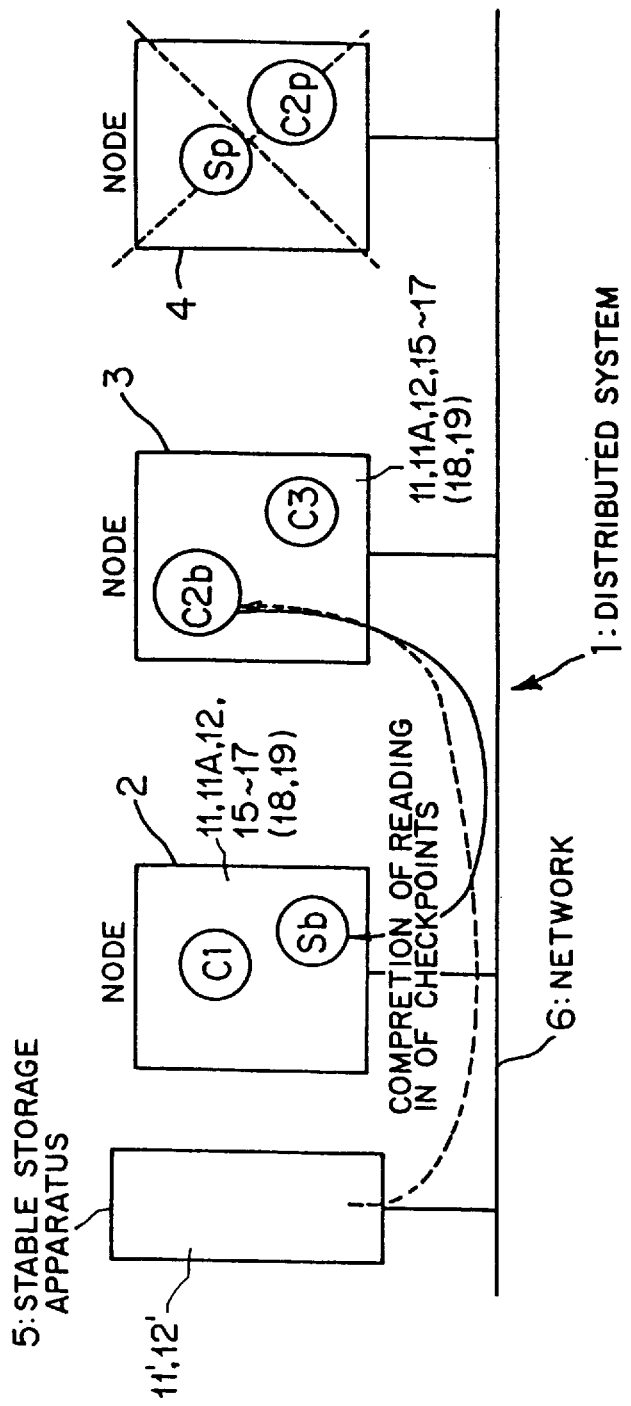
FIG. 5 is a block diagram showing a further basic construction of the distributed system according to the first preferred embodiment of the present invention.

FIG. 5 shows in block diagram of a further basic construction of the distributed system according to the first preferred embodiment of the present invention. Referring to FIG. 5, the distributed system shown is generally denoted at 1 and includes nodes 2, 3 and 4 and a stable storage apparatus 5 connected to each other by way of a network 6.

A backup server Sb and a client C1 are provided in the inside of the node 2, and a backup client C2b and another client C3 are provided in the inside of the node 3. Further, a primary server Sp and a primary client C2p are provided in the inside of the node 4.

The clients C1 and C3, the backup client C2b, the primary client C2p, the backup server Sb and the primary server Sp operate in accordance with a server-client model. In ordinary operation of the distributed system 1, processing similar to that at steps A1 to A5 described hereinabove with reference to FIG. 2 is performed.

In particular, also in ordinary operation of the present distributed system 1, the primary server Sp does not take checkpoints regarding resources managed by the primary server Sp itself, but instead, the clients C1 and C3 and the primary client C2p take checkpoints regarding the resources, and the checkpoints are stored into the stable storage apparatus 5.

Then, after the checkpoints regarding the resources are stored into the stable storage apparatus 5 as described above in ordinary operation of the distributed system 1, if, for example, the node 4 crashes, in the distributed system 1 shown in FIG. 5, the backup client C2b recovers the condition regarding the resources of the crashing primary server Sp and notifies the backup server Sb of such recovery. Thereafter, the backup server Sb collects resource information to recover the server.

Figure 6:
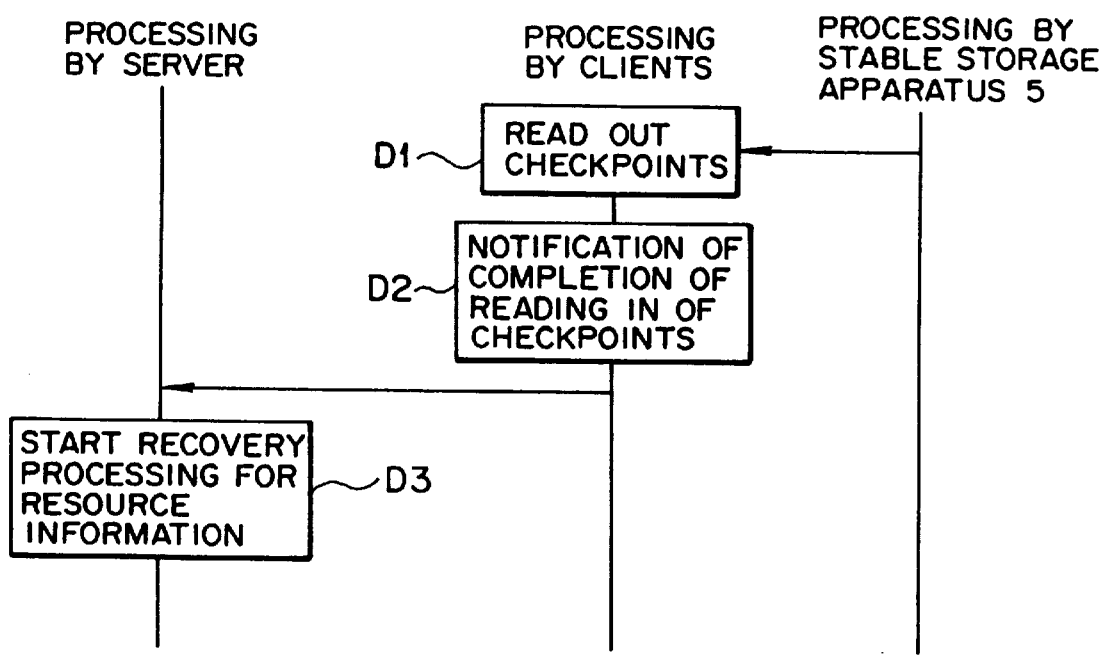
FIG. 6 is a sequence diagram illustrating a recovery method for the resource managing server of the distributed system shown in FIG. 5.

The processing just described will be described in more detail with reference to the sequence diagram (steps D1 to D3) shown in FIG. 6.

First, if the node 4 in which the primary server Sp and the primary client C2p are present crashes, then the backup client C2b reads in a checkpoint regarding the primary client C2p present in the crashing node 4 from the stable storage apparatus 5 along a route indicated by an arrow mark of a solid line in FIG. 5 (step D1), and recovers the condition regarding the resources of the primary server Sp of the crashing node 4. Then, at a point of time when such recovery is completed, the backup client C2b notifies the backup server Sb of completion of reading in of the checkpoints along the route indicated by the solid line in FIG. 5 (step D2).

Then, the backup server Sb starts recovery processing for the resource information at a point of time when the notification of completion of reading in of the checkpoint is received (step D3).

The recovery processing of the resource information at step D3 is similar to the processing performed at steps B1 to B3 described hereinabove with reference to FIG. 4. In particular, the backup server Sb inquires the clients C1 and C3 and the backup client C2b for information regarding the resources managed by the server to collect information, and re-constructs the internal condition of the backup server Sb based on the thus collected information. Thereafter, the backup server Sb takes over the process of the primary server Sp to recover the server.

In short, in the distributed system 1 shown in FIG. 5, when the node 4 in which the primary client C2p with respect to which the backup client C2b serves as a client in a backup condition and the primary server Sp are present crashes, the backup client C2b first reads in a checkpoint regarding the primary client C2p which is present in the crashing node 4 from the stable storage apparatus 5 and then notifies the backup server Sb, at a point of time when the condition regarding resources of the primary server Sp recovers, of such recovery. When the notification of the recovery from the backup client C2b being recovered is received, the backup server Sb inquires the clients C1 and C3 and the backup client C2b for information regarding resources managed by the server to collect information, and re-constructs the internal condition of the backup server Sb based on the thus collected information to recover the server.

Accordingly, also in this instance, the node 3 has the checkpoint taking unit 11 for allowing, in ordinary operation of the distributed system, each of the clients C2b and C3 to take a checkpoint regarding a resource managed by the primary server Sp, the storage unit (such as a memory) 11A for storing the checkpoint taken by the checkpoint taking unit 11 in the ordinary operation of the distributed system, and the unit 12 for storing the checkpoint taken by the checkpoint taking unit 11 into the stable storage apparatus 5 in the ordinary operation of the distributed system. The node 3 further has a unit 15 for reading in, when the other node 4 in which the primary client C2p and the primary server Sp are present different from the node 3 in which the backup server Sp is present crashes, a checkpoint regarding the primary client C2p present in the crashing node 4 from the stable storage apparatus 5 for the backup client C2b to recover a condition regarding the resources of the server, a unit 16 for notifying the backup server Sb of the recovery, and a unit 17 for sending out information regarding a resource of the primary server Sp based on the checkpoint stored in the storage unit 11A in the ordinary operation of the distributed system so as to allow, when the node 3 receives an inquiry from the backup server Sb for information regarding the resources of the clients C2b and C3, the backup server Sb to collect information and re-construct the internal condition of the backup server Sb based on the thus collected information to perform recovery of the server.

Also where the backup client C2b is present on the node 2, the node 2 similarly has the units 11, 11A, 12 and 15 to 17 described above. Further, the stable storage apparatus 5 also in this instance has the units 11' and 12' described hereinabove.

Since the phase (stage) of recovery processing when the node 4 in which the primary server Sp and the primary client C2p are present crashes is definitely divided into two phases including a phase in which the backup client C2b reads in a checkpoint from the stable storage apparatus 5 and the other phase in which the backup server Sb and the backup client C2b cooperate with each other between processes to re-construct resource management information as described above, when resource management information is to be re-constructed, the delay time of an inquiry message to the clients C1 and C3 and the backup client C2b can be reduced, and consequently, the recovery processing for the resource managing server can be performed efficiently.

Further, in any of the distributed systems 1 described hereinabove with reference to FIGS. 1(e), 3 and 5, when the server S or the backup server Sb is performing recovery processing as described above, passing of information regarding a resource managed by the server between the clients C1, C2 and C3 and the backup client C2b can be inhibited.

Figure 7:
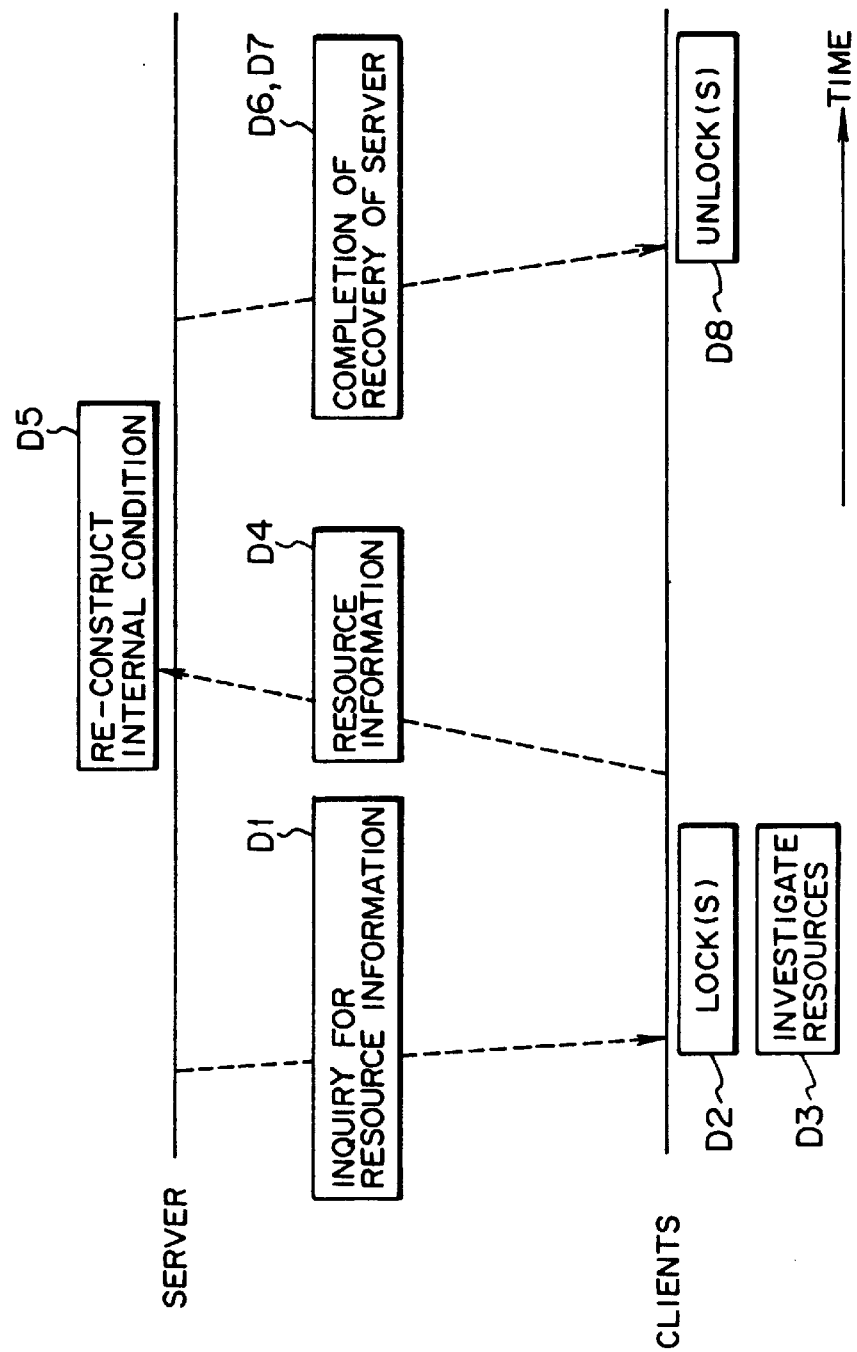
FIGS. 7 and 8 are sequence diagrams illustrating a procedure when passing of information between clients is inhibited in the distributed systems shown in FIGS. 1, 3 and 5.
Figure 8:
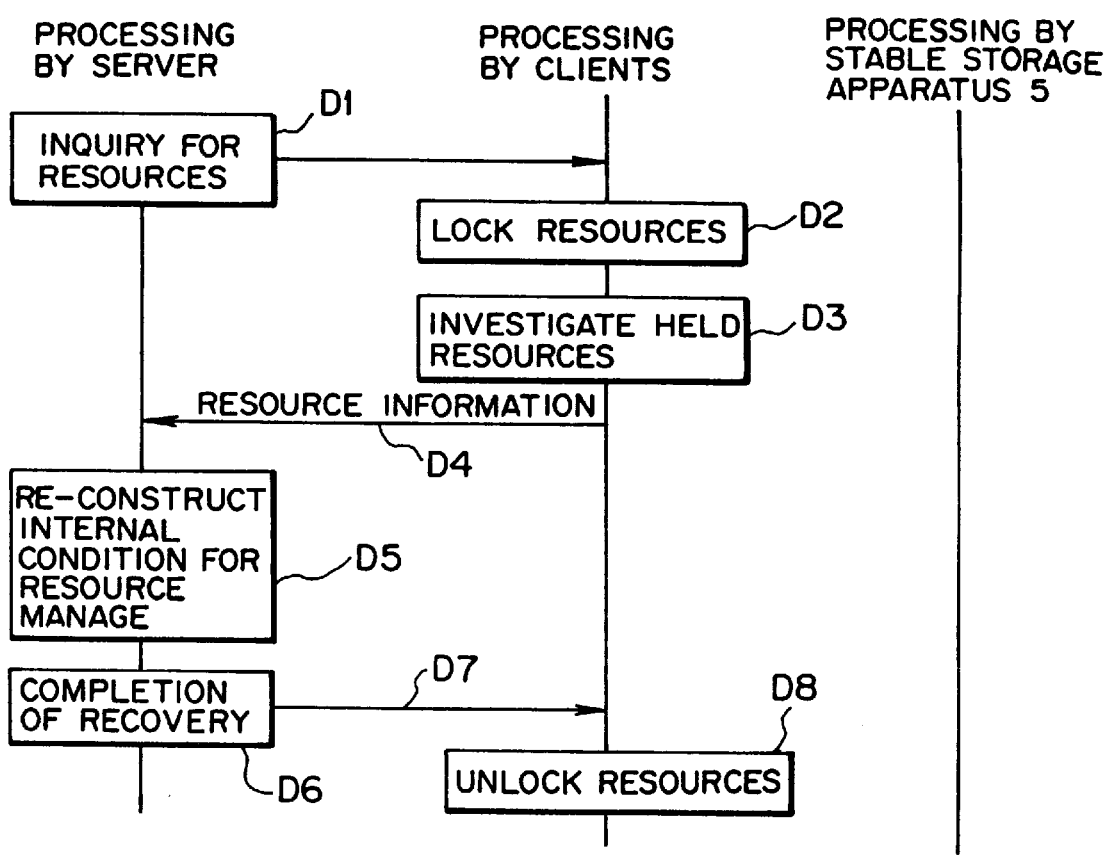

The processing in this instance will be described in detail with reference to sequence diagrams (steps D1 to D5) shown in FIGS. 7 and 8. It is to be noted that, for convenience of description, the client C1, C2 or C3 or the backup client C2b or the backup server Sb will be referred to merely as client or server only in the description of the present processing.

First, when recovery of the server is being performed, the server sends an inquiry message for resource information to a client (step D1). The client having received the message locks the resource (resource information) received from the server (step D2).

Then, the client investigates contents of resource information possessed by the client itself (step D3) and sends back the resource information to the server (step D4). The server thus re-constructs the internal condition for resource management based on the resource information (step D5) and completes the recovery processing of the server (step D6).

Further, the server notifies the client of completion of the recovery (step D7). Upon reception of the notification of completion of recovery, the client unlocks (recovers) the resources of the server (step D8) thereby to permit passing of the resources between clients.

In this instance, the node 2 or 3 has a unit 18 for inhibiting, during recovery by the server, passing of information regarding resources managed by the server between the clients C1, C2, C3 and the backup client C2b.

Since passing of resources between clients is stopped (inhibited) after the server issues an inquiry for resource information upon recovery by the server, information for which the server has inquired does not vary during recovery of the server. Consequently, the server can re-construct resource management information which is not inconsistent with the entire distributed system only by re-constructing the internal condition of the server in accordance with collected information.

It is to be noted that, in each of the distributed system 1 shown in FIGS. 1(e), 3 and 5, when the server S or the backup server Sb crashes, an incarnation number which is updated each time a crash of the server occurs is transmitted simultaneously with passing of resource information between any of the clients C1, C2 and C3 and the backup client C2b, and the incarnation number is held by the backup server Sb and is incremented each time takeover of the server occurs due to a crash of a node. Further, the thus incremented incarnation number is stored also into the clients C1 and C2.

Figure 9:
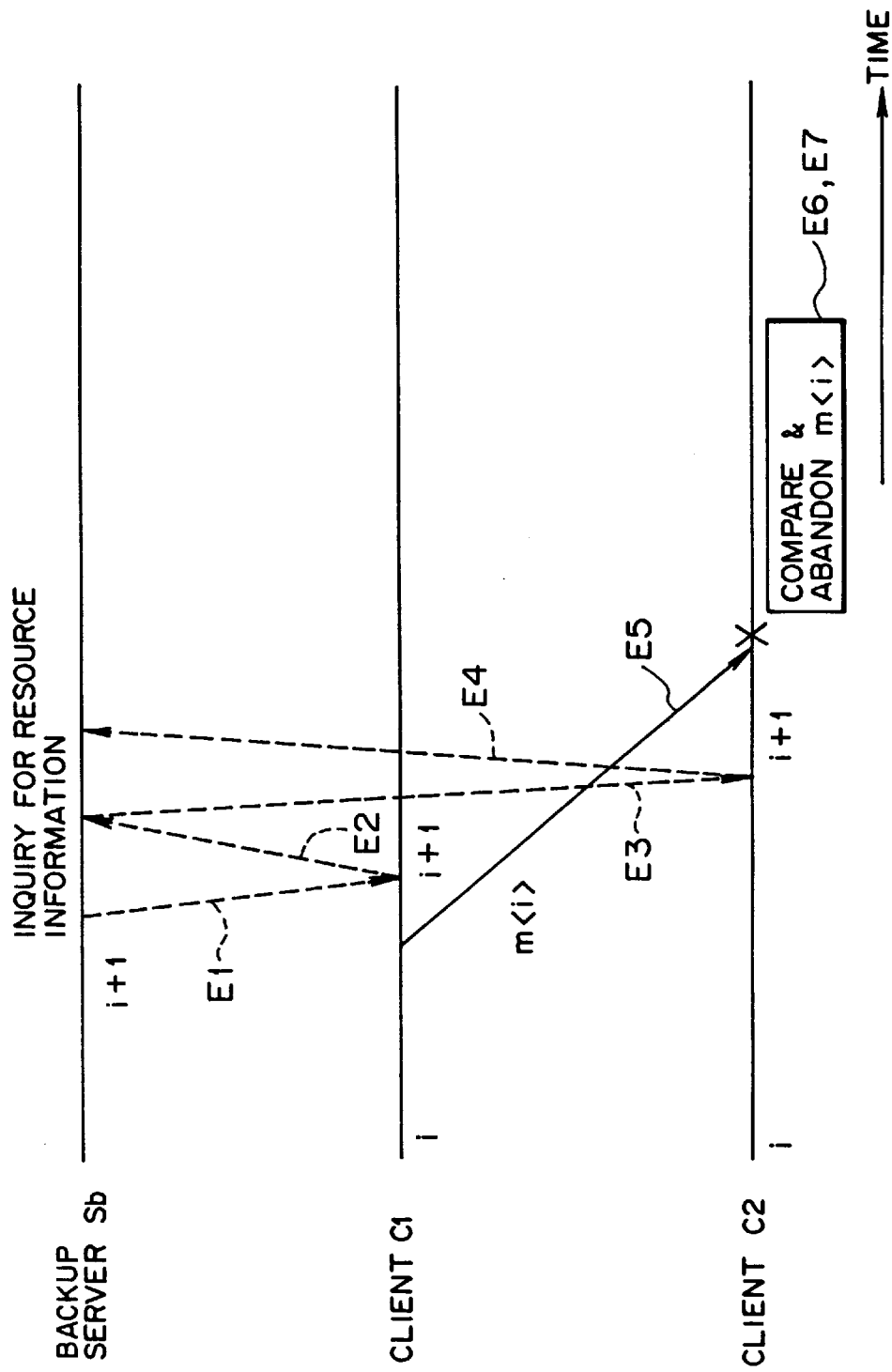
FIGS. 9 and 10 are sequence diagrams illustrating a procedure when an incarnation number is transmitted simultaneously with passing of information between clients in the distributed systems shown in FIGS. 1, 3 and 5.
Figure 10:
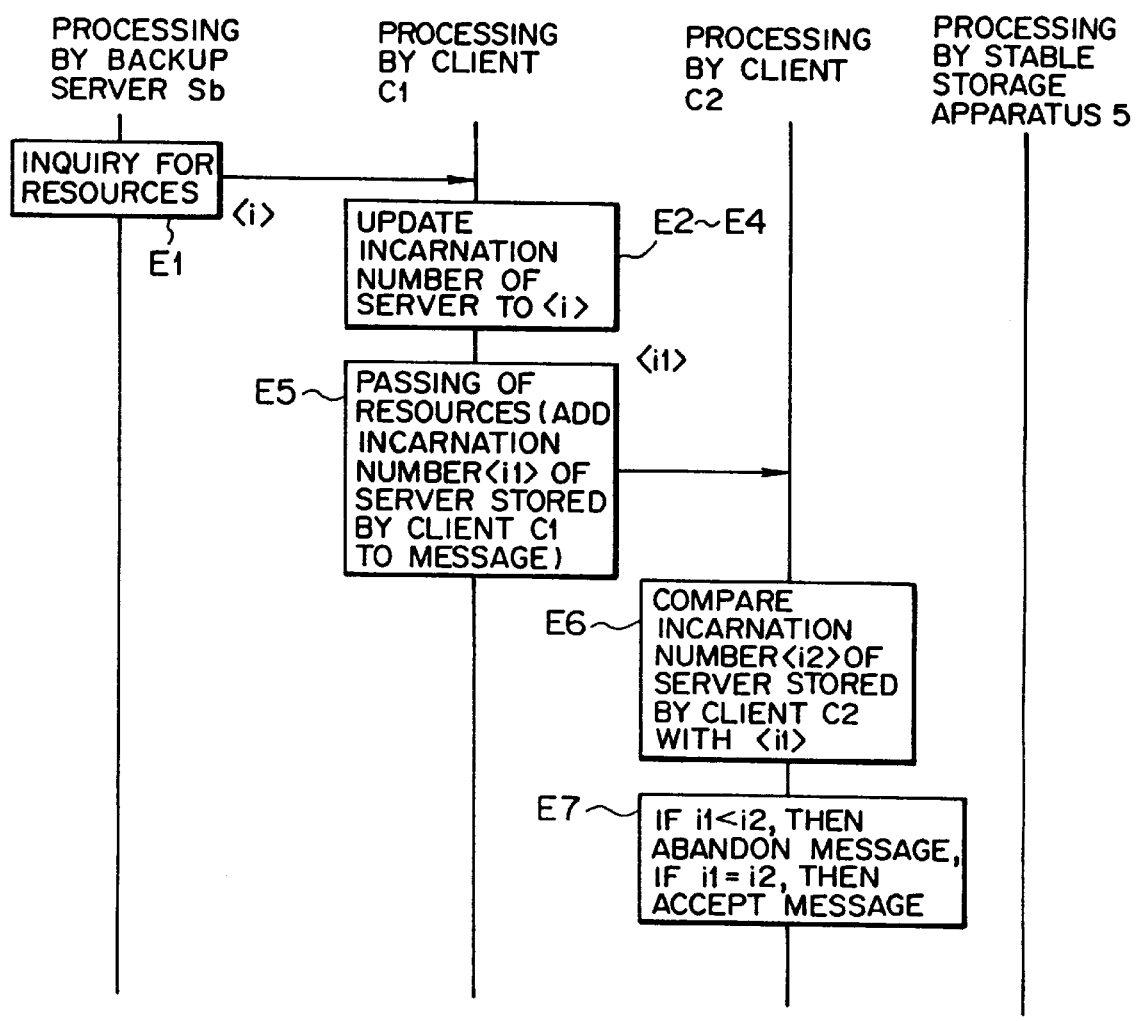

Then, as seen from FIGS. 9 and 10, when the backup server Sb first inquires the client C1 for resource information, it transmits the incarnation number "i+1" (i is 0, 1, 2, . . . ) simultaneously (step E1). The client C1 adds the incarnation number to a message for passing of a resource and transmits it together with the message to the backup server Sb (step E2).

Further, the backup server Sb transmits, when it inquires the client C2 for resource information, the incarnation number "i+1" simultaneously (step E3). The client C2 thus adds the incarnation number "i+1" to a message for passing of a resource and transmits it together with the message to the backup server Sb (step E4).

Here, if a message m<i> requesting transfer of resource information has been transmitted to the client C2 before a crash of a node occurs and takeover (recovery) of the server to the backup server Sb is performed, then when the message m<i> is received (step E5), the client C2 compares the incarnation number "i+1" (<i2> in FIG. 10) stored therein with the incarnation number "i" (<i1> in FIG. 10) added to the message m<i> (step E6).

If the comparison proves coincidence between the incarnation numbers, then the client C2 accepts the message m<i> normally. However, since the incarnation number stored in the client C2 and the incarnation number added to the message m<i> are now different from each other like "i+1"≠"i" (<i2>≠<i1>), the client C2 abandons the message m<i> (step E7).

In this instance, the node 2 or 3 has a unit 19 for simultaneously transmitting, upon passing of information between the clients C1, C2, C3 and the backup client C2b, an incarnation number which is updated each time a crash of the server occurs. Consequently, if a message requesting transfer of resource information has been transmitted before recovery of the server is started, the message is abandoned during recovery of the server thereby to prevent resource information of a client from being varied during recovery of the server.

In this manner, by adding an incarnation number to a message for passing of resource information, at a time when the backup server Sb inquires the client C1 or the client C2 for resource information, a message m<i> which has been transmitted but not received can be detected, and by invalidating the message, the backup server Sb can construct consistent resource management information based only on information collected from the clients C1 and C2 upon inquiry for resource information.

b-2. Detailed Construction of the First Embodiment

Figure 11:
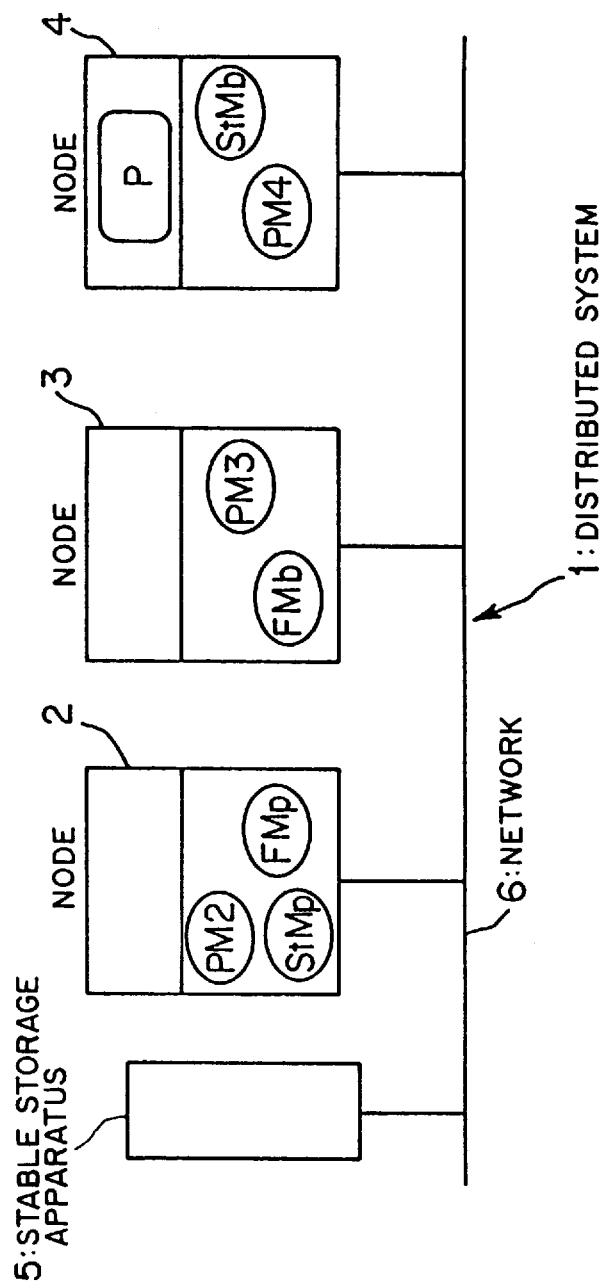
FIGS. 11 to 14 are block diagrams showing a detailed construction of the distributed system according to the first preferred embodiment of the present invention.

FIG. 11 shows a detailed construction of the distributed system according to the first preferred embodiment of the present invention. Referring to FIG. 11, the distributed system shown is generally denoted at 1 and includes a plurality of nodes (node apparatus for use with a distributed system) 2 to 4, a stable storage apparatus (storage apparatus) 5 for storing checkpoints having resource management information, and a network 6 by way of which the nodes 2, 3 and 4 and the stable storage apparatus 5 are connected to each other.

Each of the nodes 2 to 4 includes a CPU (central processing unit), a main storage apparatus and a secondary storage apparatus all not shown and can access any other node by way of the network 6.

The stable storage apparatus 5 is formed as a non-volatile storage apparatus which can be accessed from any of the nodes 2 to 4 by way of the network 6, and accordingly, in the present embodiment, whichever node fails, the contents of it are not destroyed. The stable storage apparatus 5 may be constructed from either of software and hardware, and where it is constructed from software, it can be placed on the nodes 2 to 4.

Further, in the distributed system 1, a process manager (client) PM2, a primary file manager (primary server) FMp and a primary stream manager (primary client) StMp are provided on the node 2.

Meanwhile, a process manager (client) PM3 and a backup file manager (backup server) FMb are provided on the node 3, and an application program P, a process manager (client) PM4 and a backup stream manager (backup client) StMb are provided on the node 4.

An operating system (OS) is operating on each of the nodes 2, 3 and 4. The OS is realized as an aggregate of a plurality of processes divided for individual functions.

Here, the process managers PM2, PM3 and PM4 are present on the nodes 2, 3 and 4, respectively, as described above and accept a request from the application program P on the node 4. The primary file manager FMp and the backup file manager FMb management files, and the primary stream manager StMp and the backup stream manager StMb management streams.

In the present distributed system 1, in ordinary operation, similar processing to that at steps A1 to A5 described hereinabove with reference to FIG. 2 is performed. In particular, the primary file manager FMp which serves as a server does not take checkpoints regarding resources managed by the primary file manager FMp itself, but instead, the process managers PM2, PM3 and PM4, the primary stream manager StMp and the backup stream manager StMb which act as clients take the checkpoints regarding the resources, and the checkpoints are stored into the stable storage apparatus 5.

Figure 12:
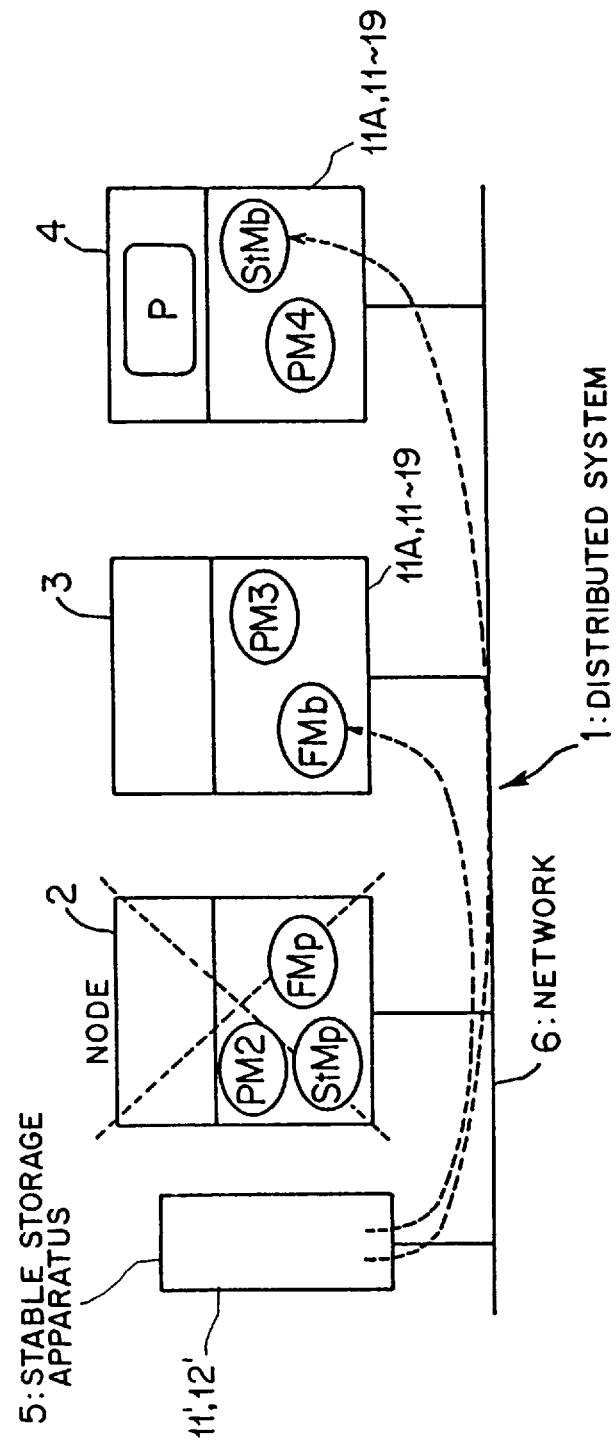

After the checkpoints are stored into the stable storage apparatus 5 in such a manner as described above, if, for example, the node 2 crashes as seen in FIG. 12, then the primary file manager FMp does not function any more. Consequently, the backup file manager FMb takes over the process of the primary file manager FMp so that recovery of the primary file manager FMp which serves as a server is performed.

Here, the recovery processing will be described in detail with reference to the sequence diagram (steps G1 to G10) shown in FIG. 15.

First, if the node 2 crashes, then the backup file manager FMb on the node 3 and the backup stream manager StMb on the node 4 begin takeover of the process (step G1) and individually read in checkpoints from the stable storage apparatus 5 along routes indicated by broken lines in FIG. 12 (step G2).

In particular, checkpoints regarding the primary file manager FMp and the primary stream manager StMp which have been present on the crashing node 2 are read in from the stable storage apparatus 5 to recover the condition regarding resources (the process till this step will be hereinafter referred to as front half phase).

Then, after the backup stream manager StMb completes its reading in of checkpoints, it notifies the backup file manager FMb of such completion (step G3).

On the other hand, after the backup file manager FMb completes its reading in of checkpoints, it waits as it is without executing a next process until after the notification of completion of the front half phase is received from the backup stream manager StMb.

Figure 13:
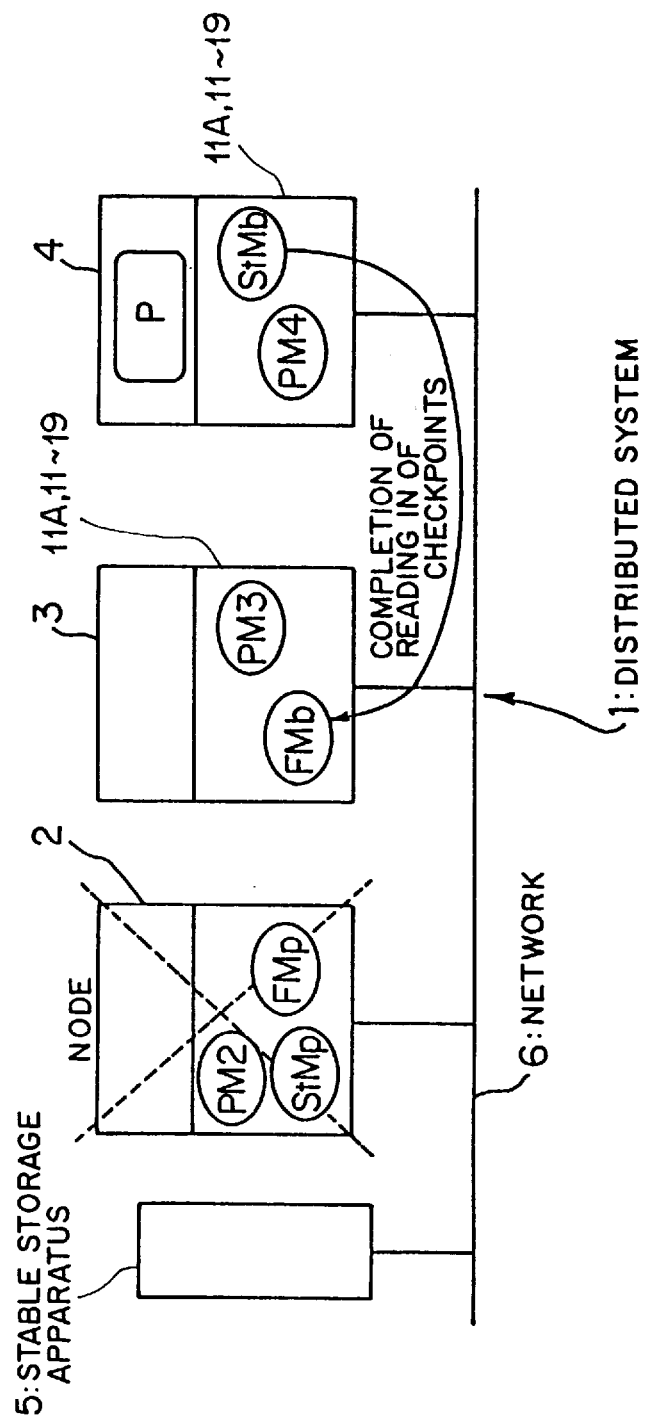

Then, when the backup file manager FMb receives the notification of completion of the front half phase (notification of completion of reading in of checkpoints) from the backup stream manager StMb along a route indicated by a solid line in FIG. 13, the backup file manager FMb delivers, to the process manager PM3 on the node 3 and the process manager PM4 and the backup stream manager StMb on the node 4 which are not in failure (such managers may each be hereinafter referred to merely as client), an inquiry for resources managed by them along routes indicated by solid lines in FIG. 14 (step G4).

Then, the process manager PM3, the process manager PM4 and the backup stream manager StMb which have received the inquiry from the backup file manager FMb lock resources possessed by themselves (step G5). In other words, during recovery of the primary file manager FMp by the backup file manager FMb, passing of information regarding resources managed by the backup file manager FMb between different clients is inhibited.

Then, each of the clients investigates the contents of resources possessed by themselves (step G6) and sends back such resource information to the backup file manager FMb (step G7).

Figure 14:
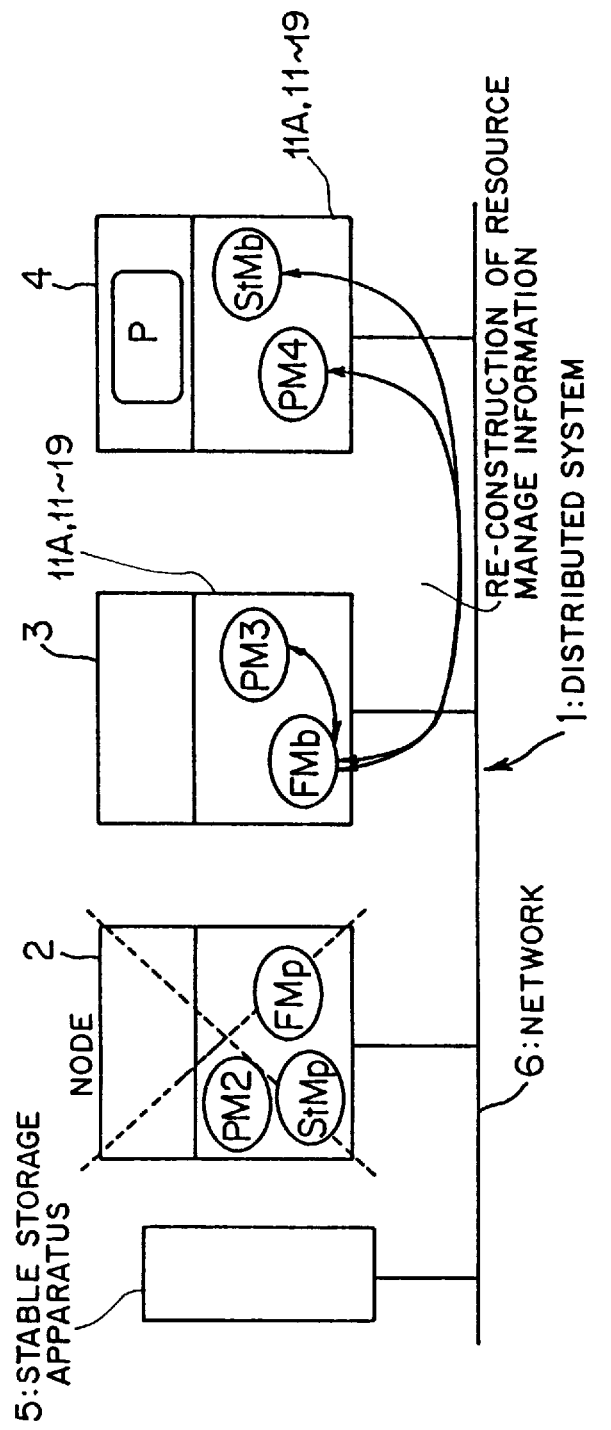

Further, the backup file manager FMb collects the resource information sent thereto from the process manager PM3, the process manager PM4 and the backup stream manager StMb along the routes indicated by the solid lines in FIG. 14 and re-constructs the resource management information based on the collected information (step G8) to recover the primary file manager FMp.

Then, after this processing is completed, the backup file manager FMb notifies the individual clients of completion of recovery (step G9). Each of the clients having received the recovery completion notification unlocks (recovers) the resources locked at step G5 (step G10) thereby to permit subsequent passing of the resources between different clients.

Consequently, for example, even if the node 2 crashes (fails) during use of a resource such as a file, the application program P on the node 4 can be continuously executed without being influenced by such crash.

Figure 15:
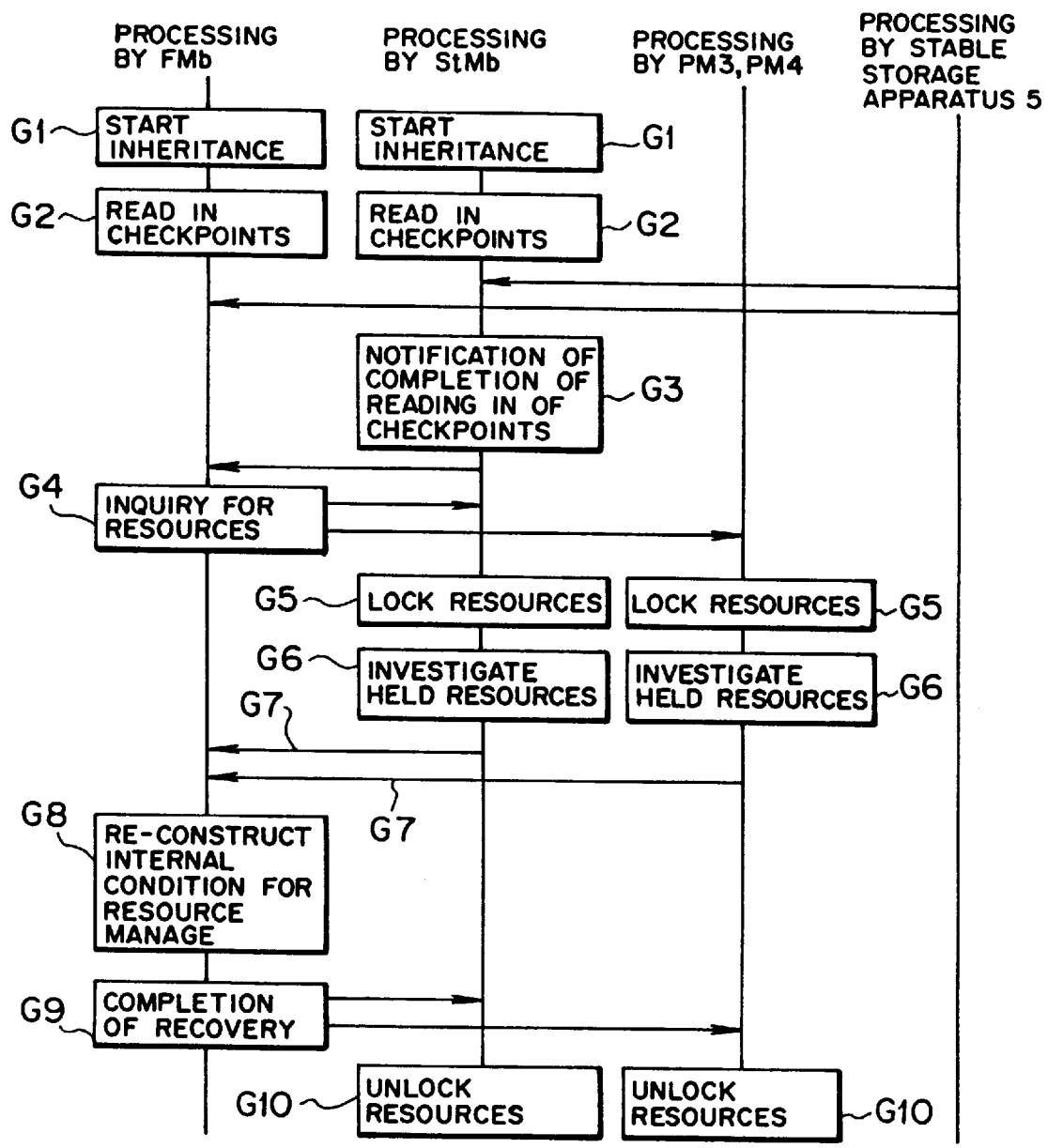
FIG. 15 is a sequence diagram illustrating a recovery method for a resource managing server in the distributed system shown in FIGS. 11 to 14.

It is to be noted that, though not illustrated in the sequence diagram of FIG. 15, upon passing of resource information between the backup file manager FMb and the clients, an incarnation number is added to and transmitted together with a message for passing of resource information by and from each of the nodes 3 and 4 so that the contents of the resources may not be varied during recovery processing as described in the description of the basic constructions of the distributed system of the present invention.

Consequently, in this instance, each of the nodes 3 and 4 has the units 11A and 11 to 19 described hereinabove. It is to be noted that, when the node 3 or 4 crashes, the node 2 has the units 11A and 11 to 19, and recovery processing of the server is performed by the units 11 to 19 as described hereinabove.

Figure 16:
FIG. 16 is a diagrammatic view showing an example of a file table when a resource used in the distributed system shown in FIGS. 11 to 14 is a file.

FIG. 16 illustrates an example of resource information (file table) when the resources in the present embodiment are files. If a client which makes use of a file receives a file id from the primary file manager FMp or the backup file manager FMb (each of which serves as a server), it adds an entry to such a file table FT as shown in FIG. 16, and the contents of the file table FT are stored into the stable storage apparatus 5.

As described above, in the distributed system 1 described above, the primary file manager FMp which acts as a primary server does not take, in a process of the primary file manager FMp in ordinary operation, checkpoints regarding resources managed by the primary file manager FMp itself, but checkpoints are taken in a process of any client which uses a resource. Consequently, the load to a server which need process requests from a large number of clients can be reduced remarkably, and accordingly, a fault-tolerant system can be constructed without increasing the load to the server.

Further, for example, when recovery of the primary file manager FMp is required as a result of a crash of the node 2, the backup file manager FMb delivers an inquiry to those of the clients which are not in failure, and re-constructs the internal condition of the backup file manager FMb based on a result of the inquiry so that the entire system may operate consistently. Consequently, information regarding resources which have been possessed only by the primary stream manager StMp which stopped its function as a result of a crash of the node 2 is not re-constructed newly. As a result, the memory area for resource management can be reduced remarkably.

Further, since the phase of recovery processing when the node 2 in which the primary file manager FMp and the primary stream manager StMp are present crashes is definitely divided into two phases including the phase wherein the backup file manager FMb and the backup stream manager StMb read in checkpoints from the stable storage apparatus 5 (which corresponds to steps G1 to G3 described hereinabove) and the phase wherein the backup file manager FMb and the clients cooperate with each other between processes to re-construct resource management information (which corresponds to steps G4 to G8 described hereinabove), when the resource management information is re-constructed, the delay times of an inquiry message to the clients can be reduced. Consequently, the recovery processing for the primary file manager FMp (server) can be performed efficiently.

Further, after the backup file manager FMb issues an inquiry for resource information, passing of resources is inhibited until after the backup stream manager StMb reads in checkpoints from the stable storage apparatus 5 and notifies the backup file manager FMb of completion of reading in of checkpoints, and accordingly, information for which the backup file manager FMb has inquired will not be varied during recovery of the primary file manager FMp at all. Consequently, the backup file manager FMb can re-construct resource management information which is consistent with the entire distributed system based on collected information.

Accordingly, recovery of the primary file manager FMp (server) can be performed without any inconsistency as the entire distributed system.

Further, since an incarnation number is added to a message for passing of resource information, the backup file manager FMb can detect a message which has been transmitted but not received at a point of time when the backup file manager FMb delivered an inquiry for resource information to the clients. Further, by invalidating the message, the backup file manager FMb can construct consistent resource management information based only on information collected from the clients upon inquiry for resource information.

c. Second Embodiment Subsequently, a second preferred embodiment of the present invention will be described.

c-1. Basic Constructions of the Second Embodiment

Figure 17:
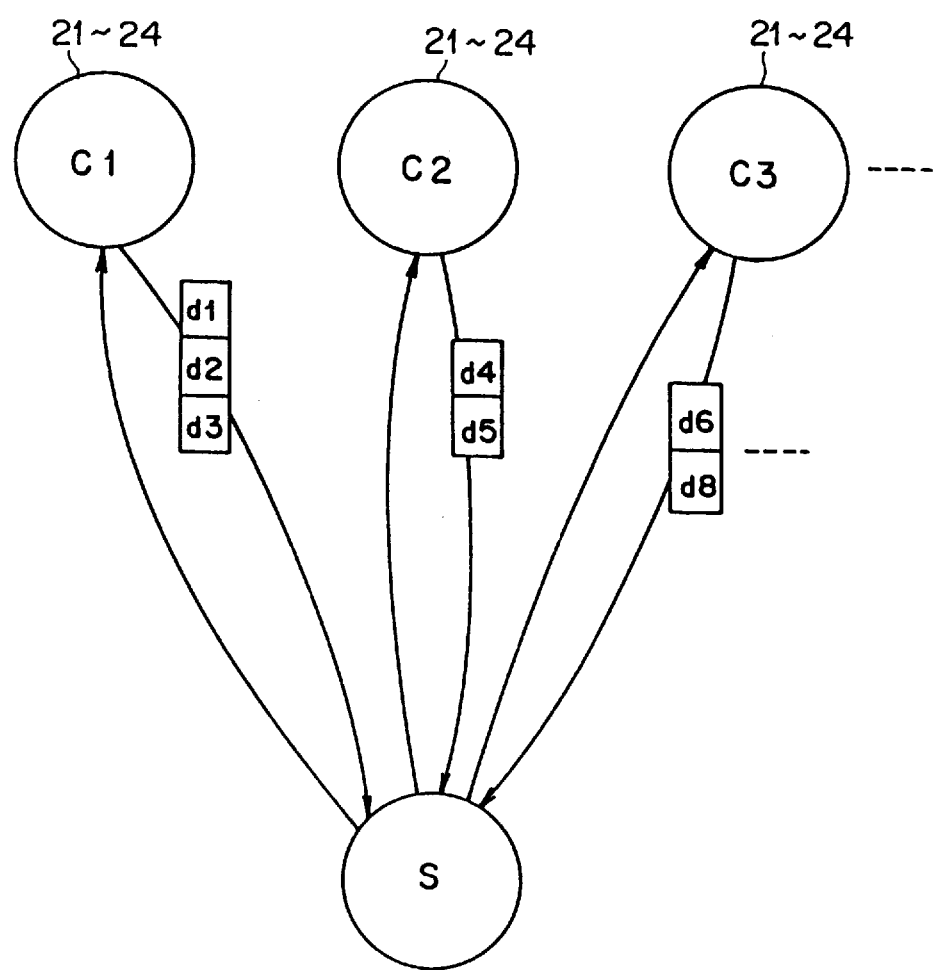
FIG. 17 is a diagrammatic view illustrating a concept of operation of a basic construction of a distributed system according to a second preferred embodiment of the present invention.

FIG. 17 illustrates an outline of operation of a distributed system having a basic construction according to the second preferred embodiment of the present invention. Referring to FIG. 17, the distributed system shown includes clients C1 to C3 present in a node or nodes (node apparatus, not shown), and a resource managing server S present in another node for managing resources such as files.

Also in the present embodiment, similarly as in the first embodiment, the server S and the clients C1 to C3 operate in accordance with a server-client model. It is to be noted that reference characters d1, d2, . . . , d8, . . . in FIG. 17 denote identification information (id) of resources such as files managed by the server S, and particularly it is shown in FIG. 17 that, from among the resources managed by the server S, those three resources having the "id" of "d1", "d2" and "d3" are used by the client C1; those two resources having the "id" of "d4" and "d5" are used by the client C2; and those two resources having the "id" of "d6" and "d8" are used by the client C3.

In the distributed system in which the server S and the clients C1 to C3 are present, in ordinary operation, a checkpoint regarding a token for permitting one of the clients C1 to C3 to use a resource managed by the server S is taken not by the server S but by one of the clients C1 to C3. The checkpoint regarding the token thus taken is recorded by the client C1, C2 or C3 and also stored into a stable storage apparatus (not shown) similar to that described hereinabove in connection with the first embodiment.

Then, for example, if a node (not shown) in which a server different from the server S which has executed a process till now crashes to stop its function as a server, then also in the present embodiment, recovery of the server is performed by the server S similarly as in the first embodiment.

Figure 18:
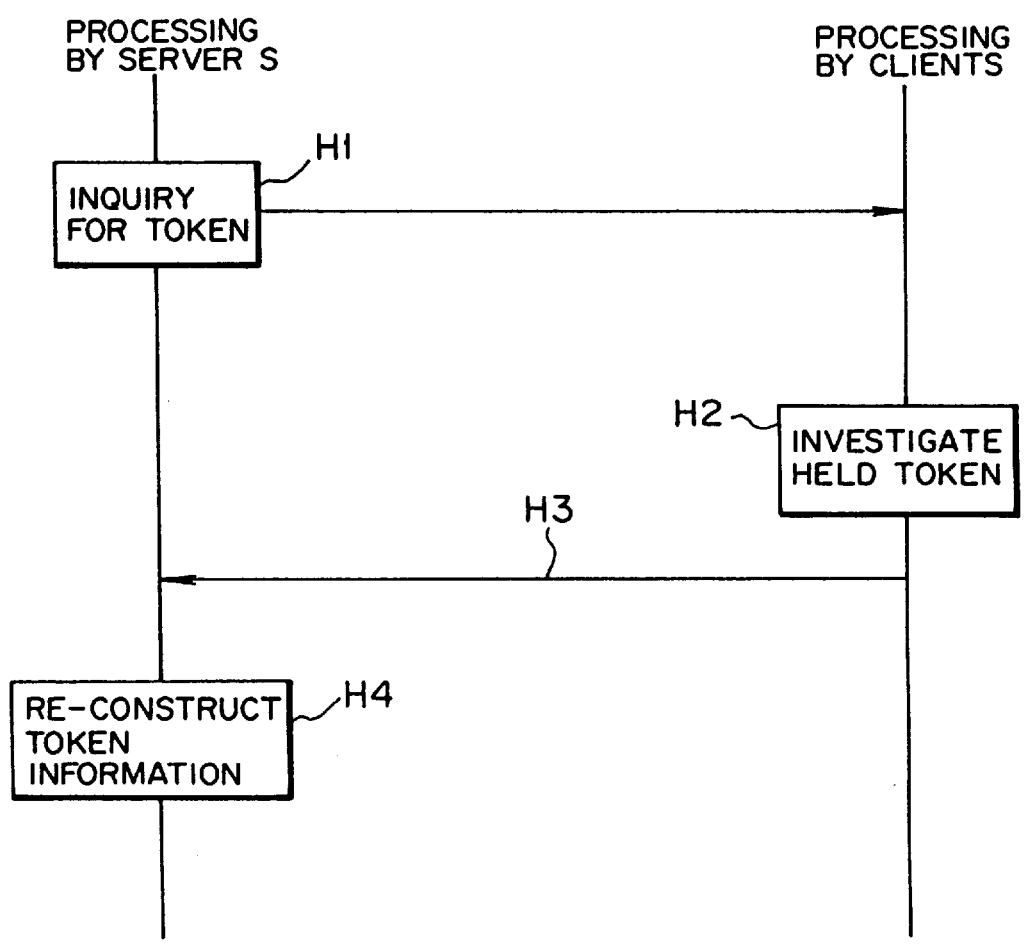
FIG. 18 is a sequence diagram illustrating a procedure of collecting information regarding tokens in the basic construction of the distributed system according to the second preferred embodiment of the present invention.

In the following, the recovery processing by the server S will be described in detail with reference to the sequence diagram (steps H1 to H4) shown in FIG. 18.

In the present embodiment, for example, the server S first issues an inquiry for information regarding a token (information of which client or server has used a resource managed by the server S) to the clients C1 to C3 (step H1).

Each of the clients C1 to C3 having received the inquiry investigates information (which may be hereinafter referred to as token information) regarding a token or tokens possessed by it (step H2).

For example, since the client C1 took checkpoints regarding tokens in ordinary operation of the distributed system and consequently has resource information (id: d1 to d3) such as files which have been used as it received (possesses) tokens from the server S, it is investigated which resources have been used due to the possession of the tokens, and information obtained by the investigation is sent to the server (step H3).

In short, token information is investigated by each of the clients C1, C2, C3, ... so that the server S may discriminate which resources among the resources managed by the server S have been used by which clients.

Figure 19:
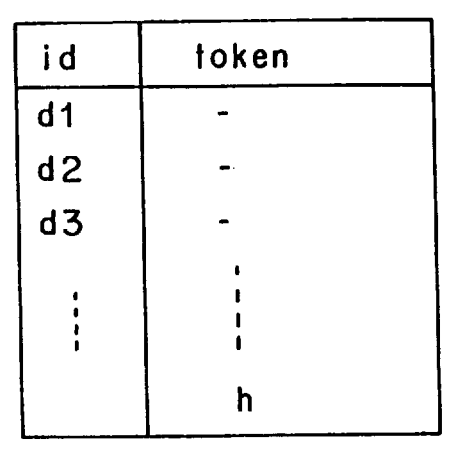

Then, the server S collects such token information sent thereto from the clients C1, C2, C3, ..., re-constructs token information based on the collected token information and produces such a token information table as shown in FIG. 19, thereby ending recovery of the server (step H4). It is to be noted that, in the token information table shown in FIG. 19, a resource whose token is possessed by the server S is represented by "h". Meanwhile, the token of any resource which is not used by any of the server S and the clients C1, C2, C3, ... is basically possessed by the server S.

In this instance, the node in which the client C1 (or client C2, C3, ... ) is present has a checkpoint taking unit 21 for allowing, in ordinary operation of the distributed system, the client to take a checkpoint regarding a token for permitting the client to use resources managed by the server, a storage unit (such as a memory) 22 for storing the checkpoint regarding the token taken by the checkpoint taking unit 21, and a unit 23 for storing the checkpoint regarding the token taken by the checkpoint taking unit 21 into the stable storage apparatus. The node further includes a unit 24 for sending out information regarding the token from the client C1 (or client C2, C3, ... ) to the server S based on the checkpoint regarding the token stored in the storage unit 22 so as to allow, when another node crashes, the server S to collect information by way of the clients C1, C2, C3, ... to perform recovery of the server S.

As described above, checkpoints regarding tokens are taken not by the server S but by the clients C1, C2, C3, ... in ordinary operation of the distributed system, and upon recovery of the server, the clients C1, C2, C3, ... are inquired to collect token information to re-construct token information. Consequently, even if a token is lost by a crash of the server or by some other cause, information can be collected from the clients C1, C2, C3, ... to re-produce the token. Consequently, even after the crash of the server, the resource corresponding to the token can be continuously used.

Here, when the clients C1, C2, C3, ... are inquired for token information to collect the information as described above, if all clients present in the distributed system are inquired, then a very large amount of communications is required between the server and the clients and a high cost is required for the communications. Therefore, in the present embodiment, those clients to which an inquiry for token information is to be issued are limited to some degree.

Figure 20:
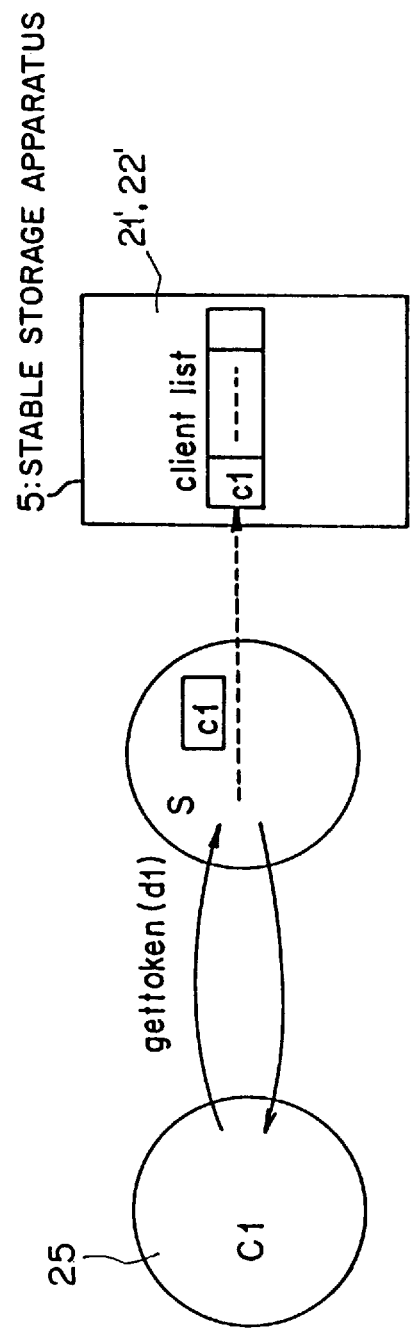
FIG. 20 is a diagrammatic view illustrating another concept of operation of the basic construction of the distributed system according to the second preferred embodiment of the present invention.

In this instance, first in ordinary operation of the distributed system, when, for example, the server S receives a request "get-token(d1)" for acquisition of a token for a resource having the "id" of "d1" from the client C1 and delivers a token corresponding to the resource to the client C1 as seen in FIG. 20, identification information "c1" of the client C1 to which the token is delivered is stored into a stable storage apparatus (non-volatile storage apparatus) 5. This also applies to the other clients C2, C3, ... , and the server S successively stores into the stable storage apparatus 5 pieces of identification information of those clients to which tokens are delivered.

Consequently, those clients which possess tokens are successively stored in a list into the stable storage apparatus 5. It is to be noted that the stable storage apparatus 5 is similar to that described hereinabove in connection with the first embodiment and is an area in which stored contents are maintained even if a node in which the server is present crashes.

Then, for example, if the node in which the server S is present crashes, then a backup server S (the server and the backup server are denoted by a same reference character in FIG. 20 for convenience of description) which is present in a different node reads in the list of the clients stored in the stable storage apparatus 5. Consequently, an inquiry for token information can be issued, based on the list, only to those clients which possess tokens.

Figure 21:
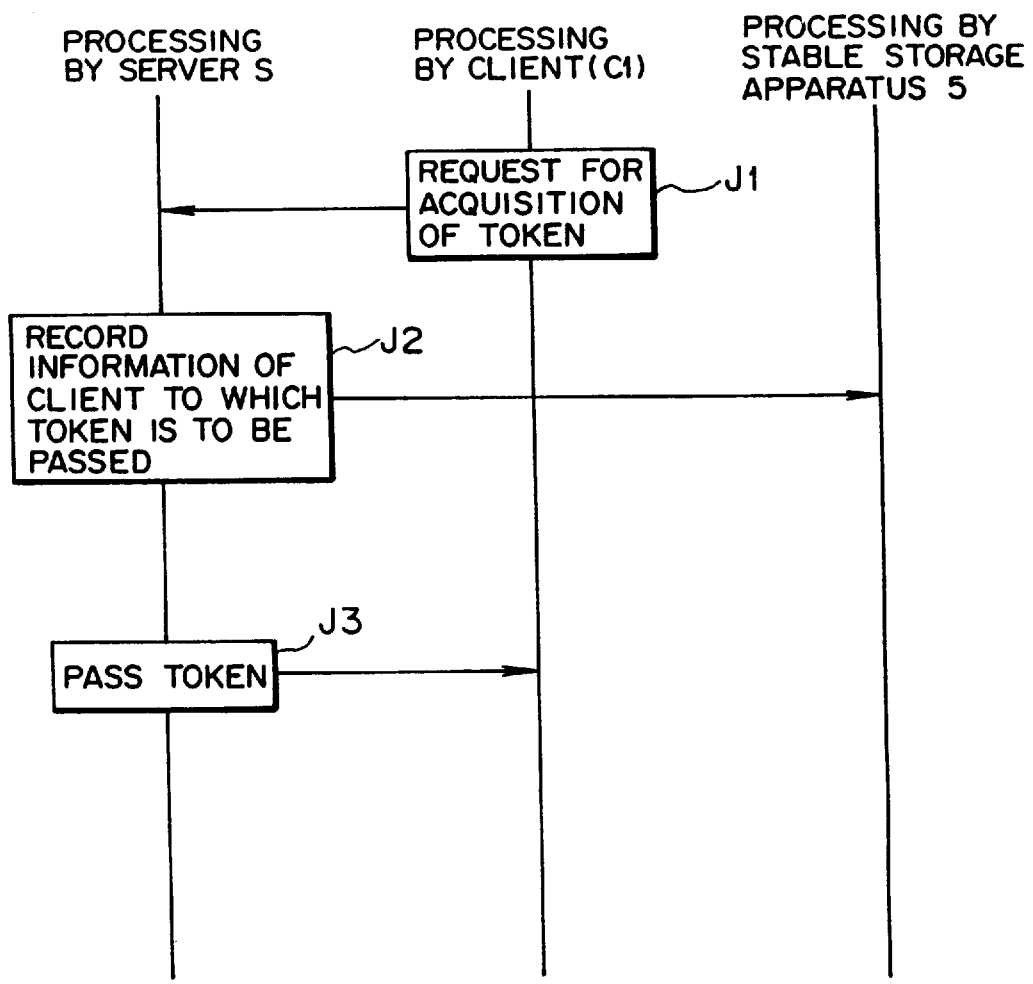
FIG. 21 is a sequence diagram illustrating a procedure of storing a list of clients into a storage apparatus in the basic construction of the distributed system according to the second preferred embodiment of the present invention.

The processing just mentioned will be described in detail below with reference to the sequence diagram (steps J1 to J3) of FIG. 21.

First, in ordinary operation of the distributed system, when the server S receives a token acquisition request sent thereto from the client C1 when the client C1 tries to use a resource such as a file whose identification information "id" is "d1" (step J1), the server S records, when it delivers a token to the client C1, information "c1" such as ID (identification information) of the client C1, to which the token has been delivered, into the stable storage apparatus 5 (steps J2 and J3).

Then, when the node in which the server S which has executed a process till then crashes and recovery of the server S is performed by the backup server S, then the backup server S first reads in the list of the clients stored in ordinary operation from the stable storage apparatus 5 and delivers an inquiry for tokens only to those clients listed in the list.

In this instance, the node in which the client C1 is present has a unit 25 for storing, when, for example, the client C1 possesses a token in an ordinary operation of the distributed system, the client C1 as one of clients which form a list of clients possessing tokens into the stable storage apparatus 5 by way of the server S so as to allow, upon recovery by the server S, the server S to collect information regarding tokens only from those clients possessing tokens to perform recovery of the server S.

Meanwhile, in this instance, the stable storage apparatus 5 has a unit 21' for receiving and storing, in ordinary operation of the distributed system, the list of clients, and a unit 22' for sending out the list of clients so as to allow, when the node in which the primary server S is present crashes, the backup server S to inquire, based on the list of clients, only those clients which possess tokens for information regarding tokens to collect information and then re-construct the internal condition of the backup server S based on the thus collected information regarding the tokens to perform recovery of the server S.

In this manner, since information of an ID of a client is stored into the stable storage apparatus 5 to record a list of clients which possess tokens each time the server S delivers a token to any of the clients C1, C2, C3, ... in ordinary operation of the distributed system, upon later recovery of the server by the server S, a minimum number of necessary clients possessing tokens are specified so that an inquiry for token information can be issued only to those clients.

Consequently, the necessity for the server S to issue an inquiry to all clients present in the distributed system to collect token information is eliminated. Accordingly, the cost involved in increase in amount of communication upon collection of token information can be restricted to the minimum, and consequently, the processing performance upon recovery by the server can be improved remarkably.

Referring now to FIG. 22, there is shown another basic construction of the distributed system of the present embodiment. In the distributed system shown, a failure managing server Sc is present in a node different from the node (node apparatus, not shown) in which the server S which performs recovery is present, and a list (client list) of clients read out by the server S in such a manner as described above is passed to the failure managing server Sc.

Here, the failure managing server Sc manages the conditions of all servers (not shown) present in the distributed system including the server S, and if it receives, for example, the list of clients read out by the server S, then it discriminates which client in the client list is in crash and sends a reply of a list (active client list) only of those clients which are not in crash to the server S.

Figure 23:
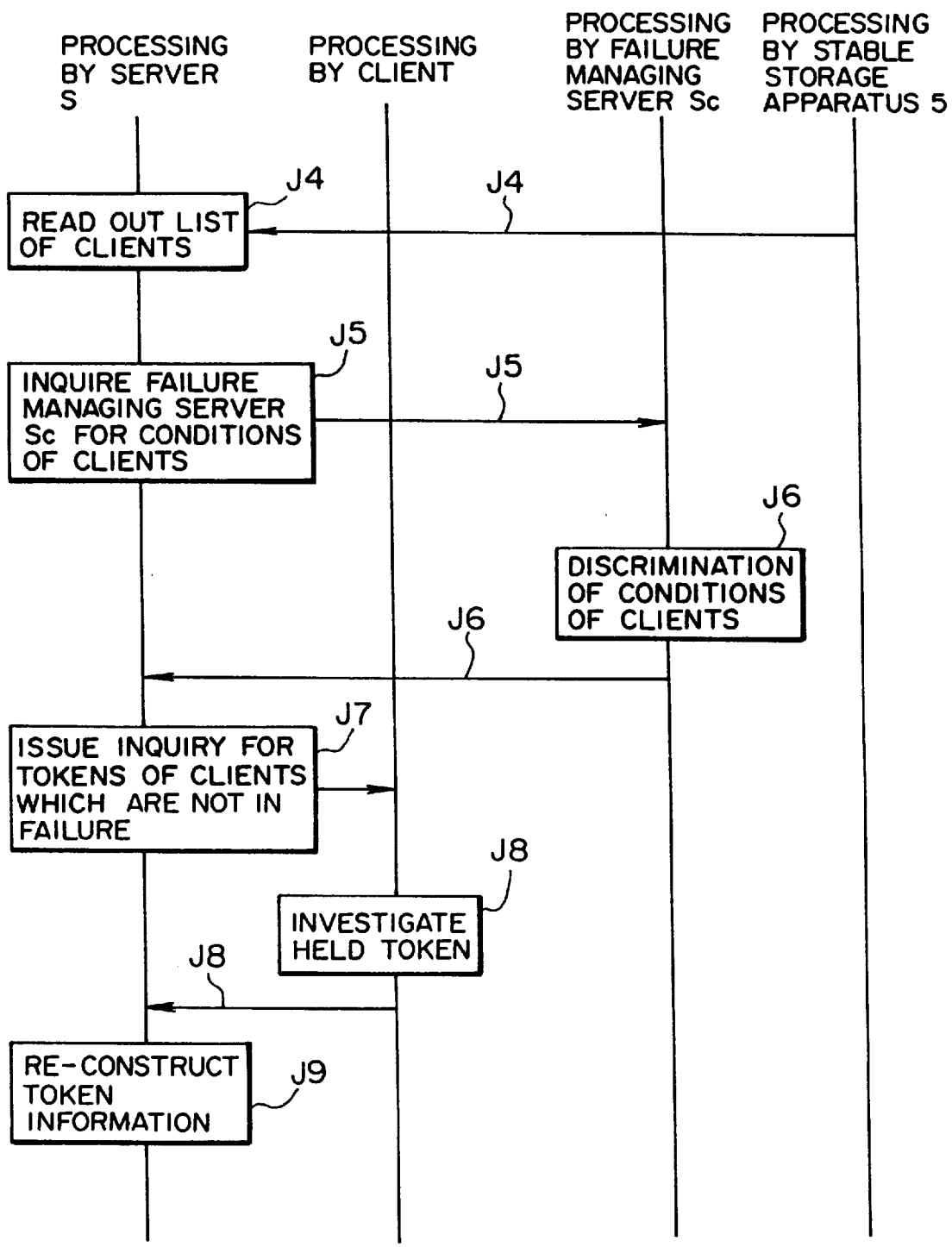
FIG. 23 is a sequence diagram illustrating processing when a failure managing server is present in the basic construction of the distributed system according to the second preferred embodiment of the present invention.

Accordingly, in this instance, upon recovery by the server S, the server S first reads in the list of clients which possess tokens from the stable storage apparatus 5 as seen in FIG. 23 (step J4). Then, the server S passes the client list to the failure managing server Sc and inquires the failure managing server Sc for the conditions of clients in regard to which one of the clients in the list is in crash and which clients are not in crash (step J5).

Upon reception of the inquiry, the failure managing server Sc discriminates which one of the clients in the received client list is in crash, and sends a reply only of a list of those clients which are not in crash to the server S (step J6).

For example, FIG. 22 illustrates that a list of IDs "c1" to "c4" of clients which are read in from the stable storage apparatus 5 by the server S and possess tokens is passed to the failure managing server Sc and then only the IDs "c1, "c3" and "c4" of those clients which are not in crash as a result of discrimination by the failure managing server Sc of whether or not the clients in the list are in crash are replied to the server S.

Then, the server S issues an inquiry for token information only to those clients (in FIG. 22, those clients whose IDs are "c1", "c3" and "c4"), which possess tokens and are not in crash, received from the failure managing server Sc (step J7).

Further, each of the clients having received the inquiry investigates information of tokens possessed by itself and replies the token information to the server S (step J8). The server S thus collects such token information from the clients and re-constructs token information to recover the server (step J9).

Thus, in this instance, a node different from the node in which the server S is present includes a failure managing server Sc for discriminating, based on the list of clients stored in the stable storage apparatus 5 (refer to FIG. 20), whether or not the clients possessing tokens are in crash so as to allow, upon recovery by the server S, the server S to inquire only those of the clients which possess tokens and are not in crash for information regarding the tokens to collect information and perform recovery of the server S based on the thus collected information.

Since those clients to which an inquiry is issued can be restricted, upon recovery by the server S, to those clients which are not in crash by discriminating the conditions of the clients by means of the failure managing server Sc before an inquiry for token information is issued to the clients present in the distributed system in this manner, the cost required for collection of token information can be suppressed with further certainty, and consequently, the processing performance upon recovery by the server S can be further improved.

By the way, normally in a distributed system, since a certain server may possibly serve as a client to another server, there is the possibility that a complicated calling relationship may occur between processes. Accordingly, although an inquiry for token information is issued to a large number of clients as described above, if a client is performing another processing, it cannot immediately accept the inquiry for token information, and the server S must wait a reply from the client.

Then, if such waiting relationships are entangled complicatedly, then the entire distributed system may deadlock, resulting in the possibility that processing may not proceed at all.

Figure 24:
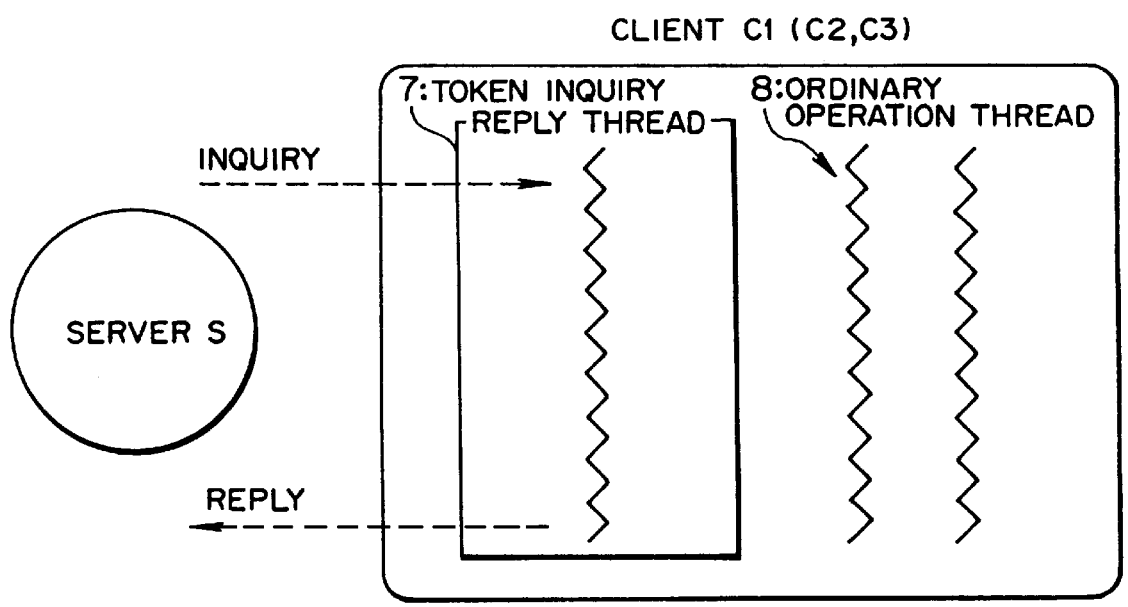
FIG. 24 is a diagrammatic view illustrating a still further concept of operation of the basic construction of the distributed system according to the second preferred embodiment of the present invention.

Therefore, in the present embodiment, a thread 7 is prepared as a measure for performing processing for exclusive use to reply to an inquiry for token information from the server S, independently of a thread (processing process) 8 which is performed in ordinary operation of the distributed system, for clients present in the nodes (node apparatus) used in the distributed system as shown in FIG. 24.

Thus, upon such recovery by the server S as described above, a client having received an inquiry for token information from the server S can immediately reply to the inquiry.

Accordingly, upon recovery by the server S, even when the server S issues an inquiry for token information to a large number of clients, such a situation that a complicated calling relationship is produced among processes to cause the server S to stop its operation waiting replies from clients is eliminated. Consequently, the distributed system can be prevented from deadlocking during recovery by the server S.

If a thread for exclusive use for replying an inquiry for token information is prepared for each client in this manner, as described above, when the server S issues an inquiry for token information to the clients, if any client having received the inquiry is not in crash, then a reply to the inquiry must be returned from the client immediately. However, even if the condition of a client which possesses a token is discriminated by the failure managing server Sc as described hereinabove with reference to FIGS. 22 and 23, if the client crashes after the discrimination, then no reply will be returned from the client.

Figure 25:
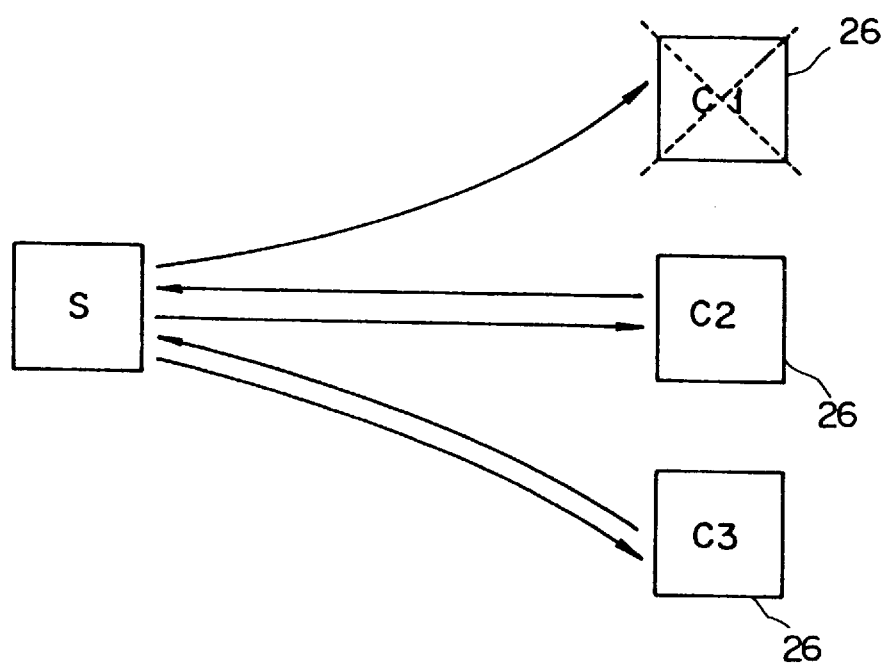
FIG. 25 is a diagrammatic view illustrating a yet further concept of operation of the basic construction of the distributed system according to the second preferred embodiment of the present invention.

Therefore, in the present embodiment, as seen in FIG. 25 the server S present in a node used in the distributed system has a unit for setting a predetermined interval of time after an inquiry for token information has been issued, for example, to the clients C1 to C3, and if no reply is returned from any one (in the present embodiment, the client C1) of the clients C1 to C3, to which the inquiry has been issued, within the predetermined interval of time, the client is considered to be in crash, and the server S re-constructs token information only based on token information from the clients C2 and C3 from which a reply has been returned.

Figure 26:
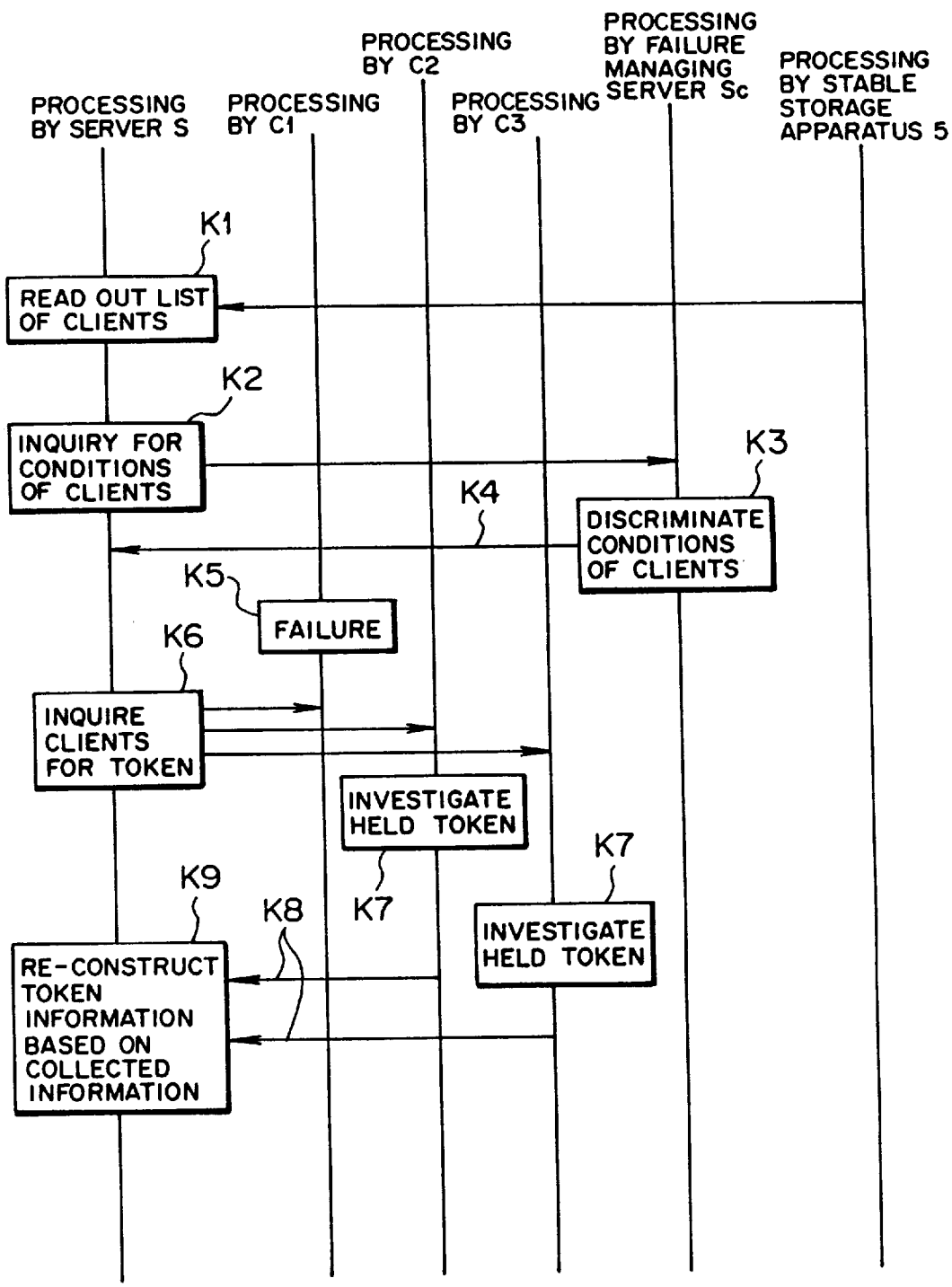
FIG. 26 is a sequence diagram illustrating processing when information regarding tokens is collected only from clients which are not in failure in the basic construction of the distributed system according to the second preferred embodiment of the present invention.

In particular, in this instance, referring to the sequence diagram (steps K1 to K9) of FIG. 26, the server S first reads out a list of the clients C1 to C3, which possess tokens, from the stable storage apparatus 5 (step K1), and passes the list to the failure managing server Sc and inquires the failure managing server Sc for conditions of the clients C1 to C3 (step k2).

The failure managing server Sc thus discriminates the conditions of the clients C1 to C3 based on the list received (step K3), and replies the list of the clients C1 to C3, which are not in failure, to the server S (step k4).

Here, it is assumed that, after such discrimination of the conditions of the clients by the failure managing server Sc as described above, for example, the client C1 fails due to a crash of the node in which the client C1 is present (step K5).

However, at this point of time, the server S judges based on the list received from the failure managing server Sc that the clients C1 to C3 are not in failure, and consequently, it issues an inquiry for token information to the clients C1 to C3 and sets a timer to a predetermined interval of time (step K6).

Then, when the clients C2 and C3 receive the inquiry, they investigate information of tokens possessed by them (step K7) and reply the information to the server S (step K8). However, no reply to the inquiry is received from the client C1 which has failed.

If no reply to the inquiry for token information is received from the client C1 even after the predetermined time of the timer set at step K6 described above elapses, the server S considers that the client C1 has failed, and collects only the token information of the clients C2 and C3, from which a reply has been received, to re-construct token information (step K9).

Accordingly, even if a client existing in the distributed system fails because of a crash of a node or from some other cause during recovery by the server S, the server S can re-construct token information thereof based on information regarding tokens of those clients which are not in failure to perform recovery processing of the server regularly.

In this instance, each of the nodes in which the clients C2 and C3 are present includes a unit 26 for sending out information regarding a token to the server S within a predetermined time after the node receives an inquiry for information regarding a token in order to allow, when the server S does not receive, after the server S develops an inquiry for information regarding a token, a reply to the inquiry from the client C1 and cannot collect information regarding tokens after the predetermined time elapses after the inquiry, information regarding tokens to be collected only from the clients C2 and C3 from which a reply has been received.

Here, each of the clients C1 to C3 normally updates, when it acquires a token and performs a job using a resource such as a file managed by the server S, the attribute of the resource corresponding to the token (for example, where the resource is a file, a size of a file), and then when it returns the token to the server S after completion of the job, the thus updated attribute of the resource is reflected on the server.

Figure 27:
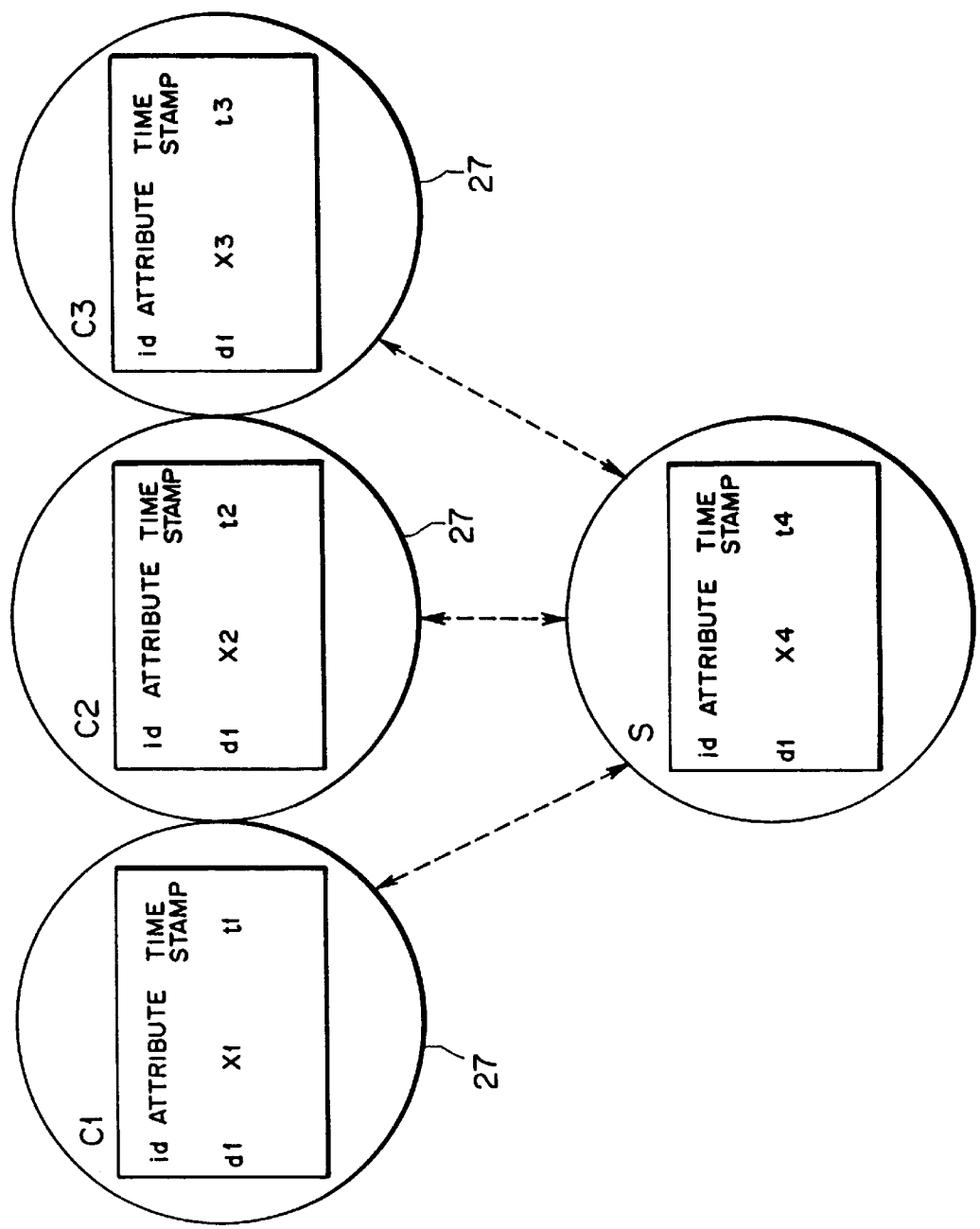
FIG. 27 is a diagrammatic view illustrating an example of resource information in a server and clients in the basic construction of the distributed system according to the second preferred embodiment of the present invention.

For example, if the client C1 acquires a token and uses a resource whose identification information (id) on the server S side is "d1" (the attribute of the resource: "X4", the time when use of the resource is completed: "t4") and then returns the token to the server S after completion of a job as seen in FIG. 27, then the client C1 updates the attribute of the resource to "X1" and updates the time at which the token is returned to complete the use of the resource to "t1". It is to be noted that this similarly applies to the other clients C2 and C3 in that, after jobs are completed using resources managed by the server S, the clients C2 and C3 update the attributes of the resources to "X2" and "X3" and update the times at which the use of the resources is completed to "t2" and "t3", respectively.

Here, however, if the system partially fails because of a crash of a node during passing of a token and consequently the token is lost, then there is the possibility that also the attributes updated by the clients C1 to C3 may be lost.

Therefore, in the present embodiment, when it is found out that a token is lost as a result of collection of token information from the clients C1 to C3 during recovery of the server by the server S, latest resource information of the clients present in the distributed system is reflected on information regarding resources corresponding to tokens on the server S side.

Figure 28:
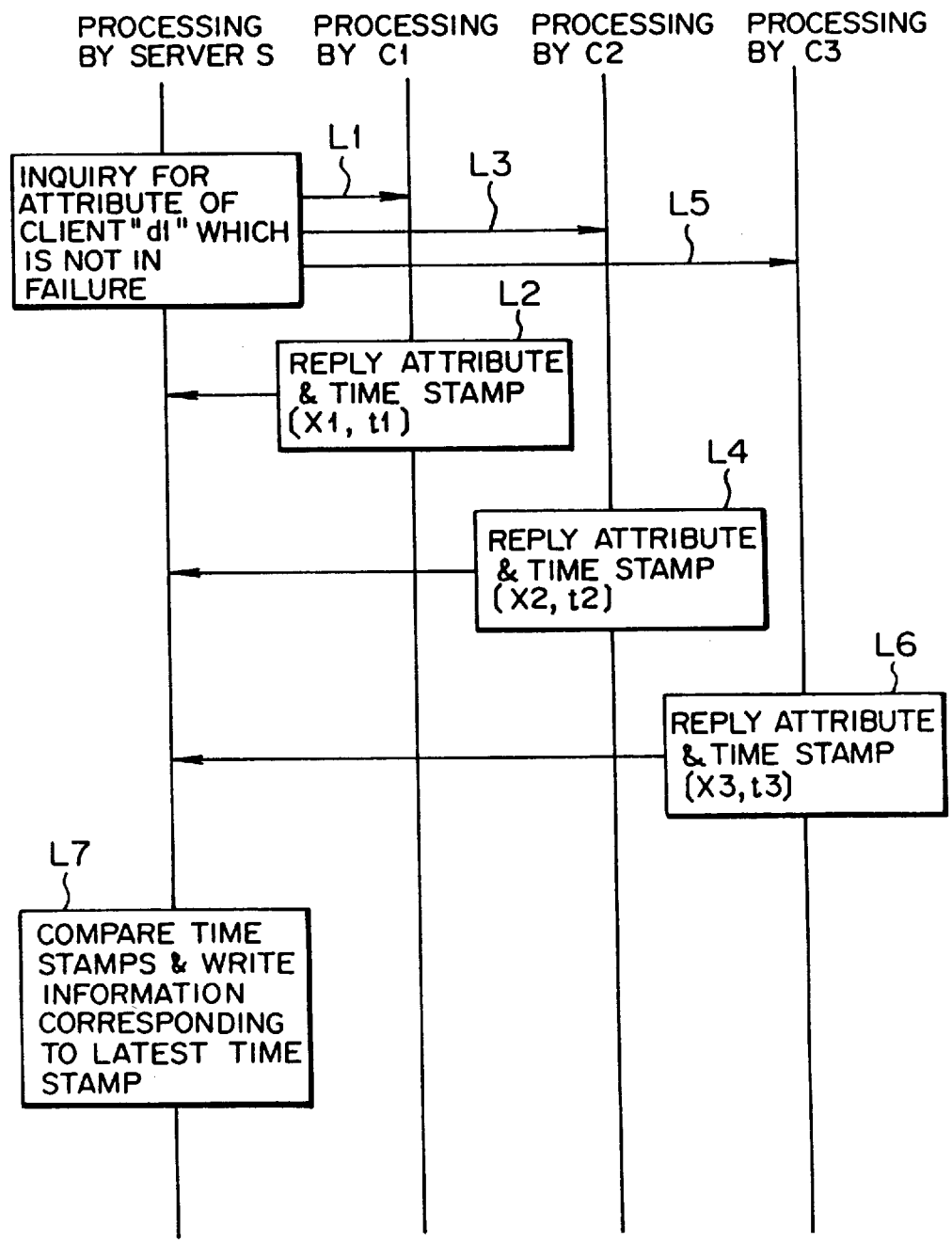
FIG. 28 is a sequence diagram illustrating a procedure of updating resource information corresponding to tokens on a server side to latest information in the basic construction of the distributed system according to the second preferred embodiment of the present invention.

In particular, if it is found out that, for example, a token whose identification information (id) is "d1" is lost as a result of collection of token information by the server S, as seen from FIG. 28, the server S first inquires the client C1, which is not in failure, for information regarding a resource corresponding to the identification information "d1" (step L1). The client C1 thus replies the attribute "X1" of the resource corresponding to "d1" and the time "t1" at which the attribute is updated to the server S (step L2). Similarly, the server S inquires the client C2 for information regarding a resource corresponding to the identification information "d1" (step L3). The client C2 thus replies, to the inquiry, the attribute "X2" of the resource corresponding to the identification information "d1" in the client C2 itself and the time "t2" at which the attribute is updated to the server S (step L4). Further, the server S inquires the client C3 for information regarding a resource corresponding to the identification information "d1" (step L5). The client C3 thus replies, to the inquiry, the attribute "X3" of a resource corresponding to the identification information "d1" in the client C3 itself and the time "t3" at which the attribute is updated to the server S (step L6).

After the server S collects information regarding a resource corresponding to the identification information "d1" from the clients C1 to C3, it compares the time "t4" at which the server S used the resource corresponding to the identification information "d1" and the updated times "t1", "t2" and "t3" of the same resource corresponding to the identification information "d1" collected from the clients C1 to C3 with one another to detect which one of the times is newest, and writes the resource information from the client which has the newest updated time into the resource information corresponding to the identification information "d1" on the server S side to update the resource information (step L7).

In this instance, each of the nodes in which the clients C1 to C3 are present has a unit 27 for sending out information regarding a resource to the server S in order to allow, upon recovery by the server S, the server S to compare information regarding the resources managed by the server S and information regarding resources managed by the clients C1 to C3, which have used the resources as a result of possession of tokens in the past, with each other to discriminate which information is newer with respect to time and update the resource information corresponding to the tokens managed by the server S to latest resource information.

Accordingly, even if a token is lost because of a crash of a node or by some other cause, latest information can be reflected on the server S by collecting information of the attribute or the like of a resource remaining in the clients C1 to C3.

c-2. Detailed Description of the Second Embodiment

Figure 29:
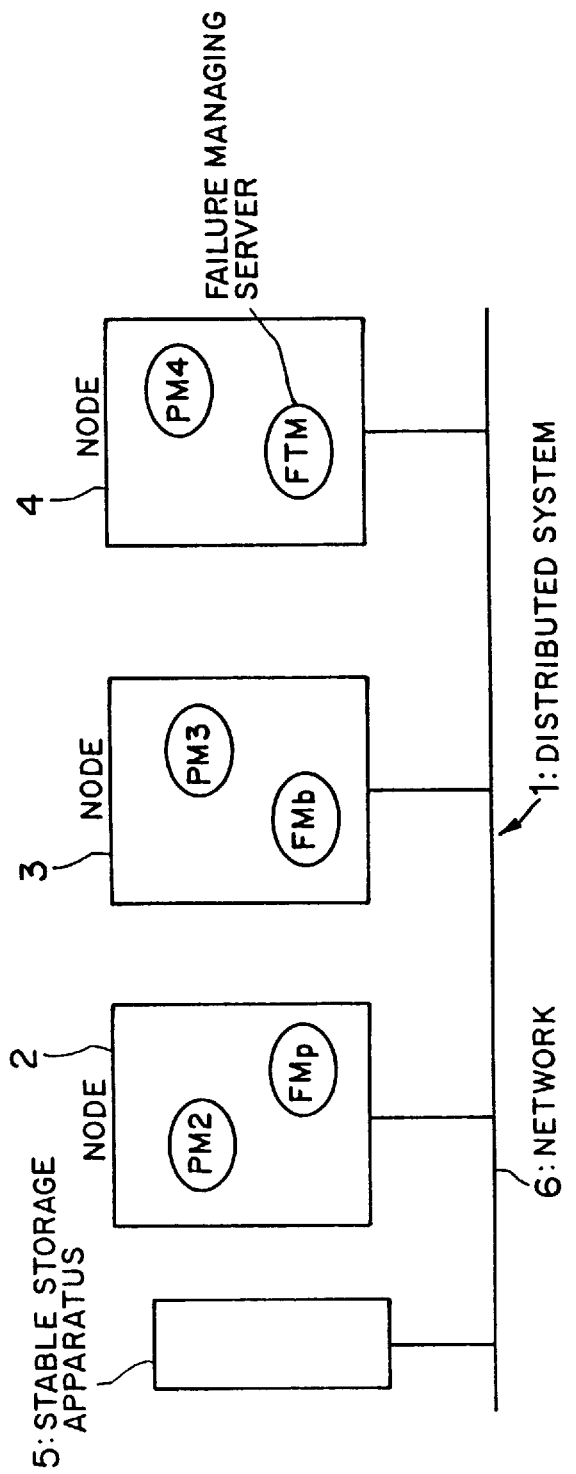
FIG. 29 is a block diagram showing a detailed construction of the distributed system according to the second preferred embodiment of the present invention.

FIG. 29 shows a detailed construction of the distributed system according to the second preferred embodiment of the present invention. Referring to FIG. 29, also in the present embodiment, similarly as in the first embodiment, the distributed system generally denoted at 1 includes a plurality of nodes (node apparatus) 2 to 4, and a stable storage apparatus (storage apparatus) 5 for storing checkpoints having resource management information. The nodes 2 to 4 and the stable storage apparatus 5 are connected to each other by way of a network 6.

Each of the nodes 2 to 4 includes a CPU, a main storage apparatus and a secondary storage apparatus all not shown, and the nodes 2 to 4 can communicate a message between them by way of the network 6.

The stable storage apparatus 5 is formed as a non-volatile storage apparatus which can be accessed from any of the nodes 2 to 4 by way of the network 6, and accordingly, also in the present embodiment, whichever node fails, the contents of the stable storage apparatus 5 are not destroyed. The stable storage apparatus 5 may be constructed from either of software and hardware, and where it is constructed from software, it can be placed on the nodes 2 to 4.

Further, in the distributed system 1, a process manager (client) PM2 and a primary file manager (primary server) FMp are provided on the node 2.

Meanwhile, another process manager (client) PM3 and a backup file manager (backup server) FMb are provided on the node 3, and a further process manager (client) PM4 and a failure managing server FTM are provided on the node 4.

An operating system (OS) is operating on each of the nodes 2, 3 and 4. The OS is realized as an aggregate of a plurality of processes divided for individual functions.

Here, the process managers PM2, PM3 and PM4 are present on the nodes 2, 3 and 4, respectively, similarly, for example, as in the first embodiment described above and accept a request from an application program (not shown) present on the node 4. Each of the primary file manager FMp and the backup file manager FMb manages files (resources). The failure managing server FTM manages the conditions of the servers (the primary file manager FMp and the backup file manager FMb) present in the distributed system as described hereinabove in connection with the basic construction of the second embodiment. Further, if, for example, a list of clients (for example, process managers PM2 to PM4) read out from the stable storage apparatus 5 is received upon recovery by the server, then the failure managing server FTM discriminates which one of the clients in the list is in failure and thus replies only a list of those clients which are not in crash to the server.

Figure 30:
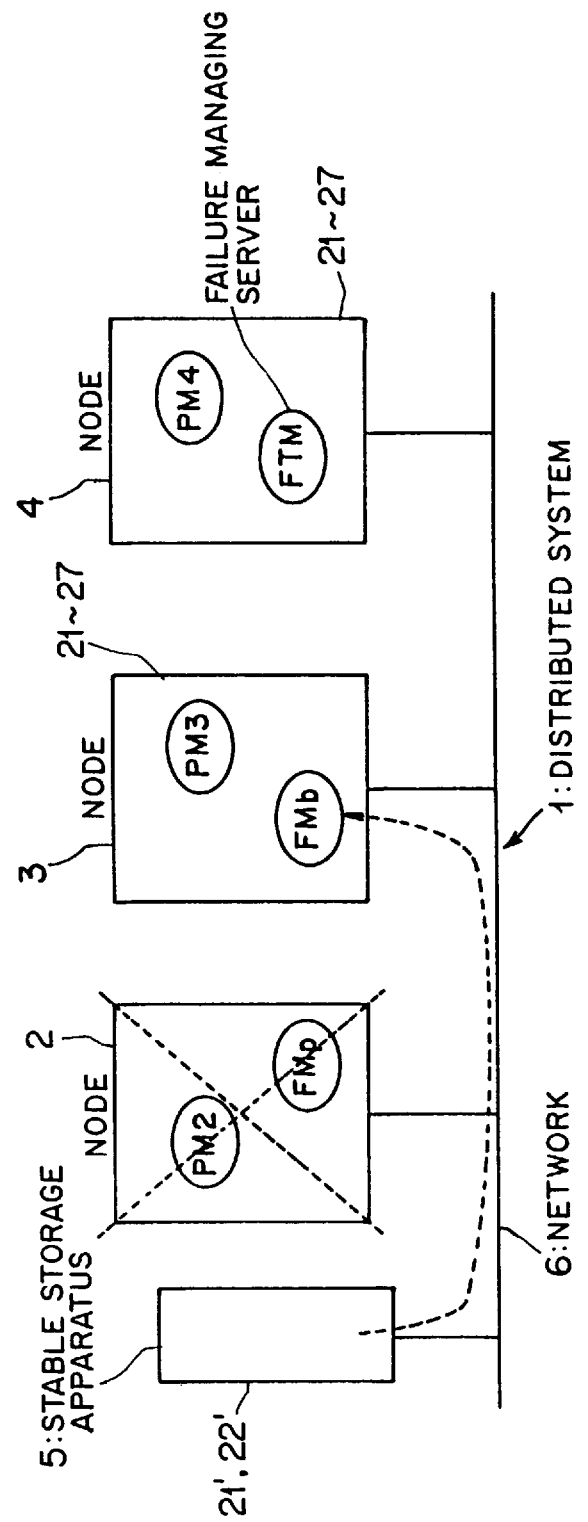
FIGS. 30 and 31 are a block diagram and a sequence diagram, respectively, illustrating a recovery procedure of a server in the distributed system shown in FIG. 29.
Figure 31:
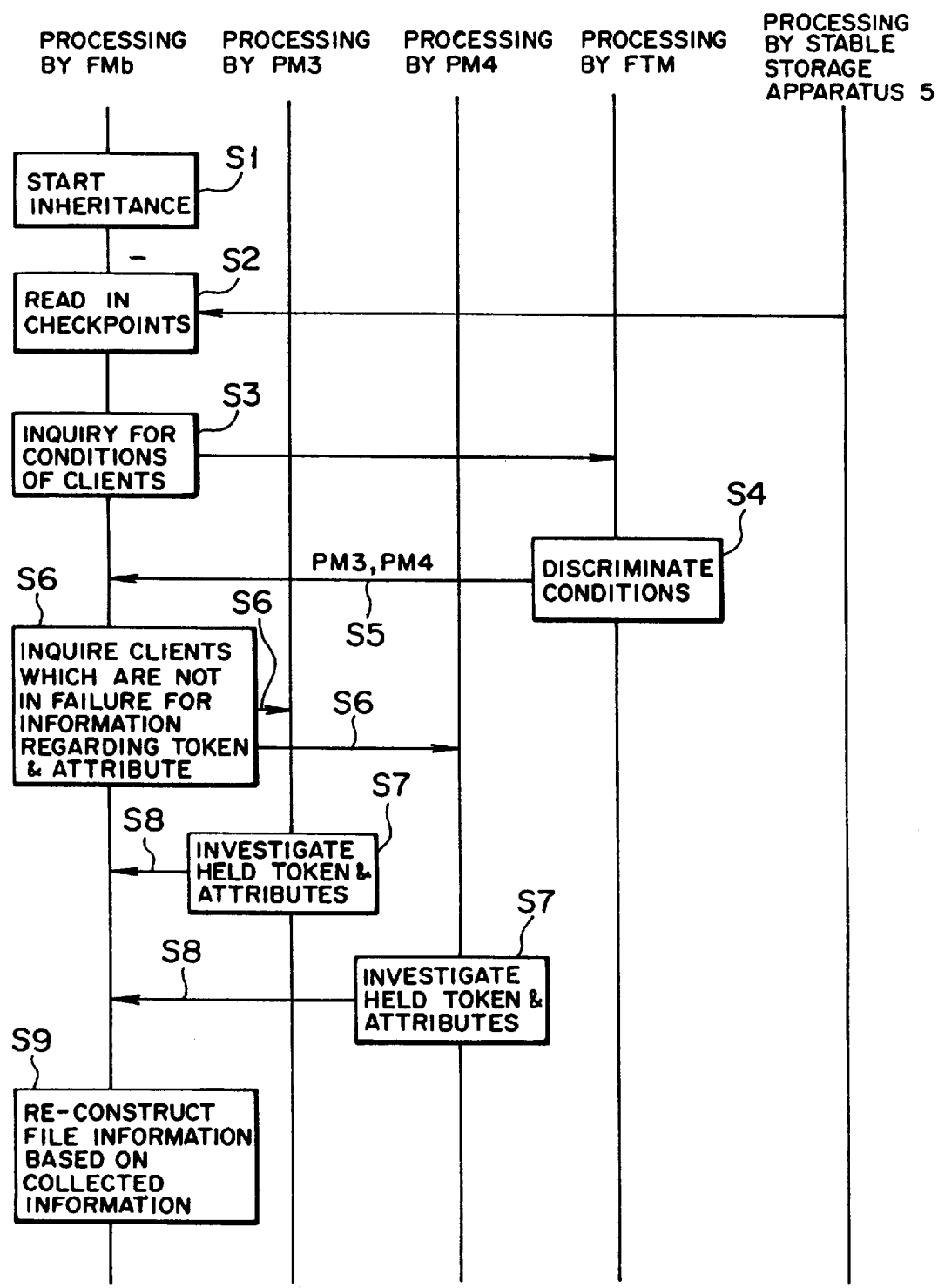

In the following, recovery processing of the server (primary file manager FMp) when the node 2 crashes in the present embodiment will be described in detail with reference to FIGS. 30 and 31.

First, if the node 2 crashes, then the backup file manager FMb on the node 3 begins its takeover (step S1) and reads in checkpoints from the stable storage apparatus 5 (step S2).

Here, the checkpoints include a list of clients to which the primary file manager FMp has delivered tokens, file information regarding files and so forth as described hereinabove with reference to FIG. 20. Thus, by reading in the checkpoints from the stable storage apparatus 5 in this manner, the backup file manager FMb gets identification information such as, for example, IDs of the process managers PM2, PM3 and PM4 as a list of clients.

Further, the backup file manager FMb sends the list of clients to the failure managing server FTM on the node 4 and requests the failure managing server FTM for discrimination of the conditions of the process managers PM2, PM3 and PM4 (whether or not they are in crash) (step S3). The failure managing server FTM thus discriminates the conditions of the process managers PM2, PM3 and PM4 listed in the received list and extracts and replies only those process managers which are not in failure to the backup file manager FMb.

Here, in this instance, since the process manager PM2 on the node 2 does not function any more because of a crash of the node 2, the failure managing server FTM replies only the process managers PM3 and PM4 except the process manager PM2 as a list of clients to the backup file manager FMb (steps S4 and S5).

Thus, the backup file manager FMb inquires the process managers PM3 and PM4 for information regarding files (including tokens) based on the reply from the failure managing server FTM. Each of the process managers PM3 and PM4 having received the inquiry investigates file information such as token information and attributes of files held by itself and replies the thus investigated information to the backup file manager FMb which now serves as a server (steps S6 to S8). It is to be noted that, in this instance, each of the process managers PM3 and PM4 performs processing for exclusive use to respond to the inquiry from the backup file manager FMb separately from processing performed in ordinary processing as described hereinabove with reference to FIG. 24 in order to reply to the inquiry.

Thereafter, the backup file manager FMb re-constructs file information to be managed by itself based on the information such as token information and attributes of files replied from the process managers PM3 and PM4 (step S9). In this instance, as described hereinabove with reference to FIG. 25, if, for example, the process manager PM3 fails newly and no reply is received from the process manager PM3 even after a predetermined time elapses, the backup file manager FMb re-constructs file information to be managed by itself based only on information replied from the process manager PM4.

FIG. 32(a) illustrates an example of file information read in from the stable storage apparatus 5 by the backup file manager FMb as described above; FIG. 32(b) illustrates an example of file information held by the process manager PM3 on the node 3; and FIG. 32(c) illustrates an example of file information held by the process manager PM4 on the node 4. As seen from FIGS. 32(a) to 32(c), information regarding a file particularly includes "file id", "token", "file size" and "time stamp".

Here, "file id" is identification information for identification of a type or the like of a file; "token" is information indicating whether or not a token is possessed (when a token is possessed, this is represented by "h"); and "time stamp" is information indicating the time at which the file was updated, and in this instance, a date (year, month and day) on which the file is updated is recorded. It is to be noted that, since files whose file id is "d2", "d4" and "d5" are not possessed by anyone, the tokens of them are considered to be possessed by the backup file manager FMb which serves as a server.

Here, since, for example, any of the process managers PM3 and PM4 does not possess tokens corresponding to the files whose file id is "d2" and "d5" as seen in FIGS. 32(b) and 32(c), it can be seen that the tokens have been lost. Therefore, the backup file manager FMb compares the time stamps of file information replied from the process managers PM3 and PM4 with the time stamps thereof and preferentially reflects those attributes ("file size") which have newer time stamps on the server, and besides sets the possessors of the tokens to the backup file manager FMb itself.

For example, in the case of the file whose file id is "d5", since the time stamp (94.8.17) of the file information on the process manager PM4 side is newer than the time stamp (94.7.30) on the backup file manager FMb side, the latest file information (attribute) "file size(s5')" held by the process manager PM4 is reflected on the file information on the backup file manager FMb side to update the latter file information.

As a result, the file information on the backup file manager FMb side is finally re-constructed in such a manner as seen in FIG. 33, and a process of the primary file manager FMp which has been disabled from functioning by a crash of the node 2 is taken over by the backup file manager FMb, thereby completing the recovery processing of the server.

In this instance, the node 3 or 4 has the units 21 to 27 described hereinabove, and the stable storage apparatus 5 has the units 21' and 22'. It is to be noted that also the crashing node 2 has the units 21 to 27, and when the node 3 or 4 other than the node 2 crashes, recovery processing of the server is performed similarly by the units 21 to 27 of any other node than the crashing node.

In this manner, according to the recovery processing of the server in the distributed system described above, even if the distributed system 1 partially fails because of a crash of the node 2 or the like, the backup server (backup file manager FMb) can collect token information and re-construct token information of the server to perform recovery, the entire distributed system 1 can continue its processing in a condition free from inconsistency.

The present invention is not limited to the specifically described embodiment, and variations and modifications may be made without departing from the scope of the present invention.

What is claimed is:

1. A distributed system comprising:

a plurality of clients;

at least one resource managing server operating in accordance with a client-server model with each of said plurality of clients;

a storage apparatus for storing checkpoints having resource management information;

a network connecting said plurality of clients, said at least one resource managing server and said storage apparatus; and at least one of said plurality of clients comprising:
checkpoint taking means for taking a checkpoint regarding a resource managed by the resource managing server during normal operation; and
means for storing the checkpoint taken by said checkpoint taking means in said storage apparatus.

2. A distributed system as claimed in claim 1, wherein said at least one client further comprises storage means for storing the checkpoint taken by said checkpoint taking means.

3. A node apparatus for a distributed system having a storage apparatus connected thereto, the node apparatus operating in accordance with a server-client model, the node apparatus comprising:

a client comprising:
checkpoint taking means for, during normal operation of the distributed system, taking a checkpoint regarding a resource managed by a backup server;
storage means for storing the checkpoint taken by said checkpoint taking means;
means for storing the checkpoint taken by said checkpoint taking means into the storage apparatus; and
means for sending out information regarding the resource from the client to the backup server based on the checkpoint stored in said storage means so as to allow, when another node apparatus crashes, the backup server to collect information regarding the resource to perform recovery of the server.

4. A node apparatus as claimed in claim 3, further comprising means for inhibiting, during recovery by the server, the passing of the information regarding resources managed by the server between the client of the node apparatus and another client.

5. A node apparatus as claimed in claim 3, further comprising means for simultaneously transmitting, upon the passing of information between the client of the node apparatus and another client, an incarnation number which is updated each time a crash of the server occurs.

6. A node apparatus as claimed in claim 4, further comprising means for simultaneously transmitting, upon the passing of information between the client of the node apparatus and another client, an incarnation number which is updated each time a crash of the server occurs.

7. A node apparatus for a distributed system having a storage apparatus connected thereto, the node apparatus operating in accordance with a server-client model, the node apparatus comprising:

a client comprising:
checkpoint taking means for, during normal operation of the distributed system, taking a checkpoint regarding a resource managed by a primary resource managing server having an associated backup resource managing server in another node on the distributed system; and
means for storing the checkpoint taken by said checkpoint taking means in the storage apparatus.

8. A node apparatus as claimed in claim 7, further comprising storage means for storing the checkpoint taken by said checkpoint taking means.

9. A node apparatus for a distributed system having a plurality of other node apparatus and a storage apparatus connected thereto, the node apparatus operating in accordance with a server-client model, the node apparatus comprising:

a client comprising:
checkpoint taking means for, during normal operation of the distributed system, taking a checkpoint regarding a resource managed by a primary resource managing server having an associated backup server on the distributed system;
storage means for storing the checkpoint taken by said checkpoint taking means;
means for storing the checkpoint taken by said checkpoint taking means on the storage apparatus; and
means for sending out information regarding resources managed by the primary resource managing server from the client to the corresponding backup resource managing server based on the checkpoint stored in said storage means so as to allow, when one of plurality of other node apparatus having a primary resource managing server crashes and the node apparatus receives an inquiry from said backup resource managing server for information regarding the resources managed by the crashed primary resource managing server, said backup resource managing server to re-construct an internal condition of said backup resource managing server to perform recovery of the server.

10. A node apparatus as claimed in claim 9, further comprising means for inhibiting, during recovery, passing of information regarding resources managed by said resource managing server between the client of the node apparatus and another client in one of the plurality of other node apparatus.

11. A node apparatus as claimed in claim 9, further comprising means for simultaneously transmitting, upon passing of information between the client of the node apparatus and another client in one of the plurality of other node apparatus, an incarnation number which is updated each time a crash of the resource managing server occurs.

12. A node apparatus as claimed in claim 10, further comprising means for simultaneous by transmitting, upon passing of information between the client of the node apparatus and another client in one of the plurality of other node apparatus, an incarnation number which is updated each time a crash of the resource managing server occurs.

13. A node apparatus for a distributed system having a plurality of other node apparatuses and a storage apparatus connected thereto, the node apparatus operating in accordance with a server-client model, the node apparatus comprising:
  a client having an associated backup client in one of the other node apparatus in the distributed system said client comprising:
    checkpoint taking means for, during normal operation of the distributed system, taking a checkpoint regarding a resource managed by a primary resource managing server having a backup managing server;
    storage means for storing the checkpoint taken by said checkpoint taking means;
    means for storing the checkpoint taken by said checkpoint taking means into the storage apparatus;
    means for reading, when a node apparatus other than the node apparatus having the backup client and the primary resource managing server crashes, a checkpoint regarding the client in the crashing primary resource managing server from the storage apparatus to allow the backup client to recover a condition regarding the resources of the server;
    notification means for notifying the backup resource managing server of the recovery; and
    means for sending information regarding a resource to the backup resource managing server based on the checkpoint stored so as to allow, when the node apparatus receives an inquiry from the backup resource managing server for information regarding the resources managed by the resource managing server after the notification of the recovery is notified by said notification means, the backup resource managing server to collect information and re-construct an internal condition of the backup resource managing server based on the thus collected information to perform recovery of the server.

14. A node apparatus as claimed in claim 13, further comprising means for inhibiting, during recovery by the backup managing server, passing of information regarding resources managed by said primary managing server between the client and another client.

15. A node apparatus as claimed in claim 13, further comprising means for simultaneously transmitting, upon passing of information between the client and the another client, an incarnation number which is updated each time a crash of the server occurs.

16. A node apparatus as claimed in claim 14, further comprising means for simultaneously transmitting, upon passing of information between the client and the another client, an incarnation number which is updated each time a crash of the server occurs.

17. A node apparatus for a distributed system having a storage apparatus connected thereto node apparatus operating in accordance with a server-client model, the node apparatus comprising:
  a client comprising:
    checkpoint taking means for, during normal operation of the distributed system, taking a checkpoint regarding a token for permitting the client to use resources managed by a server; and
    means for storing the checkpoint regarding the token taken into the storage apparatus.

18. A node apparatus as claimed in claim 17, further comprising storage means for storing information regarding the token.

19. A node apparatus for a distributed system having a storage apparatus connected thereto, the node apparatus operating in accordance with a server-client model, the node apparatus comprising:
  a client comprising:
    checkpoint taking means for, during normal operation of the distributed system, taking a checkpoint regarding a token for permitting the client to use resources managed by a backup resource managing server;
    storage means for storing information regarding the token taken by said checkpoint taking means;
    means for storing the checkpoint regarding the token into the storage apparatus; and
    means for sending out information regarding the token from the client to the backup resource managing server based on the checkpoint stored in the means for storage allowing, when another node apparatus having another resource manager therein crashes, the backup resource managing server to collect information regarding the token by way of the client to perform recovery of the backup resource managing server.

20. A node apparatus as claimed in claim 19, further comprising means for storing a list in the storage apparatus of which clients from among a plurality of clients posses tokens into so as to allow, upon recovery by the resource managing server, the resource managing server to collect information regarding tokens only from those clients possessing tokens.

21. A node apparatus as claimed in claim 20, further comprising a failure managing server for discriminating, based on the list of clients stored in the storage apparatus, whether the clients possessing tokens have crashed so as to allow, upon recovery by the resource managing server, the resource managing server to request information from only those of the clients which have tokens and are not crashed.

22. A node apparatus as claimed in claim 19, further comprising means for performing processing for exclusive use to reply to an inquiry for information regarding a token from the resource managing server separately from processing which is performed during normal operation of the distributed system.

23. A node apparatus as claimed in claim 20, further comprising means for sending out information regarding the token to the backup resource managing server within a predetermined time after the node apparatus receives an inquiry for information regarding a token to allow, when the backup resource managing server does not receive, after the backup resource managing server develops an inquiry for information regarding a token upon recovery by the backup resource managing server, a reply to the inquiry from one of the clients and cannot collect information regarding tokens after the predetermined time elapses after the inquiry, information regarding tokens to be collected only from those clients from which a reply has been received.

24. A node apparatus as claimed in claim 20, further comprising means for sending out information regarding a resource to the backup resource managing server in order to allow, upon recovery by the backup resource managing server, the backup resource managing server to compare information regarding the resources managed by the backup resource managing server and information regarding a resource managed by the client, which has used the resource as a result of possession of a token in the past, with each other to discriminate which information is newer with respect to time and update the resource information corresponding to the tokens managed by the backup resource managing server to latest resource information.

25. A node apparatus for a distributed system having a storage apparatus, the node apparatus operating in accordance with a server-client model, the node apparatus comprising:

a client comprising:

checkpoint taking means for, during normal operation of the distributed system, taking a checkpoint regarding a token for permitting the client to use resources managed by a primary resource managing server;

storage means for storing information regarding the token;

means for storing the checkpoint regarding the token into the storage apparatus; and means for sending out information regarding the token from the client to a backup resource managing server based on the checkpoint regarding the token so as to allow, when another one of a plurality of node apparatus connected to the distributed system, and having a primary resource managing server, crashes, the backup resource managing server to collect information regarding the token by way of the client to perform recovery of the primary resource managing server.

26. A node apparatus as claimed in claim 25, further comprising means for storing a list in the storage apparatus of which clients from among a plurality of clients possesses tokens into so as to allow, upon recovery by the backup resource managing server, said backup resource managing server to collect information regarding tokens only from those clients possessing tokens.

27. A node apparatus as claimed in claim 26, further comprising a failure managing server for discriminating, based on the list of clients stored in the storage apparatus, whether the clients possessing tokens have crashed so as to allow, upon recovery by the backup resource managing server, the backup resource managing server to request information from only those clients which have tokens and are not crashed.

28. A node apparatus as claimed in claim 25, further comprising means for performing processing for exclusive use for replying to an inquiry for information regarding a token from the backup resource managing server separately from processing which is performed in ordinary operation of said distributed system.

29. A node apparatus as claimed in claim 26, further comprising means for sending out information regarding the token to the backup resource managing server within a predetermined time after the node apparatus receives an inquiry for information regarding a token to allow, when the backup resource managing server does not receive, after the backup resource managing server develops an inquiry for information regarding a token upon recovery by the backup resource managing server, a reply to the inquiry from one of the clients and cannot collect information regarding tokens after the predetermined time elapses after the inquiry, information regarding tokens to be collected only from those clients from which a reply has been received.

30. A node apparatus as claimed in claim 25, further comprising means for sending out information regarding a resource to the backup resource managing server in order to allow, upon recovery by the backup resource managing server, the backup resource managing server to compare information regarding the resources managed by the backup resource managing server and information regarding a resource managed by the client, which has used the resource as a result of possession of a token in the past, with each other to discriminate which information is newer with respect to time and update the resource information corresponding to the tokens managed by the backup resource managing server to latest resource information.

31. A storage apparatus for a distributed system having a plurality of node apparatus, each node apparatus including one or both of a client and a resource managing server, the clients and the servers operating in accordance with a server-client model, the storage apparatus comprising:

means for receiving and storing checkpoints regarding resources taken by each client; and means for sending the checkpoints to a server so as to allow, when one of the plurality of node apparatus crashes, the server to collect information regarding the resources and perform recovery of the server.

32. A storage apparatus for a distributed system having a plurality of node apparatus, each node apparatus including one or both of a client and a resource managing server, wherein a primary resource managing server and a backup resource managing server are distributed in different ones of said plurality of node apparatus, and the storage apparatus for storing checkpoints having resource management information and wherein said plurality of node apparatus and said storage apparatus are interconnected by way of a network, and the clients and the servers operating in accordance with a server-client model, the storage apparatus comprising:

means for receiving and storing information regarding tokens taken by the client; and means for sending checkpoints regarding the tokens to a server so as to allow, when one of the plurality of node apparatus crashes, the server to collect information regarding the tokens and perform recovery of the server.

33. A storage apparatus as claimed in claim 32, further comprising means for receiving and storing a list of the clients which possess tokens for permitting the clients to use resources managed by a server, and means for sending the list of clients so as to allow, when one of the plurality of node apparatus in which a primary resource managing server is present crashes, a backup resource managing server to request information from only those clients which possess tokens to collect information and then re-construct an internal condition of the backup resource managing server.

34. A recovery method for a server contained in one of a plurality of node apparatus connected in a distributed system comprising the steps of:

taking by the client, during normal operation of the distributed system, checkpoints regarding resources managed by the server in one of the node apparatus while the server does not take the checkpoints regarding the resources;

storing the checkpoints into an internal storage provided in a client in one of the node apparatus and into a storage apparatus connected to the distributed system;

collecting, when one of the plurality of node apparatus crashes, information regarding the resources based on the checkpoints; and performing recovery of the server based on the collected information.

35. A recovery method as claimed in claim 34, wherein passing of information regarding the resources managed by the server between the clients is inhibited during performing recovery.

36. A recovery method as claimed in claim 34, wherein an incarnation number, updated each time the server crashes, is transmitted simultaneously with passing of information between clients.

37. A recovery method as claimed in claim 35, wherein an incarnation number, updated each time the server crashes, is transmitted simultaneously with passing of information between clients.

38. A recovery method for primary resource managing server contained in one of a plurality of node apparatus in a distributed system having a backup resource managing server contained in different one of the plurality of node apparatus comprising the steps of:

taking by the client, during normal operation of the distributed system, checkpoints regarding resources managed by the primary resource managing server, the primary resource managing server not taking the checkpoints, and storing the taken checkpoints into an internal storage means in a client and a storage apparatus connected to the distributed network;

when the primary resource managing server crashes, asking the client for information regarding the resources managed by the primary resource managing server based on the checkpoints stored in the client or the storage apparatus to collect information for the backup resource managing server; and re-constructing an internal condition of the backup resource managing server based on the collected information to perform recovery of the server.

39. A recovery method as claimed in claim 38, wherein passing information regarding the resources managed by the primary resource managing server between clients is inhibited during recovery processing by the backup resource managing server.

40. A recovery method as claimed in claim 38, wherein an incarnation number, updated each time the primary resource managing server crashes, is transmitted simultaneously upon passing of information between clients.

41. A recovery method as claimed in claim 39, wherein an incarnation number, updated each time the primary resource managing server crashes, is transmitted simultaneously upon passing of information between clients.

42. A recovery method for a primary resource managing server contained in one of a plurality of node apparatus connected in a distributed system having a backup resource managing server, the method comprising the steps of:

taking by the client, during normal operation of said distributed system, checkpoints regarding resources managed by the primary resource managing server while the primary resource managing server does not take such checkpoints and storing the checkpoints into a storage provided in a client in one of the node apparatus and into a storage apparatus connected to the distributed system;

reading, when one of the plurality of node apparatus containing the client crashes, a checkpoint regarding a client present in the node apparatus which has crashed from the storage apparatus;

notifying, at a point of time when a condition regarding resources of the server recovers, the backup resource managing server of such recovery; and asking for, upon reception of the notification of the recovery by the backup resource managing server from the recovering client, the client for information regarding the resources managed by the primary resource managing server to collect information from the storage in the client and re-constructing an internal condition of said backup resource managing server based on the collected information to perform recovery of the primary resource managing server.

43. A recovery method as claimed in claim 42, wherein passing of information regarding the resources managed by the primary resource managing server between clients is inhibited during recovery processing by the backup resource managing server.

44. A recovery method as claimed in claim 42, wherein an incarnation number updated each time the primary resource managing server crashes is transmitted simultaneously upon passing of information between clients.

45. A recovery method as claimed in claim 43, wherein an incarnation number updated each time the primary resource managing server crashes is transmitted simultaneously upon passing of information between clients.

46. A recovery method for a server contained in one of a plurality of node apparatus contained in a distributed system, the method comprising the steps of:

taking by the client, during normal operation of the distributed system, checkpoints regarding tokens for permitting a client contained in one of the node apparatus to use resources managed by the server while the server does not take the checkpoints regarding the tokens;

storing the checkpoints into a storage in the client and a storage apparatus connected to the distributed system; and collecting, when one of the plurality of node apparatus crashes, information regarding the tokens based on the check points; and performing recovery of the server based on the collected information.

47. A recovery method as claimed in claim 46, wherein a list of those of the clients which possess tokens is stored into the storage apparatus, and upon recovery by the server, the server collects information regarding tokens, based on the list of clients, from only those of the clients which possess tokens.

48. A recovery method as claimed in claim 47, wherein a failure managing server is provided in a node apparatus different from the node apparatus in which the server is present, the failure managing server discriminates, when the node apparatus in which the server is present crashes, based on the list of clients, whether the clients which possess the tokens crashed, and wherein the backup resource managing server request information from, based on the discrimination of said failure managing server, only those clients which possess the tokens and have not for information regarding the tokens crashed.

49. A recovery method as claimed in claim 46, wherein, upon recovery by the server, each of the clients which inquired for information regarding the tokens from the server performs processing for exclusive use for replying to the inquiry separately from processing which is executed in ordinary operation of the client.

50. A recovery method as claimed in claim 46, wherein, upon recovery by the server, when the server does not receive, after the server inquires the clients for information regarding tokens, a reply to the inquiry from one of the clients and cannot collect information regarding the tokens after a predetermined time elapses after the inquiry, information regarding the tokens is collected only from those of the clients from which a reply has been received.

51. A recovery method as claimed in claim 46, wherein, upon recovery by the server, the clients which possess the tokens are inquired for information regarding the tokens to collect information, and the information regarding the resources managed by the server and information regarding the resources of the clients having used the resources as a result of possession of the tokens in the past are compared with each other to discriminate which information is newer with respect to time, and then the server updates the information regarding the resources corresponding to the tokens managed by the server to latest resource information based on a result of the comparison.

52. A recovery method for a primary resource managing server contained in one of a plurality of node apparatus connected in a distributed system having a backup resource managing server distributed in different node apparatus, the method comprising the steps of:

taking by the client, during normal operation of said distributed system, checkpoint regarding tokens for permitting a client contained in one of the node apparatus to use resources managed by the primary resource managing server while the primary resource managing server does not take the checkpoints regarding the tokens;

storing the checkpoints regarding the tokens into a storage in the client and into a storage apparatus connected to the distributed system; and when one of said plurality of node apparatus in which said primary resource managing server is present crashes a backup resource managing server, present in a different one of said plurality of node apparatus from the node apparatus in which said primary resource managing server is present inquires, based on the information regarding the tokens stored in one of said storage means and said storage apparatus in the ordinary operation of said distributed system, the client for information regarding the tokens to collect information regarding the tokens and re-constructing an internal condition of said backup resource managing server based on the thus collected information to perform recovery of the server.

53. A recovery method as claimed in claim 52, wherein, in ordinary operation of said distributed system, a list of those of the clients which possess tokens is stored into said storage apparatus, and then upon recovery by said backup resource managing server, said backup resource managing server collects information regarding tokens, based on the list of clients stored in said storage apparatus from only those of the clients which possess tokens to perform recovery of the server.

54. A recovery method as claimed in claim 53, wherein a failure managing server provided in one of said plurality of node apparatus different from the node apparatus in which the server is present discriminates, when the node apparatus in which the server is present crashes, based on the list of clients stored in said storage apparatus, whether or not the clients which possess the tokens are in crash, and said backup resource managing server inquires, based on the discrimination of said failure managing server, only those of the clients which possess the tokens and are not in crash for information regarding the tokens to collect information regarding tokens to perform recovery of the server.

55. A recovery method as claimed in claim 53, wherein, upon recovery by the server, each of the clients inquired for information regarding the tokens from the server performs processing for exclusive use for replying to the inquiry separately from processing which is executed in ordinary operation of the client.

56. A recovery method as claimed in claim 53, wherein, upon recovery by the server, when the server does not receive, after the server inquires the clients for information regarding tokens, a reply to the inquiry from one of the clients and cannot collect information regarding the tokens after a predetermined time elapses after the inquiry, information regarding the tokens is collected only from those of the clients from which a reply has been received.

57. A recovery method as claimed in claim 53, wherein, upon recovery by the server, the clients which possess the tokens are inquired for information regarding the tokens to collect information, and the information regarding the resources managed by the server and information regarding the resources of the clients having used the resources as a result of possession of the tokens in the past are compared with each other to discriminate which information is newer with respect to time, and then the server updates the resource information corresponding to the tokens managed by the server to latest resource information based on a result of the comparison.

* * * * *

UNITED STATES PATENT AND TRADEMARK OFFICE
CERTIFICATE OF CORRECTION

PATENT NO. : 5,845,082
DATED : December 1, 1998   PAGE 1 of 2
INVENTOR(S) : Murakami It is certified that error appears in the above-identified patent and that said Letters Patent is hereby corrected as shown below:

Col. 2,   line 45, delete "is".

Col. 11,  line 50, start a new paragraph with "a. Aspects...".

Col. 14,  line 31, delete "is".

Col. 15,  line 50, after "system" insert --,--.

Col. 16,  line 49, delete "the" (third occurrence).

Col. 17,  line 55, delete "is".

Col. 18,  line 39, "sever" should be --server--.

Col. 19,  line 6, after "server" (first occurrence) insert --S--;

Col. 19,  line 12, after "server" insert --S--;

Col. 19,  line 46, "S" should be --5--.

Col. 28,  line 24, start a new paragraph with "Subsequently, a second ...".

Col. 31,  line 38, ""c1," should be --"C1,"--.

UNITED STATES PATENT AND TRADEMARK OFFICE
CERTIFICATE OF CORRECTION

PATENT NO. : 5,845,082

DATED : December 1, 1998

INVENTOR(S) : Murakami

It is certified that error appears in the above-identified patent and that said Letters Patent is hereby corrected as shown below:

Col. 34, line 16, start a new paragraph with "Similarly,".

Col. 39, line 5, "simultaneous by" should be --simultaneously--;

Col. 39, line 62, after "thereto" insert --, the--.

Col. 40, line 32, "posses" should be --possess--.

Col. 44, line 49, after "tokens" insert --have--.

Col. 45, line 19, "checkpoint" should be --checkpoints--.

Signed and Sealed this

Twenty-fifth Day of May, 1999

Q. TODD DICKINSON

Attest:

Attesting Officer

Acting Commissioner of Patents and Trademarks